US012545957B2

(12) United States Patent
Hu et al.

(10) Patent No.: US 12,545,957 B2
(45) Date of Patent: Feb. 10, 2026

(54) METHOD OF DETERMINING ENDOMETRIAL RECEPTIVITY AND APPLICATION THEREOF

(71) Applicant: YIKON GENOMICS (SUZHOU) CO., LTD., Suzhou (CN)

(72) Inventors: Chunxu Hu, Suzhou (CN); Yanping Li, Suzhou (CN); Xin Dong, Suzhou (CN); Sijia Lu, Suzhou (CN); Mintao Hu, Suzhou (CN)

(73) Assignee: YIKON GENOMICS (SUZHOU) CO., LTD., Suzhou (CN)

( * ) Notice: Subject to any disclaimer, the term of this patent is extended or adjusted under 35 U.S.C. 154(b) by 819 days.

(21) Appl. No.: 17/594,567

(22) PCT Filed: Mar. 5, 2020

(86) PCT No.: PCT/CN2020/078074
§ 371 (c)(1),
(2) Date: Oct. 22, 2021

(87) PCT Pub. No.: WO2020/215902
PCT Pub. Date: Oct. 29, 2020

(65) Prior Publication Data
US 2023/0313295 A1 Oct. 5, 2023

(30) Foreign Application Priority Data
Apr. 22, 2019 (CN) .......................... 201910324707.0

(51) Int. Cl.
*C12Q 1/6876* (2018.01)
*G16B 25/10* (2019.01)

(52) U.S. Cl.
CPC ........... *C12Q 1/6876* (2013.01); *G16B 25/10* (2019.02); *C12Q 2600/158* (2013.01); *G01N 2800/367* (2013.01)

(58) Field of Classification Search
None
See application file for complete search history.

(56) References Cited

U.S. PATENT DOCUMENTS

| 5,279,941 A | 1/1994 | Lessey |
| 5,916,751 A | 6/1999 | Tabibzadeh |
| 2018/0214068 A1 | 8/2018 | Munne |

FOREIGN PATENT DOCUMENTS

| CA | 2732849 A1 | 1/2010 |
| CA | 2948039 A1 | 10/2015 |
| CN | 104603622 A | 5/2015 |
| CN | 109585017 A | 4/2019 |
| CN | 110042156 A | 7/2019 |
| DE | 10361928 A1 | 7/2004 |
| JP | 2010515909 A | 5/2010 |
| RU | 2580629 C1 | 4/2016 |
| RU | 2617515 C1 | 4/2017 |
| RU | 2636527 C1 | 11/2017 |
| WO | 9955902 A1 | 11/1999 |
| WO | 2013057316 | 4/2013 |
| WO | 2013057316 A1 | 4/2013 |
| WO | 2013135836 A1 | 9/2013 |
| WO | 2015143228 A1 | 9/2015 |
| WO | 2017173250 A1 | 10/2017 |
| WO | 2018178171 A1 | 10/2018 |

OTHER PUBLICATIONS

Garrido-Gomez (Fertility and Sterility vol. 99 Issue Mar. 4, 2013 pp. 1078-1085).*
Whitehead (Genome Biology 2005 vol. 6 Issue 2 Article R13).*
Pioli (Infection and Immunity Oct. 2004 pp. 5799-5806).*
Riesewijk (Molecular Human Reproduction vol. 9 No 5 pp. 253-264, 2003).*
Chan (G&P magazine 2006 vol. 6 No 3 pp. 20-26).*
Coleman (Drug Discovery Today. 2003. 8: 233-235).*
PCT International Search Report for International Application No. PCT/CN2020/078074, dated Jun. 11, 2020, 8 pages.
Signe Altmäe et al, "Meta-signature of human endometrial receptivity: a meta-analysis and validation study of transcriptomic biomarkers", Scientific Reports, (20170830), vol. 7, No. 1, doi: 10.1038/s41598-017-10098-3, XP055471173.
NCBI GEO: accession: GPL570 [HG-U133 Plus 2] Affymetrix Human GenomeU133 Plus 2.0 Array.
Signe Altmäe et al., "Meta-signature of human endometrial receptivity: a meta-analysis and validation study of transcriptomic biomarkers", Scientific Reports, (Aug. 30, 2017), vol. 7, No. 1, doi: 10.1038/s41598-017-10098-3, XP055471173.
Díaz-Gimeno P, Ruíz-Alonso M, Blesa D, et al. Transcriptomics of the human endometrium[J]. The International journal of developmental biology, 2014, 58(2-3-4): 127-137.
Wang X, Yu Q. An update on the progress of transcriptomic profiles of human endometrial receptivity[J]. Biology of Reproduction, 2018, 98(4): 440-448.
Kravchuk Y N, Kalugina A S. Assessment of endometrial receptivity by biomarkers[J]. Journal of obstetrics and women's diseases, 2012, 61(6): 61-67.

* cited by examiner

*Primary Examiner* — Amanda Haney
(74) *Attorney, Agent, or Firm* — Hoffman Warnick LLC

(57) ABSTRACT

The present invention provides a method for determining endometrial receptivity and an application thereof. Specifically, the present invention provides a method for determining endometrial receptivity and markers for determining an endometrial receptivity status. The markers of the present invention could greatly reduce the error rate during the determination of the endometrial receptivity.

6 Claims, 3 Drawing Sheets

METHOD OF DETERMINING ENDOMETRIAL RECEPTIVITY AND APPLICATION THEREOF

TECHNICAL FIELD

The present invention relates to the field of biomedicines, and specifically, relates to a method for determining endometrial receptivity and an application thereof.

BACKGROUND

In the human reproductive process, in which a fertilized ovum locates, adheres and implants in the mother's uterus, and finally develops into a mature fetus, the implantation process has a major influence on the successful pregnancy, and successful clinical pregnancy further requires good endometrial receptivity (ER), and synchronous development of endometrium and embryo besides a high-quality embryo. ER refers to a capability that endometrium receives an embryo. Embryo implantation is allowed by endometrium only in a short-term specific period, and such period is called an "implantation window period", which is equivalent to, for an adult female, the 20th-24th days of the menstrual cycle or 6-8 days after ovulation.

In the field of the in vitro fertilization-embryo transplantation (IVF-ET), a woman with repeated transplantation failure, or a woman suffering from any other secondary infertility has inaccurate time nodes of the implantation window period. If the implantation window period is calculated according to the menstrual cycle or the ovulation date, there would be a great risk of transplantation failure. The specific mechanism of ER remains unknown, but what is clear is that poor ER is one of the important reasons causing the failure of embryo implantation in IVF-ET.

Therefore, it is urgent to find out a stable, noninvasive and accurate marker and method for evaluating endometrial receptivity, thus helping medical personnel to determine the ER status clearly and help the patients to find out the implantation window period accurately, which is of great significance to promote the success rate of IVF-ET.

Contents of the Invention

An objective of the present invention is to provide a stable, noninvasive and accurate marker and method for evaluating endometrial receptivity, thus helping medical personnel to determine the ER status clearly and help the patients to find out the implantation window period accurately, which is of great significance to promote the success rate of IVF-ET.

A first aspect of the present invention is to provide a method for determining endometrial receptivity, including the following steps:

(a) providing a sample;
(b) measuring the expression levels of endometrial receptivity-related genes in the sample;
(c) comparing the expression levels of the endometrial receptivity-related genes obtained in step (b) with the predetermined value, thereby determining endometrial receptivity;

In another preferred embodiment, the sample is selected from a group consisting of the following: endometrial tissues, uterine fluid, uterine lavage fluid, vaginal exfoliated cells, vaginal secretion, biopsy products of endometrium, serum, plasma, or a combination thereof In another preferred embodiment, the expression levels of the endometrial receptivity-related genes obtained in step (b) is higher than a predetermined value, indicating that there is endometrial receptivity.

In another preferred embodiment, the expression levels of the endometrial receptivity-related genes includes the expression levels of cDNA of the endometrial receptivity-related genes.

In another preferred embodiment, the sample is derived from the following periods: LH+n, LH−n+2, LH+n+4, wherein, n is 3-7, preferably, n is 4-6.

In another preferred embodiment, the sample is the derived from the following periods: the n-th day after ovulation, wherein, n is 3-7, preferably, n is 4-6.

In another preferred embodiment, the endometrial receptivity-related genes comprise at least 70%, preferably, at least 80%, more preferably, at least 90%, and more preferably, at least 95% of genes selected from table A:

TABLE A

| | Name |
|---|---|
| 1 | KRIT1 |
| 2 | RBM5 |
| 3 | PAF1 |
| 4 | RFC1 |
| 5 | TPR |
| 6 | ACAA1 |
| 7 | SFSWAP |
| 8 | SPEN |
| 9 | CPSF1 |
| 10 | XRCC1 |
| 11 | KDM5A |
| 12 | SART3 |
| 13 | PIK3C3 |
| 14 | YTHDC1 |
| 15 | PPIE |
| 16 | NFX1 |
| 17 | CDC5L |
| 18 | SF3A1 |
| 19 | TXN2 |
| 20 | EIF3D |
| 21 | EP300 |
| 22 | CHD8 |
| 23 | PNN |
| 24 | CSTF1 |
| 25 | PRPF6 |
| 26 | PQBP1 |
| 27 | CIAO3 |
| 28 | HMOX2 |
| 29 | PIH1D1 |
| 30 | AKAP8 |
| 31 | BUD31 |
| 32 | EIF3A |
| 33 | CASC3 |
| 34 | CDK5RAP3 |
| 35 | SUPT6H |
| 36 | CNOT2 |
| 37 | SUDS3 |
| 38 | TBCCD1 |
| 39 | EIF2B4 |
| 40 | ORC2 |
| 41 | SRSF4 |
| 42 | SFPQ |
| 43 | SRSF11 |
| 44 | PRRC2C |
| 45 | FBXW2 |
| 46 | SNX19 |
| 47 | EPC1 |
| 48 | TBCC |
| 49 | CNOT1 |
| 50 | GTF2F1 |
| 51 | KDM5C |
| 52 | NSRP1 |
| 53 | UXT |
| 54 | ATG14 |

TABLE A-continued

| | Name |
|---|---|
| 55 | AKAP9 |
| 56 | PRKRIP1 |
| 57 | CCNT1 |
| 58 | LSM4 |
| 59 | RLIM |
| 60 | ERAL1 |
| 61 | PTPRA |
| 62 | NASP |
| 63 | SRRM1 |
| 64 | PRPF38A |
| 65 | CDK5RAP2 |
| 66 | PRPF4 |
| 67 | PPIG |
| 68 | SMARCC2 |
| 69 | TCF25 |
| 70 | CSNK1D |
| 71 | ENSA |
| 72 | TEX261 |
| 73 | FIP1L1 |
| 74 | CENPC |
| 75 | ZMAT2 |
| 76 | CELF1 |
| 77 | CPSF7 |
| 78 | UPF2 |
| 79 | MMS19 |
| 80 | SON |
| 81 | ADAR |
| 82 | MAGOH |
| 83 | ELP6 |
| 84 | NIPBL |
| 85 | SLU7 |
| 86 | PCF11 |
| 87 | NSD1 |
| 88 | YWHAB |
| 89 | DDB1 |
| 90 | SF1 |
| 91 | ATG4B |
| 92 | FEM1B |
| 93 | SIN3A |
| 94 | LUZP1 |
| 95 | GPS1 |
| 96 | SF3B5 |
| 97 | HNRNPA3 |
| 98 | PYM1 |
| 99 | RBM4 |
| 100 | PRPF8 |
| 101 | ZBTB4 |
| 102 | CKAP5 |
| 103 | SMAD2 |
| 104 | POLR2A |
| 105 | RNF135 |
| 106 | RNF41 |
| 107 | MRPS11 |
| 108 | CEP63 |
| 109 | EIF3C |
| 110 | SF3B3 |
| 111 | SIAH1 |
| 112 | SND1 |
| 113 | UBL5 |
| 114 | NELFE |
| 115 | EIF3CL |
| 116 | FIS1 |
| 117 | TRIM26 |
| 118 | MRPL20 |
| 119 | KMT2E |
| 120 | AFF4 |
| 121 | GTF3C1 |
| 122 | ANAPC5 |
| 123 | MAEA |
| 124 | TOX4 |
| 125 | GID8 |
| 126 | ARFGAP1 |
| 127 | ARHGEF7 |
| 128 | H2AFV |
| 129 | ZNHIT1 |
| 130 | COA1 |
| 131 | GBF1 |
| 132 | GOSR1 |

TABLE A-continued

| | Name |
|---|---|
| 133 | IFT20 |
| 134 | ANAPC15 |
| 135 | IK |
| 136 | KANSL3 |
| 137 | GTF3C2 |
| 138 | CHMP3 |
| 139 | FAM20B |
| 140 | CHCHD5 |
| 141 | RPAIN |
| 142 | UBE4B |
| 143 | C19orf12 |
| 144 | ANKRD17 |
| 145 | MED6 |
| 146 | TMEM258 |
| 147 | ERCC5 |
| 148 | ATP5MC2 |
| 149 | SMPD4 |
| 150 | ECPAS |
| 151 | DMAC1 |
| 152 | SEC24B |
| 153 | NCOR1 |
| 154 | PI4KB |
| 155 | C1orf43 |
| 156 | ASXL2 |
| 157 | VTI1A |
| 158 | PPP1R15B |
| 159 | SNF8 |
| 160 | GATD3A |
| 161 | MED11 |
| 162 | RAD21 |
| 163 | SPIDR |
| 164 | ANAPC16 |
| 165 | VPS39 |
| 166 | ATP5PD |
| 167 | FIBP |
| 168 | CORO1B |
| 169 | RAB1B |
| 170 | RMDN1 |
| 171 | BET1L |
| 172 | ASB8 |
| 173 | EXOC7 |
| 174 | UQCR10 |
| 175 | TOP1 |
| 176 | SPOUT1 |
| 177 | ARMCX6 |
| 178 | PPP1R10 |
| 179 | LIN52 |
| 180 | SMIM7 |
| 181 | TOMM6 |
| 182 | PDCD6 |
| 183 | GGNBP2 |
| 184 | GATD3B |
| 185 | KIAA0100 |
| 186 | ELOA |
| 187 | AQR |
| 188 | FBXO42 |
| 189 | LSG1 |
| 190 | FAM120A |
| 191 | THRAP3 |
| 192 | ARID4B |
| 193 | POLR3E |
| 194 | GPBP1 |
| 195 | RFXANK |
| 196 | TAF11 |
| 197 | BUD23 |
| 198 | PDCD2 |
| 199 | BCS1L |
| 200 | ZNF638 |
| 201 | ZNF37A |
| 202 | EXOSC7 |
| 203 | TOP2B |
| 204 | DELE1 |
| 205 | GCN1 |
| 206 | DDX24 |
| 207 | DHPS |
| 208 | WAC |
| 209 | HPS4 |
| 210 | PPP6R2 |

TABLE A-continued

| | Name |
|---|---|
| 211 | PACSIN2 |
| 212 | HMGXB4 |
| 213 | POLR3H |
| 214 | RBM23 |
| 215 | ZC3H14 |
| 216 | DCAF11 |
| 217 | NDRG3 |
| 218 | GYS1 |
| 219 | CCDC130 |
| 220 | DNAJC2 |
| 221 | CHCHD2 |
| 222 | TMEM248 |
| 223 | NUFIP2 |
| 224 | UBTF |
| 225 | MTMR4 |
| 226 | RSRC2 |
| 227 | KRR1 |
| 228 | CHD4 |
| 229 | ZNF451 |
| 230 | SENP6 |
| 231 | PRPF4B |
| 232 | PRKAR2A |
| 233 | FXR1 |
| 234 | HDLBP |
| 235 | PPP1R7 |
| 236 | ASH1L |
| 237 | GON4L |
| 238 | TSNAX |
| 239 | HMGCL |
| 240 | MED28 |
| 241 | NEK9 |
| 242 | PANK3 |
| 243 | SPOP |
| 244 | MTIF3 |
| 245 | ZC3H13 |
| 246 | SMUG1 |
| 247 | RAB22A |
| 248 | STAU1 |
| 249 | DDX27 |
| 250 | SERPINB6 |
| 251 | MEA1 |
| 252 | COX6B1 |
| 253 | TIMM17B |
| 254 | XPO7 |
| 255 | SAFB2 |
| 256 | EIF2S3 |
| 257 | UBA1 |
| 258 | RBM39 |
| 259 | ACLY |
| 260 | DHX30 |
| 261 | SCO1 |
| 262 | LARS |
| 263 | PPHLN1 |
| 264 | LPIN1 |
| 265 | TIMM10 |
| 266 | ARGLU1 |
| 267 | TFCP2 |
| 268 | C2orf49 |
| 269 | SLTM |
| 270 | CIR1 |
| 271 | TMOD3 |
| 272 | SBNO1 |
| 273 | DCAF5 |
| 274 | ANP32A |
| 275 | COMMD4 |
| 276 | ARHGAP17 |
| 277 | RHOT2 |
| 278 | SERBP1 |
| 279 | STRIP1 |
| 280 | UFC1 |
| 281 | MRPL9 |
| 282 | UBAP2L |
| 283 | SDE2 |
| 284 | SNRNP200 |
| 285 | C7orf50 |
| 286 | MDH2 |
| 287 | NDUFB11 |
| 288 | TAF1 |
| 289 | EIF4EBP2 |
| 290 | MTG1 |
| 291 | NUDT22 |
| 292 | VIPAS39 |
| 293 | KIN |
| 294 | ATP5F1A |
| 295 | PELO |
| 296 | SAR1B |
| 297 | HNRNPDL |
| 298 | CCDC174 |
| 299 | LARP1 |
| 300 | SCAF4 |
| 301 | APPL1 |
| 302 | GPBP1L1 |
| 303 | PSKH1 |
| 304 | SSU72 |
| 305 | CCDC12 |
| 306 | ZYG11B |
| 307 | PMVK |
| 308 | KIAA1143 |
| 309 | UBXN7 |
| 310 | GAPVD1 |
| 311 | NEMF |
| 312 | HIF1AN |
| 313 | MARF1 |
| 314 | NDUFV1 |
| 315 | HARS |
| 316 | ATF7 |
| 317 | AKAP13 |
| 318 | QARS |
| 319 | ZNF24 |
| 320 | FAM192A |
| 321 | MRPL57 |
| 322 | CHD2 |
| 323 | TOMM20 |
| 324 | MGA |
| 325 | IP6K1 |
| 326 | DNAJC30 |
| 327 | IMP3 |
| 328 | NDUFAF3 |
| 329 | SPTY2D1 |
| 330 | CLK3 |
| 331 | MRPS23 |
| 332 | TTC3 |
| 333 | GPATCH8 |
| 334 | USP7 |
| 335 | LAMTOR4 |
| 336 | TBC1D9B |
| 337 | GSTK1 |
| 338 | QRICH1 |
| 339 | DDX39B |
| 340 | GIGYF2 |
| 341 | BRD2 |
| 342 | GPANK1 |
| 343 | PRRC2A |
| 344 | DHX16 |
| 345 | NAP1L4 |
| 346 | SELENOH |
| 347 | RBMXL1 |
| 348 | ACBD6 |
| 349 | FAM133B |
| 350 | CDKN2AIPNL |
| 351 | CDK11B |
| 352 | PRKDC |
| 353 | MYO19 |
| 354 | LAS1L |
| 355 | PPP1R12A |
| 356 | CCAR1 |
| 357 | SMC1A |
| 358 | ARAF |
| 359 | HSP90AA1 |
| 360 | CHERP |
| 361 | SRRT |
| 362 | SF3B2 |
| 363 | HNRNPC |
| 364 | HNRNPM |
| 365 | RBX1 |
| 366 | TELO2 |

TABLE A-continued

| | Name |
|---|---|
| 367 | UBE2I |
| 368 | TIMM50 |
| 369 | PRPF31 |
| 370 | TCERG1 |
| 371 | TUSC2 |
| 372 | EIF4G1 |
| 373 | NCL |
| 374 | PRPF3 |
| 375 | SNRPB |
| 376 | PRKCSH |
| 377 | TUBGCP2 |
| 378 | EIF3G |
| 379 | SYNCRIP |
| 380 | HUS1 |
| 381 | ACTR1A |
| 382 | MBD1 |
| 383 | HDGF |
| 384 | PARP1 |
| 385 | RPL7L1 |
| 386 | RPUSD3 |
| 387 | ACOX1 |
| 388 | U2SURP |
| 389 | CPSF2 |
| 390 | TSR1 |
| 391 | RFWD3 |
| 392 | CD2BP2 |
| 393 | PCBP1 |
| 394 | PA2G4 |
| 395 | PPID |
| 396 | HCFC1 |
| 397 | FKBP2 |
| 398 | BRMS1 |
| 399 | EIF3K |
| 400 | PUF60 |
| 401 | NOC2L |
| 402 | PRPF40A |
| 403 | RNPS1 |
| 404 | DCP1A |
| 405 | CWC25 |
| 406 | MED24 |
| 407 | PHF20 |
| 408 | EIPR1 |
| 409 | KAT6A |
| 410 | PSMD8 |
| 411 | NOP56 |
| 412 | COPE |
| 413 | SSR3 |
| 414 | COPA |
| 415 | THOC6 |
| 416 | WDR74 |
| 417 | PSMB7 |
| 418 | HAX1 |
| 419 | SURF6 |
| 420 | VPS28 |
| 421 | VKORC1 |
| 422 | PSMD13 |
| 423 | TMEM222 |
| 424 | C6orf106 |
| 425 | MRPL38 |
| 426 | CSNK2B |
| 427 | PSMB3 |
| 428 | CCDC124 |
| 429 | RANBP3 |
| 430 | NOP58 |
| 431 | ZFR |
| 432 | IDH3G |
| 433 | HSD17B10 |
| 434 | MRPL28 |
| 435 | PSMC5 |
| 436 | HSP90AB1 |
| 437 | L3MBTL2 |
| 438 | CINP |
| 439 | NAA10 |
| 440 | SGTA |
| 441 | EDF1 |
| 442 | NDUFS8 |
| 443 | TPI1 |
| 444 | MFN2 |
| 445 | DNPEP |
| 446 | CLPP |
| 447 | RBM42 |
| 448 | PNKD |
| 449 | ILF3 |
| 450 | COX4I1 |
| 451 | RBSN |
| 452 | ILKAP |
| 453 | NIP7 |
| 454 | THUMPD3 |
| 455 | CCT7 |
| 456 | TBRG4 |
| 457 | DDX56 |
| 458 | DCAF7 |
| 459 | YME1L1 |
| 460 | MAN2C1 |
| 461 | SCYL1 |
| 462 | GPN2 |
| 463 | GMPPA |
| 464 | DDX46 |
| 465 | SRFBP1 |
| 466 | CXXC1 |
| 467 | EIF5B |
| 468 | GPATCH4 |
| 469 | EIF4A1 |
| 470 | UBXN1 |
| 471 | IWS1 |
| 472 | PSMC3 |
| 473 | CIAO2B |
| 474 | ZNF592 |
| 475 | DNAJC7 |
| 476 | DTYMK |
| 477 | RNF181 |
| 478 | SLC25A6 |
| 479 | TRMT112 |
| 480 | EIF1AD |
| 481 | AURKAIP1 |
| 482 | ACSF3 |
| 483 | TALDO1 |
| 484 | COX5A |
| 485 | TUFM |
| 486 | FARSA |
| 487 | MRPL14 |
| 488 | ARL6IP4 |
| 489 | EWSR1 |
| 490 | DDX41 |
| 491 | CDK10 |
| 492 | FAAP100 |
| 493 | RPS19BP1 |
| 494 | PTMA |
| 495 | MRPL21 |
| 496 | MRPS18B |
| 497 | ABCF1 |
| 498 | MCRIP1 |
| 499 | CNPY2 |
| 500 | MRPL12 |
| 501 | BAZ2A |
| 502 | USP4 |
| 503 | SMG7 |
| 504 | ARPP19 |
| 505 | NR1H2 |
| 506 | NPEPPS |
| 507 | BIN3 |
| 508 | UBE3B |
| 509 | WASF2 |
| 510 | TAGLN2 |
| 511 | IRF2 |
| 512 | RELA |
| 513 | DCTN2 |
| 514 | CIB1 |
| 515 | SPTAN1 |
| 516 | WWP2 |
| 517 | MSRB1 |
| 518 | DCTN1 |
| 519 | EIF6 |
| 520 | CUX1 |
| 521 | WDR1 |
| 522 | PDRG1 |

TABLE A-continued

| | Name |
|---|---|
| 523 | SH3GLB1 |
| 524 | SNAP29 |
| 525 | KLHDC3 |
| 526 | CHMP1A |
| 527 | LGALS3 |
| 528 | GLYR1 |
| 529 | NOSIP |
| 530 | HERC4 |
| 531 | UBE2J2 |
| 532 | CHTOP |
| 533 | PEF1 |
| 534 | ZDHHC3 |
| 535 | ATP5MD |
| 536 | SETD3 |
| 537 | MCRS1 |
| 538 | AP1G2 |
| 539 | CHMP1B |
| 540 | ARF5 |
| 541 | RNF10 |
| 542 | SNX1 |
| 543 | HAGH |
| 544 | FAM50A |
| 545 | MYL6 |
| 546 | NANS |
| 547 | LPIN2 |
| 548 | UBL4A |
| 549 | TBCB |
| 550 | PRKD2 |
| 551 | DMAC2 |
| 552 | RNF7 |
| 553 | WRAP73 |
| 554 | PEX16 |
| 555 | ANXA11 |
| 556 | CYREN |
| 557 | DYNLRB1 |
| 558 | HECTD3 |
| 559 | PGLS |
| 560 | COX5B |
| 561 | CDK9 |
| 562 | ARPC5L |
| 563 | RTCA |
| 564 | UNC45A |
| 565 | NARF |
| 566 | GUK1 |
| 567 | CAST |
| 568 | NIT1 |
| 569 | EFCAB14 |
| 570 | PRMT2 |
| 571 | FLAD1 |
| 572 | SLMAP |
| 573 | TKT |
| 574 | SLFN5 |
| 575 | CSNK1G1 |
| 576 | EXOSC10 |
| 577 | NADSYN1 |
| 578 | KDM2A |
| 579 | KPNA4 |
| 580 | TMEM120A |
| 581 | COX19 |
| 582 | ARPIN |
| 583 | SYNRG |
| 584 | LYPLA2 |
| 585 | TOLLIP |
| 586 | CDC37 |
| 587 | H2AFY |
| 588 | RBCK1 |
| 589 | RAF1 |
| 590 | GPS2 |
| 591 | NMT1 |
| 592 | FLOT1 |
| 593 | FBXW5 |
| 594 | SQSTM1 |
| 595 | DTX3L |
| 596 | PPIA |
| 597 | SMG5 |
| 598 | EGLN2 |
| 599 | ROCK1 |
| 600 | PXN |
| 601 | RANGAP1 |
| 602 | PSMA7 |
| 603 | MBD4 |
| 604 | ADRM1 |
| 605 | ARF3 |
| 606 | SMIM12 |
| 607 | PPP1CA |
| 608 | SMIM29 |
| 609 | WDR5 |
| 610 | GRIPAP1 |
| 611 | CWF19L1 |
| 612 | MED15 |
| 613 | TSPO |
| 614 | MYH9 |
| 615 | ITPK1 |
| 616 | TPD52L2 |
| 617 | GSDMD |
| 618 | PSMD9 |
| 619 | ADPRHL2 |
| 620 | CCDC32 |
| 621 | NSUN5 |
| 622 | EIF4E2 |
| 623 | MGST3 |
| 624 | PCYT1A |
| 625 | SAP30BP |
| 626 | RNASEK-C17orf49 |
| 627 | SHISA5 |
| 628 | BLCAP |
| 629 | DDX23 |
| 630 | FLII |
| 631 | GAK |
| 632 | PAK2 |
| 633 | HGS |
| 634 | AATF |

In another preferred embodiment, the endometrial receptivity-related genes comprise at least 40 genes selected from table A.

In another preferred embodiment, the endometrial receptivity-related genes comprise at least 147 genes selected from table A.

In another preferred embodiment, the endometrial receptivity-related genes comprise at least 259 genes selected from table A.

In another preferred embodiment, the endometrial receptivity-related genes further comprise additional 5-200 genes.

In another preferred embodiment, the endometrial receptivity-related genes further comprise one or more genes selected from table B.

TABLE B

| | |
|---|---|
| ENSG00000170893 | TRH; |
| ENSG00000241106 | HLA-DOB; |
| ENSG00000171130 | ATP6V0E2; |
| ENSG00000175183 | CSRP2; |
| ENSG00000102837 | OLFM4; |
| ENSG00000163406 | SLC15A2; |
| ENSG00000172137 | CALB2; |
| ENSG00000106483 | SFRP4; |
| ENSG00000066032 | CTNNA2; |
| ENSG00000153234 | NR4A2; |
| ENSG00000137857 | DUOX1; |
| ENSG00000112984 | KIF20A; |
| ENSG00000181195 | PENK; |
| ENSG00000133110 | POSTN; |
| ENSG00000134569 | LRP4; |
| ENSG00000108932 | SLC16A6; |
| ENSG00000173698 | GPR64; |
| ENSG00000204764 | RANBP17; |
| ENSG00000124205 | EDN3; |
| ENSG00000138180 | C10orf3; |
| ENSG00000138778 | CENPE; |

TABLE B-continued

| | |
|---|---|
| ENSG00000198780 | KIAA0888; |
| ENSG00000084636 | COL16A1; |
| ENSG00000119514 | GALNT12; |
| ENSG00000151150 | ANK3; |
| ENSG00000164120 | HPGD |
| ENSG00000139514 | SLC7A1; |
| ENSG00000167346 | MMP26; |
| ENSG00000128606 | LRRC17; |
| ENSG00000026559 | KCNG1; |
| ENSG00000134716 | CYP2J2; |
| ENSG00000117122 | MFAP2; |
| ENSG00000162551 | ALPL; |
| ENSG00000117399 | CDC20; |
| ENSG00000180875 | GREM2; |
| ENSG00000164736 | SOX17; |
| ENSG00000013810 | TACC3; |
| ENSG00000135547 | HEY2; |
| ENSG00000162073 | PAQR4; |
| ENSG00000167183 | MGC11242; |
| ENSG00000176387 | HSD11B2; |
| ENSG00000138160 | KIF11; |
| ENSG00000158458 | NRG2; |
| ENSG00000130558 | OLFM1; |
| ENSG00000106078 | COBL; |
| ENSG00000131747 | TOP2A; |
| ENSG00000080986 | KNTC2; |
| ENSG00000168502 | KIAA0802; |
| ENSG00000188488 | SERPINA5; |
| ENSG00000126787 | DLG7; |
| ENSG00000066279 | ASPM |
| ENSG00000124664 | SPDEF; |
| ENSG00000117009 | KMO; |
| ENSG00000157613 | CREB3L1; |
| ENSG00000143153 | ATP1B1; |
| ENSG00000198721 | PECI; |
| ENSG00000138413 | IDH1; |
| ENSG00000159231 | CBR3; |
| ENSG00000066382 | C11orf8; |
| ENSG00000166165 | CKB; |
| ENSG00000134917 | ADAMTS8; |
| ENSG00000023445 | BIRC3; |
| ENSG00000095397 | DFNB31; |
| ENSG00000131773 | KHDRBS3; |
| ENSG00000257594 | GALNT4; |
| ENSG00000124225 | TMEPAI; |
| ENSG00000090889 | KIF4A; |
| ENSG00000123700 | KCNJ2; |
| ENSG00000138376 | BARD1; |
| ENSG00000108984 | MAP2K6; |
| ENSG00000046651 | OFD1; |
| ENSG00000144837 | PLA1A; |
| ENSG00000197275 | RAD54B; |
| ENSG00000168078 | PBK; |
| ENSG00000165795 | NDRG2; |
| ENSG00000143369 | ECM1; |
| ENSG00000198901 | PRC1; |
| ENSG00000163132 | MSX1; |
| ENSG00000157456 | CCNB2; |
| ENSG00000137269 | LRRC1; |
| ENSG00000140263 | SORD; |
| ENSG00000182580 | EPHB3; |
| ENSG00000158164 | TMSL8; |
| ENSG00000101265 | RASSF2; |
| ENSG00000123607 | TTC21B; |
| ENSG00000082556 | OPRK1; |
| ENSG00000131620 | TMEM16A; |
| ENSG00000143320 | CRABP2; |
| ENSG00000140525 | FLJ10719; |
| ENSG00000065675 | PRKCQ; |
| ENSG00000062822 | CDC2; |
| ENSG00000156970 | BUB1B; |
| ENSG00000127954 | STEAP4; |
| ENSG00000164683 | HEY1; |
| ENSG00000115380 | EFEMP1; |
| ENSG00000100385 | IL2RB; |
| ENSG00000113916 | BCL6; |
| ENSG00000072840 | EVC; |
| ENSG00000130707 | ASS1; |
| ENSG00000164136 | IL15; |
| ENSG00000198848 | CES1; |

TABLE B-continued

| | |
|---|---|
| ENSG00000114573 | ATP6V1A; |
| ENSG00000138792 | ENPEP; |
| ENSG00000071967 | CYBRD1; |
| ENSG00000137731 | FXYD2; |
| ENSG00000258818 | RNASE4; |
| ENSG00000109819 | PPARGC1A; |
| ENSG00000205358 | MT1H; |
| ENSG00000139112 | GABARAPL1; |
| ENSG00000111348 | ARHGDIB; |
| ENSG00000173621 | LRFN4; |
| ENSG00000162645 | GBP2; |
| ENSG00000173762 | CD7; |
| ENSG00000175482 | POLD4; |
| ENSG00000180448 | HMHA1; |
| ENSG00000176485 | HRASLS3; |
| ENSG00000160678 | S100A1; |
| ENSG00000139211 | AMIGO2; |
| ENSG00000205220 | PSMB10; |
| ENSG00000196177 | ACADSB; |
| ENSG00000075426 | FOSL2; |
| ENSG00000164035 | EMCN; |
| ENSG00000184500 | PROS1; |
| ENSG00000180176 | TH; |
| ENSG00000154734 | ADAMTS1; |
| ENSG00000090530 | LEPREL1; |
| ENSG00000084110 | HAL; |
| ENSG00000278053 | DDX52; |
| ENSG00000153233 | PTPRR |
| ENSG00000164022 | SCYE1; |
| ENSG00000167244 | IGF2; |
| ENSG00000125144 | MT1G; |
| ENSG00000162692 | VCAM1; |
| ENSG00000189143 | CLDN4; |
| ENSG00000197614 | MFAP5; |
| ENSG00000130513 | GDF15; |
| ENSG00000135480 | KRT7; |
| ENSG00000122140 | MRPS2; |
| ENSG00000173338 | KCNK7; |
| ENSG00000054654 | SYNE2; |
| ENSG00000180447 | GAS1; |
| ENSG00000171564 | FGB; |
| ENSG00000071282 | LMCD1; |
| ENSG00000141441 | FAM59A; |
| ENSG00000172201 | ID4; |
| ENSG00000103187 | COTL1; |
| ENSG00000107796 | ACTA2; |
| ENSG00000007062 | PROM1; |
| ENSG00000106541 | AGR2; |
| ENSG00000134873 | CLDN10; |
| ENSG00000126458 | RRAS; |
| ENSG00000100234 | TIMP3; |
| ENSG00000125148 | MT2A; |
| ENSG00000143185 | XCL2; |
| ENSG00000133321 | RARRES3; |
| ENSG00000155792 | DEPDC6; |
| ENSG00000126746 | NP; |
| ENSG00000156234 | CXCL13; |
| ENSG00000164107 | HAND2; |
| ENSG00000141401 | IMPA2; |
| ENSG00000163431 | LMOD1; |
| ENSG00000147465 | STAR; |
| ENSG00000154153 | FLJ20152; |
| ENSG00000111371 | SLC38A1; |
| ENSG00000165507 | C10orf10; |
| ENSG00000158825 | CDA; |
| ENSG00000145649 | GZMA; |
| ENSG00000095383 | TBC1D2; |
| ENSG00000148702 | HABP2; |
| ENSG00000107984 | DKK1; |
| ENSG00000118785 | SPP1; |
| ENSG00000164825 | DEFB1; |
| ENSG00000150347 | ARID5B; |
| ENSG00000196975 | ANXA4; |
| ENSG00000081181 | ARG2; |
| ENSG00000124107 | SLPI; |
| ENSG00000102879 | CORO1A; |
| ENSG00000105374 | NKG7; |
| ENSG00000131203 | INDO; |
| ENSG00000115523 | GNLY; |
| ENSG00000196154 | S100A4; |

TABLE B-continued

| | |
|---|---|
| ENSG00000165272 | AQP3; |
| ENSG00000125730 | C3; |
| ENSG00000137331 | IER3; |
| ENSG00000170412 | GPRC5C; |
| ENSG00000120885 | CLU; |
| ENSG00000162496 | DHRS3; |
| ENSG00000101335 | MYL9; |
| ENSG00000172543 | CTSW; |
| ENSG00000138356 | AOX1; |
| ENSG00000106258 | CYP3A5; |
| ENSG00000139278 | GLIPR1; |
| ENSG00000118849 | RARRES1; |
| ENSG00000173210 | ABLIM3; |
| ENSG00000136160 | EDNRB; |
| ENSG00000184502 | GAST; |
| ENSG00000177519 | RPRM; |
| ENSG00000133962 | C14orf161; |
| ENSG00000096006 | CRISP3; |
| ENSG00000197766 | CFD; |
| ENSG00000149131 | SERPING1; |
| ENSG00000186340 | THBS2; |
| ENSG00000173083 | HPSE; |
| ENSG00000125384 | PTGER2; |
| ENSG00000146678 | IGFBP1; |
| ENSG00000088386 | SLC15A1; |
| ENSG00000149591 | TAGLN; |
| ENSG00000134545 | KLRC1; |
| ENSG00000169242 | EFNA1; |
| ENSG00000150594 | ADRAZA; |
| ENSG00000143184 | XCL1; |
| ENSG00000214274 | ANG; |
| ENSG00000108846 | ABCC3; |
| ENSG00000124466 | C4.4A; |
| ENSG00000123689 | G0S2; |
| ENSG00000047457 | CP; |
| ENSG00000086300 | SNX10; |
| ENSG00000163993 | S100P; |
| ENSG00000110484 | SCGB2A2; |
| ENSG00000197635 | DPP4; |
| ENSG00000166741 | NNMT; |
| ENSG00000178726 | THBD; |
| ENSG00000181143 | MUC16; |
| ENSG00000116717 | GADD45A; |
| ENSG00000112096 | SOD2; |
| ENSG00000189221 | MAOA; |
| ENSG00000196878 | LAMB3; |
| ENSG00000127324 | TSPAN8; |
| ENSG00000123838 | C4BPA; |
| ENSG00000145824 | CXCL14; |
| ENSG00000134827 | TCN1; |
| ENSG00000128342 | LIF |
| ENSG00000106688 | SLC1A1; |
| ENSG00000105664 | COMP; |
| ENSG00000122133 | PAEP; |
| ENSG00000211445 | GPX3. |

In another preferred embodiment, the endometrial receptivity-related genes further comprise additional genes, such that the number of genes has reached a total of 10000.

A second aspect of the present invention provides a set of biomarkers, wherein the set comprises at least 70%, preferably, at least 80%, more preferably, at least 90%, and more preferably, at least 95% of genes selected from table A.

In another preferred embodiment, the set of biomarkers comprises at least 40 genes selected from table A.

In another preferred embodiment, the set of biomarkers comprises at least 147 genes selected from table A.

In another preferred embodiment, the set of biomarkers comprises at least 259 genes selected from table A.

In another preferred embodiment, the set of biomarkers further comprises additional 5-200 genes.

In another preferred embodiment, the set of biomarkers further comprises additional genes, such that the number of genes has reached a total of 10000.

In another preferred embodiment, the set of biomarkers is used for determining endometrial receptivity, or used for the manufacture of a kit or a reagent, wherein said kit or reagent is used for evaluating or diagnosing (including early-stage diagnosing and/or auxiliary diagnosing) an endometrial receptivity status of the object under test.

In another preferred embodiment, the biomarker or a set of biomarkers is derived from: an endometrial tissue, uterine fluid, uterine lavage fluid, a vaginal exfoliated cell, vaginal secretion, a biopsy product of endometrium, serum, or plasma sample.

In another preferred embodiment, compared with the predetermined value, one or more biomarkers selected from Table A increase, indicating the endometrial receptivity of the object under test.

In another preferred embodiment, each biomarker is identified by a method selected from group consisting of: RT-qPCR, RT-qPCR chip, next generation sequencing (NGS), expression profile chip, methylated chip, third generation sequencing, or a combination thereof.

In another preferred embodiment, the set is used for evaluating an endometrial receptivity status of the object under test.

A third aspect of the present invention provides a reagent combination for determining an endometrial receptivity status, wherein the reagent combination comprises reagents for detecting each biomarker in the set of the second aspect of the present invention.

In another preferred embodiment, the reagents comprise substances for detecting each biomarker in the set of the second aspect of the present invention using a method selected from the group consisting of: RT-qPCR, RT-qPCR chip, next generation sequencing, expression profile chip, methylated chip, third generation sequencing, or a combination thereof.

A fourth aspect of the present invention provides a kit, and the kit comprises the set of the second aspect of the present invention and/or the reagent combination of the third aspect of the present invention.

A fifth aspect of the present invention provides a use of a set of biomarkers for the manufacture of a kit, which is used for evaluating the endometrial receptivity status of an object under test, wherein the set of biomarkers comprises at least 70%, preferably, at least 80%, more preferably, at least 90%, and more preferably, at least 95% of genes selected from table A.

In another preferred embodiment, the evaluation and diagnosis includes the following steps:

(1) providing a sample derived from an object to be detected, and detecting the level of each biomarker in the set in the sample;

(2) and comparing the level detected in the step (1) with a predetermined value.

In another preferred embodiment, the sample is selected from group consisting of: an endometrial tissue, a uterine fluid, a uterine lavage fluid, vaginal exfoliated cells, a vaginal secretion, a biopsy product of endometrium, serum, plasma, or a combination thereof.

In another preferred embodiment, compared with the predetermined value, one or more biomarkers selected from table A increase, indicating the endometrial receptivity of the objected under test.

In another preferred embodiment, the method further comprises a step of processing the sample before the step (1).

A sixth aspect of the present invention provides a method for determining endometrial receptivity of an objected to be detected comprising the following steps:

(1) providing a sample derived from an object to be detected and detecting the level of each biomarker in the set in the sample, wherein the set comprises at least 70%, preferably, at least 80%, more preferably, at least 90%, and more preferably, at least 95% of genes selected from table A;

(2) comparing the level detected in step (1) with a predetermined value.

A seventh aspect of the present invention provides a system for evaluating an endometrial receptivity status of an object to be detected, comprising:

(a) an input module of features of endometrial receptivity status, wherein the input module is used for inputting the features of the endometrial receptivity status of the object under test;

wherein, the features of the endometrial receptivity status comprise at least 70%, preferably, at least 80%, more preferably, at least 90%, and more preferably, at least 95% of genes selected from Table A:

(b) an processing module for endometrial receptivity status judgment, wherein the processing module performs rating process for inputted features of endometrial receptivity status by preset criteria, thus obtaining a score of the endometrial receptivity status: moreover, the module compares said score of the endometrial receptivity status with the predetermined value, thus obtaining an auxiliary diagnosis result, wherein, when the score of the endometrial receptivity status is higher than the predetermined value, it is suggested that the object has endometrial receptivity; and (c) an output module of auxiliary diagnosis result, wherein the output module is used to output the auxiliary diagnosis result.

In another preferred embodiment, the endometrial receptivity-related genes comprise at least 40 genes selected from table A.

In another preferred embodiment, the endometrial receptivity-related genes comprise at least 147 genes selected from table A.

In another preferred embodiment, the endometrial receptivity-related genes comprise at least 259 genes selected from table A.

In another preferred embodiment, the endometrial receptivity-related genes further comprise additional 5-200 genes.

In another preferred embodiment, the endometrial receptivity-related genes further comprise additional genes, such that the number of genes has reached a total of 10000.

In another preferred embodiment, the object is human.

In another preferred embodiment, the score includes (a) a score of a single feature; and (b) the sum of scores of a plurality of features.

In another preferred embodiment, the feature input module is selected from the group consisting of: a sample collector, a sample preservation tube, a cell lysis and nucleic acid sample extraction kit, a RNA nucleic acid reverse transcription and amplification kit, an NGS library constructing kit, a library quantification kit, a sequencing kit, or a combination thereof.

In another preferred embodiment, the processing module for endometrial receptivity status judgment includes a processor, and a memory, where, the memory stores scoring data of ER status based on the features of the endometrial receptivity status.

In another preferred embodiment, the output module includes a reporting system.

It should be understood that each of the above technical features or each of the technical features specifically described in the followings (e.g., examples) of the present invention may be in combination with any one another, thereby constituting a new or preferred technical solution, which would not be described one by one herein due to space limitations.

DETAILED DESCRIPTION OF THE EMBODIMENTS

Figure 1:
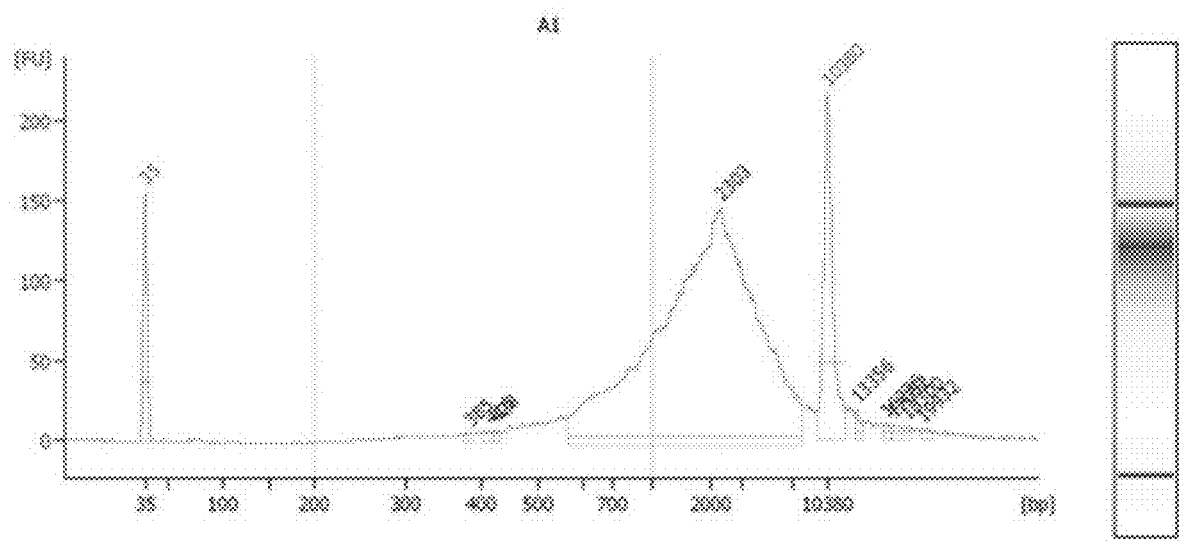
FIG. 1 is a distribution diagram showing cDNA amplification products of the sample in Example 4 of the present invention.

Through extensive and in-depth studies, the inventor unexpectedly discovers biomarkers for determining endometrial receptivity and a combination thereof. Specifically, the present invention discloses a set of biomarkers, and the set may be used for evaluating or diagnosing (including early-stage diagnosis and/or auxiliary diagnosis) the endometrial receptivity status of the object under test, which may greatly reduce the error rate. Therefore, the present invention has important application values. Based on the above, the inventor completes the present invention.

Terms

Terms used herein have the meanings generally understood by a person skilled in the relevant art. However, to better understand the present invention, some definitions and related terms are explained below:

According to the present invention, the term "ER" refers to a capability that the endometrium receives an embryo; embryo implantation is allowed by endometrium only in a specific short-term period.

According to the present invention, the term "set of biomarkers" refers to one biomarker, or a combination of two or more of biomarkers.

According to the present invention, the level of a biomarker is identified by RT-qPCR, RT-qPCR chip, next generation sequencing (NGS), expression profile chip, methylated chip, third generation sequencing, or other methods.

According to the present invention, the term "biomarker", also called "biological marker", refers to a measurable indicator of an individual's biological state. Such a biomarker may be any substance in an individual as long as it is associated with a specific biological state (e.g., a disease) of the individual, for example, a nucleic acid marker (e.g., DNA), a protein marker, a cytokine marker, a chemokine marker, a carbohydrate marker, an antigen marker, an antibody marker, species marker (a species/genus label), a functional marker (KO/OG label), and the like. After being measured and assessed, the biomarker is usually used to examine a normal biological process, a pathogenic process, or a pharmacologic response to therapeutic intervention, and is useful in lots of fields of sciences.

According to the present invention, the term "individual" refers to an animal, specifically a mammal, e.g., primate, preferably, human.

According to the present invention, the term "plasma" refers to the liquid component of whole blood. Depending on the separation method used, the plasma may be completely absent of cell components, and may contain various amount of platelets and/or a little amount of other cell components, either.

According to the present invention, terms, such as, "a/an", "one" and "such a" not only refers to a singular individual/unit, but also includes an usual category capable of specifying a specific embodiment.

It needs to be indicated that terms provided herein are merely explained to make a person skilled in the art to better understand the present invention, but are not construed as limiting the present invention.

Detection Method

In the present invention, a substance for detecting each biomarker in the set of the present invention by a method selected from the group consisting of: RT-qPCR, RT-qPCR chip, next generation sequencing, expression profile chip, methylated chip, third generation sequencing, or a combination thereof.

Kit

In the present invention, the kit includes the set of the second aspect of the present invention and/or the reagent combination of the third aspect of the present invention.

Predetermined Value

In the present invention, the predetermined value refers to a scoring value obtained by scoring an ER period (namely, the clinically proved period during which the endometrium allows an embryo to locate, adhere and implant thereon) by artificial intelligence, or Decision Tree C4.5 algorithm, hidden Markov model (HMM), neural network backpropagation (BP), support vector machine (SVM), and various cluster analysis algorithms (including simple clustering, hierarchical clustering, K-means clustering, self-organizing feature map, fuzzy clustering, Bayesian Classifier, k-Nearest Neighbor, neural network method, decision tree method, voting classification method, principal component analysis (PCA), and the like).

Evaluation Method

In another preferred embodiment, the method of the present invention may calculate a weighted comprehensive score by a formula S=W1S1+W2S2+WiSi+ . . . WnSn.

W1, W2 . . . Wn are the weights.

S1, S2 . . . Sn are scores of each marker.

Preferably, the weight may be based on the analysis value in Table 9. For example, in terms of evaluation on endometrial receptivity, any weight (e.g., W1) may be the analysis value of the corresponding marker in Table 9.

In a preferred embodiment, $S_{subject}$ of a population to be detected=W1S1+W2S2+WiS3+ . . . WnSn.

When the $S_{subject}$ of a population to be detected is greater than the predetermined value, it indicates that the object has an ER status.

The experimental result of the present invention indicates that the markers of the present invention may greatly reduce an error rate, and significantly improve the accuracy of the determination or diagnosis of the ER status-.

Construction Method of the Analysis Model for Determining Endometrial Receptivity In the present invention, the construction method of the analysis model for determining endometrial receptivity includes the following steps:

High-sensitivity RNA reverse transcription and amplification from eDNA were performed, and then eDNA is subjected to library construction for NGS. After the sequencing runs, the expression profile information of the sample is constructed by the sequencing run output data. By analysis and classification with bioinformatics, the ER status is identified, the window period for embryo implantation on endometrium is determined accurately, and the individualized accurate determination is realized.

In a preferred embodiment, the present invention provides a construction method of an analysis model for determining endometrial receptivity, including the following steps:

(1) acquiring samples from healthy women with different menstrual periods, extracting RNA, performing RNA reverse transcription and amplifying cDNA;
(2) constructing a cDNA library for high-throughput sequencing;
(3) comparing the expression levels of various genes in a plurality of samples with different labels by a reinforcement learning method, non-supervised learning method, or a supervised learning method, thus obtaining differentially expressed genes, and constructing the analysis model.

The present invention depends on high-sensitivity RNA reverse transcription and cDNA amplification process, and is based on an RNA-seq sequencing method, thereby obtaining a large number of expression profile information of endometrium, uterine fluid, or other reproductive endocrinology-related body fluids or exfoliations from patients. These samples are subjected to ultra-high dimensionality classification and typing by bioinformatics, statistics and machine learning methods based on different sampling periods, sampling manners, and expression profile features. The ER status is determined according to different types.

The task of supervised learning is to learn from a model, such that the model may map out a predictive result from any given input, thus high-dimensionality predictive analysis is achieved.

The "a plurality of samples" of the "learning" in step (3) refer to samples from a same sample origin but different individuals, for example, 102 cases of endometrial tissues in the receptivity period, 205 cases of endometrial tissues in the pre-receptivity period, 300 cases of endometrial tissues in the post-receptivity period, and the like.

Preferably, the different menstrual periods in step (1) are three periods.

Preferably, the intermediate period of the three periods is L.H+7, or the 5th day after ovulation.

The test sample used in the present invention is from the endometrium biopsy of a female subject in natural menstrual cycle, performed on the 7th day (LH+7) after the occurrence of the luteinizing hormone (LH) peak, or endometrium biopsy of a female subject in hormone replacement therapy (HRT) cycle, performed on the 5th day (P+5) after ovulation. A subject having endometrial lesions (including intrauterine adhesion, endometrial polyps, endobrochelloal tuberculosis and the like), a subject suffering from hydrosalpinx and without proximal tubal ligation, a patient suffering from submucous myoma of uterus or Intramural myoma of uterus bulging towards the uterine cavity or adenomyoma, and a patient having endometriosis (phases III-IV) are not suitable to apply.

Preferably, the three periods further include time periods of 1-3 days before and after the intermediate period, respectively, preferably time periods of 2 days.

Preferably, the intermediate period is a receptivity period, 1-3 days before the intermediate period is the pre-receptivity period, and 1-3 days after the intermediate period is a post-receptivity period.

In the present invention, grouping standards of "training data" or known as "training set" used in the model are as follows: different healthy Chinese females in natural cycles without past medical history or primary infertility, and having a body mass index within 19-25 kg/m². Along with the grouping and testing of lots of samples and the accumulation of clinical outcomes of the cases, the inventor masters the expression profiles of the endometrial tissues, uterine fluid or other reproductive endocrinology-related body fluid or exfoliations in the "receptivity period" (by tracking clinical outcomes, if embryo implantation is performed during this period, and the embryo could be effectively implanted and developed, the period is defined as a "receptivity period"). Meanwhile, we also performs sampling on the cases two days before and after the "receptivity window period" to obtain the corresponding RNA-seq data, and the labels are defined as "pre-receptivity period", and "post-receptivity period", respectively.

In the present invention, samples of a same individual in different menstrual periods are respectively acquired and sequenced to compare the features of the gene expression profiles from different periods of samples, which may indicate differentially expressed genes better, thus reducing a false positive occurrence.

Preferably, the sample in the step (1) includes any one or a combination of at least two fundus endometrial tissue, uterine fluid or a vaginal exfoliation.

In the present invention, the sample may be an endometrial biopsy product, and also a patient's uterine fluid obtained by noninvasive means, even uterine lavage fluid, vaginal exfoliated cells and vaginal secretion. The sample origins are extensive, sampling is convenient and swift, and the female's degree of compliance is promoted, together with an improved accuracy of gene expression profile features due to verifying different origins of samples from a same individual. Uterine lavage fluid, vaginal exfoliation or vaginal secretion have a small sample size, and a large number of samples are required in the conventional detection methods, thus an endometrial biopsy product has to be chosen, while the present invention may satisfy the test requirements with a minute amount of sample, therefore, the types of samples are expanded, and the pain and discomfort of the subject is reduced.

Preferably, the sample volume of the endometrial tissue of the fundus of the uterus is greater than 5 mg, preferably, 5-10 mg, for example, 5 mg, 6 mg, 7 mg, 8 mg, 9 mg or 10 mg.

Preferably, the sample volume of the uterine fluid is greater than 10 µL, preferably, 10-15 µL, for example, 10 µL, 11 µL, 12 µL, 13 µL, 14 µL, or 15 µL.

Preferably, the sample volume of the vaginal exfoliation is greater than 5 mg, preferably, 5-10 mg, for example, 5 mg, 6 mg, 7 mg, 8 mg, 9 mg or 10 mg.

In the present invention, the sample volume of sample is smaller, and the accuracy rate is higher, and the receptivity status of a sample may be accurately predicted without a large number of samples.

Preferably, the cDNA in the library of step (2) has a concentration of no less than 5 ng/uL.

Preferably, the sequencing in step (2) includes RNA-Seq sequencing and/or qPCR sequencing.

In the present invention, the RNA-Seq sequencing method, which is superior to chip sequencing; has a number of detectable differentially expressed genes 2-8 times that of the chip sequencing. Regarding the accuracy for detection of low-abundance genes, the qPCR verification rate of RNA-Seq is 5 times of the chip; regarding the accuracy of differential expression fold change, the qRCR correlation of the RNA-Seq is higher 14% than that of the chip. The RNA-Seq or qPCR sequencing method used in the present invention is common technical means to a person skilled in the art.

Preferably, the sequencing in step (2) has a read length greater than 45 nt.

Preferably, the sequencing in step (2) has a number of reads of no less than 2.5 million reads.

In the present invention, the sequencing with a read length of greater than 45 bases and a number of reads of no less than 2.5 million is to satisfy the sequencing requirements.

In the present invention, the read length and reads number of the sequencing are selected specifically, which reduces the experimental period and cost while ensuring the accuracy.

Preferably, the present invention further includes a data preprocessing step before step (3).

Preferably, the data preprocessing step performs normalization by gene length and by sequencing depth.

Preferably, the normalization method includes any one or a combination of at least two of RPKM, TPM or FPKM, preferably, FPKM.

In the present invention, Fragments Per Kilobase Million (FPKM) is used for normalization for gene length and sequencing depth to exclude the impact of sequencing depth after acquiring different labels of RNA-Seq data. Reads Per Kilobase Million (RPKM) and Trans Per Million (TPM) are the similar normalization methods, while FPKM is preferably used in the present invention.

FPKM is suitable for paired-end sequencing libraries or single-read sequencing libraries so that it is more flexible and easy to be commercialized. RPKM is only suitable for single-read libraries. The TPM value may reflect a ratio of reads of a certain gene in comparison, such that the value may be directly subjected to a comparison between samples, but it is more tedious in the process, slow in the operation and has a low efficiency in the batch analysis.

In the supervised learning of the present invention, a model is constructed by using training data labeled with pre-receptivity period, receptivity window period and post-receptivity period; and the model obtained by the training may be utilized to predict a receptivity status of unknown data (referring to a new sample). For example, a uterine fluid expression profile from one sample is newly input, and the machine learning model is used to determine the receptivity status of the sample.

Preferably, the label is an expression profile feature of endometrial tissues, uterine fluid or vaginal exfoliations under different receptivity statuss.

In this present invention, the expression profile of the sample from different origins, including any one or a combination of at least two of endometrial tissues, uterine fluid or vaginal exfoliates under different receptivity statuss, is obtained for the same individual, thus significantly improving the reliability of predicting results.

Preferably, the analysis method for the differently expressed genes is as follows: all the genes with FPKM>0 of each sample are found, and intersections of the differently expressed genes between the pre-receptivity period and the receptivity period, the pre-receptivity period and the post-receptivity period, and the receptivity period and the post-receptivity period are screened, to satisfy the following: p_value<0.05, and Fold_change>2 or Fold_change<0.5.

In this present invention the sample screening excludes the impact of the genes, which are always highly or lowly expressed in different labels, on the analysis model, thus ensures the exclusion of an over-fitting situation while achieving a good fitting effect in the subsequent analysis model.

Preferably, the supervised learning method in step (3) includes any one or a combination of at least two of Naive Bayes, Decision Tree, Logistic Regression, KNN or Support Vector Machine (SVM), preferably, SVM.

SVM has no many limitations on the original data and requires no priori information. There are a huge amount of data obtained by RNA-Seq sequencing, and different genes have different expression, while SVM may maintain an ultra multi-dimensional (ultrahigh-dimensional) analysis, thus making the model more precise.

Preferably, said SVM has the following script:
library(e1071)
svm.model←svm(data.class~.,data4,kernel='linear')
summary(svm.model)
table(data$class.predict(svm.model,data4, type="data.class"))
mydata=read,table(file.choose( ),header=T,row.names=1)
mydata2=log 2(mydata+1)
predict(svm.model,mydata2)
table(shdata3$shdata.class,predict(svm.model,shdata3, type="shdata.class"))
table(testdata$data.class,predict(svm.model,testdata, type="data.class"))
shdata=read,table(file.choose( ),header=T,row.names=1)
shdata2=log2(shdata[,-length(shdata[1,])]+1)
shdata3=data.frame(shdata2,shdata$class)
predict(svm.model,shdata3)
table(shdata3$shdata.class,predict(svm.model,shdata3, type="shdata.class")).

Preferably, the construction method of the analysis model for determining endometrial receptivity specifically includes the following steps:

(1) Acquiring samples from healthy women in the pre-receptivity period, the receptivity period and the post-receptivity period, and performing RNA extraction, RNA reverse transcription and cDNA amplification, respectively;

(2) constructing a cDNA library, enriching and purifying the library, which then has a concentration of no less than 5 ng/uL. High-throughput sequencing runs are performed, wherein the read length is greater than 45 nt, with not less than 2.5 million reads;

(3) With the expression profile features of the endometrial tissue, uterine fluid or vaginal exfoliate under different receptivity statuss obtained in the step (2) serve as labels, the labeled data was used for model training using the supervised learning method, and the expression of different genes with the different labels were compared. After the acquiring of the RNA-Seq sequencing data of the different labels, the normalization by gene length and sequencing depth using the FPKM method was carried out, and thereby the expression of different genes in multiple samples of different labels were compared under the exclusion of the impact of the gene which is always highly or lowly expressed in the different labels on the model. Analyzing to obtain the differentially expressed genes;

(4) using a SVM learning model, and constructing to obtain an analysis model for predicting the receptivity status of an unknown sample by using the training data labeled with the pre-receptivity period, the receptivity period and the post-receptivity period, where the sampling time may be repeatedly adjusted within multiple periods to improve the precision rate of the determination, then performing a receptivity test.

In this present invention, RNAseq is used to obtain sequencing run output data, and FPKM is used for the normalization of the expression levels. A comparison is made in the differences of the amount of gene expression between the different periods of the same individual, and the genes with significant difference are marked as differentially expressed genes. The genes with the most significant expression difference from the same sample among the pre-receptivity period, the receptivity period and the post-receptivity period are identified. Afterwards, the "differentially expressed genes" are optimized by the different periods of a plurality of individuals. The feature libraries of the three periods are constructed via machine learning. A new certain sample to be tested, after the normalization of expression levels, is classified automatically according to the feature judgment by the machine. The model construction method for the present invention utilizes a huge number of training sets, and fully train the machine by differentially expressed genes with significant specificity matching up with SVM, in combination with improving the model accuracy by adjustment to the model by tracking the clinical outcome for a long time.

In this present invention, in order to acquire the individuality receptivity period from different individuals, the sampling time may be repeatedly adjusted within multiple periods, for example, if the first detection is on LH+5, the test for the next period would be postponed for 2 days to obtain on LH+7, and if the first detection is on LH+9, the test for the next period would be performed 2 days in advance to obtain on LH+7.

The present invention has the major advantages:

(a) The biomarkers of the present invention may be used to determine the ER status accurately, greatly reducing the error rate, and thus is of great application value.

(b) The present invention depends on high-sensitivity RNA reverse transcription and cDNA amplification process, and is based on a RNA-seq sequencing method, obtaining a large number of expression profile information of endometrium, uterine fluid or other reproductive endocrinology-related body fluid or exfoliations from patients. These samples are subjected to ultra-high dimensionality classification and typing by bioinformatics, statistics and machine learning methods based on different sampling periods, sampling manners, and expression profile features. The ER status is determined according to different types.

(c) The present invention provides a construction method of a model used for determining endometrial receptivity using a gene expression profile feature robustly, which integratively optimizes and adjusts the RNA extraction, reverse transcription, cDNA purification and library construction, sequencing run and performs processing, analysis and model construction on the corresponding data, thereby significantly improving the accuracy of determining the endometrial receptivity.

(d) The method of the present invention is featured by low harmfulness brought by the noninvasive uterine fluid biopsy, simplicity and convenience brought by fast process and short period.

The present invention will be further described in combination with specific embodiments. It should be understood that these embodiments are only used to illustrate the present invention, but not to limit or restrict of the scope of the present invention. Any experimental method not specified with detailed conditions in the following examples should be usually subjected to conventional conditions, or conditions recommended by the manufacturer. Unless otherwise specified, percentage and parts are calculated by weight.

Unless otherwise specified, reagents and materials used in the examples of the present invention are commercially available products.

Materials
- Qiagen RNeasy Micro Kit produced by Qiagen with an Art. No, of 74004;
- MALBAC platinum microscale RNA amplification kit with an Art. No, of KT110700724 produced by Yikon Genomics;
- DNA Clean & Concentrator-5 with an Art. No. Of D4014 produced by Zymo;
- gene sequencing library kit (Illumina transposase method) with an Art. No. of KT100801924 produced by Yikon Genomics;
- Agilent 2100 bio-analyzer;
- high-sensitivity DNA chip;
- materials used in the examples below are not limited to the above enumeration, and may be substituted by other similar materials; instrument not specified with conditions are subjected to conventional conditions or conditions recommended by a manufacturer. A person skilled in the art should master and use related knowledge of conventional materials and instrument.

Example 1 Sample Pretreatment and RNA Extraction

Sampling was performed by a gynecologist or a specialized person qualified with sample biopsy, and the sample included a fundus endometrial tissue (greater than 5 mg), a uterine fluid (greater than 10 ul) or other reproductive endocrinology-related fluid (greater than 10 ul), and a vaginal exfoliation (greater than 5 mg). After biopsy, the tissue, exfoliation or fluid was completely soaked into a RNA preserving fluid (about 20 uL RNA Later) as soon as possible. The sample was preserved in a −20° C., or −80° C. refrigerator before transportation.

A Qiagen RNeasy Micro Kit produced by Qiagen was used to extract RNA of endometrial tissues, and the specific method was as follows:

1. Experiment preparation: double hands, a pipettor and an experiment table were cleaned with a RNA enzyme scavenger and a nucleic acid abluent (please note: all extraction steps should be performed in the area free of RNA enzyme contamination).
2. A 70% ethanol solution (350 uL for each sample) and a 80% ethanol solution (500 uL for each sample) were prepared with deionized water and absolute ethanol.
3. 4-fold volume of absolute ethanol was added to Buffer RPE (provided with the kit) and mixed evenly for further use.
4. 10 uL β-mercaptoethanol was taken and added to 990 uL buffer RLT in a fuming cupboard (350 uL mixed solution would be used for each sample), and mixed evenly for further use (please note: it should be prepared just before it will be used for each time of extraction).
5. 550 uL RNase free water was added to DNase I freeze-dried powder (provided with the kit) and turned upside down for 5 times to be mixed evenly, standing for 2 min at room temperature. The obtained liquid was subpackaged (marked as DNase I solution), and preserved in a −20° C. refrigerator for further use, and the freeze-thaw cycles should not exceed 3 times.
6. 10 uL DNase I solution (obtained from step 5) was taken into a RNA enzyme-free EP tube, and then 70 μL buffer RDD was added, and pipetted to be mixed evenly, then placed on ice for further use (marked as a DNase I mixed solution). The solution should be prepared just before it will be used for each time of extraction
7. The sample was taken out of the −80° C. refrigerator, put on an ice and thawed, then the sample was transferred to 1.5 mL RNase-free EP tube together a preserving fluid.
8. 350 uL Buffer RLT containing β-mercaptoethanol (obtained in step 4) was added to the EP tube, vortexed for 30 s, and centrifuged in a flash.
9. 350 uL 70% ethanol was continuously added to the EP tube, vortexed for 30 s, and centrifuged in a flash.
10. 650 uL supernatant was absorbed carefully (please do not absorb the non-lysed tissue fragments), and transferred to an adsorption column (provided with the kit).
11. 14000×g centrifugation was performed for 30 s, and waste fluid in the collecting cannula was discarded.
12. 350 uL Buffer RW1 (provided with the kit) was added to the adsorption column, and 14000×g centrifuged for 30 s, and waste fluid in the collecting cannula was discarded.
13. 80 uL DNase I mixed solution was carefully added to the center of the adsorption column for incubation at room temperature for 20 min.
14. 350 uL Buffer RW1 (provided with the kit) was added to the adsorption column, and 14000×g centrifuged for 30 s, and waste fluid in the collecting cannula was discarded.
15. 500 uL Buffer RPE containing absolute ethanol (obtained in step 3) was added to the adsorption column, and 14000×g centrifuged for 30 s, and waste fluid in the collecting cannula was discarded.
16. 500 uL 80% ethanol (obtained in step 2) was added to the adsorption column, and 14000×g centrifuged for 30 s, and waste fluid in the collecting cannula was discarded.
17. The empty adsorption column was inserted into the collecting cannula for 14000×g centrifugation for 2 min. Then, the collecting cannula was discarded.
18. The adsorption column was inserted into a new 1.5 mL RNase-free EP tube, and the tube was opened and dried in the air for 1 min.
19. 21 μL. RNase Free water was carefully added to the center of the adsorption column for incubation at room temperature for 1 min. 17000×g centrifuged for 2 min to collect a liquid, namely. RNA.
20. 1 μLRNA was taken and quantified by Qubit RNA HS kit. The quantified RNA was stored in a −80° C., refrigerator for further use.

Example 2 RNA Reverse Transcription and cDNA Amplification

1. Experiment preparation: double hands, a pipettor and a super clean bench tabletop were cleaned with an RNA enzyme scavenger and a nucleic acid abluent. Tips free of RNase and nucleic acid contamination, 1.5 mL EP tube and 0.2 mL PCR tube were prepared in the super clean bench, then the ultraviolet light in the super clean bench was turned on for radiation for 30 min (please note that steps 2-11 should be performed in a super clean bench free of RNase and nucleic acid contamination).

2. RNA sample and Lysis Buffer (provided with the kit) were put on ice and thawed, then vortexed, and centrifuged in a flash, before being put on ice for further use.
3. 2 uL RNA was taken and put into a 1.5 mL EP tube for each sample. The RNA sample was diluted with RNase Free water to about 5 ng/uL according to the measured RNA concentration of the sample.
4. 1.5 uL Lysis Buffer and 3.5 uL diluted RNA sample were successively added into the 0.2 mL PCR tube.
5. A reverse transcription negative control (RT-NC) was set as follows: the RNA sample in step 4 was replaced with 3.5 uL RNase Free water.
6. 13.3 uL*(reaction parts+pipetting loss) RT buffer was taken and put into a new 0.2 mL PCR tube. (Volume of each PCR tube was not greater than 50 μL).
7. After a PCR amplifier was preheated, the PCR tubes in steps 4-6 were placed into the PCR amplifier for incubation for 3 min at 72° C.
8. The PCR tube was immediately put on ice for incubation for at least 2 min, and centrifuged in a flash.
9. RT Enzyme Mix (provided with the kit) was taken out of a −20° C. refrigerator, and centrifuged in a flash, where oscillation should be avoided, and placed on the ice for further use.
10. 1.7 uL*(reaction parts+pipetting loss) RT Enzyme Mix was added to RT buffer (step 6) after the incubation at 72° C. The mixed solution was slightly pipetted and mixed evenly, then placed on the ice for further use. The mixture was marked with "RT mix".
11. 15 uL RT mix (step 10) was absorbed and added to the PCR tube (steps 4-5) containing a RNA sample or RT-NC, then slightly pipetted, mixed evenly and centrifuged in a flash, and placed on the ice.
12. The sample was incubated on the preheated PCR amplifier, and conditions were shown in Table 1.

TABLE 1

| Configuration of PCR conditions | | |
| --- | --- | --- |
| Cycle number | Temperature | time |
| 1 | 42° C. | 90 min |
| 10 | 50° C. | 2 min |
|  | 42° C. | 2 min |
| 1 | 70° C. | 15 min |
| 1 | 12° C. | Hold |

13. PCR Mix (provided with the kit) was taken out of the −20° C. refrigerator. The PCR Mix was placed on an ice and thawed, turned upside down and mixed evenly, and centrifuged in a flash, and placed on the ice for further use.
14. 30 μL. PCR Mix was added to each reverse transcription reaction product, slightly pipetted and mixed evenly, and centrifuged in a flash, then placed on the ice for further use.
15. A reverse transcription negative control (RT-NC) was set as follows: the reverse transcription reaction product in step 3 was replaced with 20 uL RNase Free water.
16. The sample was incubated on the preheated PCR amplifier, and conditions were shown in Table 2.

TABLE 2

| PCR reaction conditions | | |
| --- | --- | --- |
| Cycle number | Temperature | time |
| 1 | 98° C. | 3 min |
| 18 | 98° C. | 20 s |
|  | 68° C. | 15 s |
|  | 72° C. | 6 min |
| 1 | 72° C. | 5 min |
|  | 12° C. | Hold |

Remarks: the cycle number of the amplification may be increased and decreased appropriately according to the sample, and the advice for adaptive adjustment was shown in Table 3.

TABLE 3

| Reference cycle number corresponding to different sample sizes | |
| --- | --- |
| Total RNA | Reference cycle number |
| 10-20 ng | 7-8 |
| 1 ng | 11-12 |
| 100 pg | 14-15 |
| 10 pg | 17-18 |

Example 3 Purification of Amplified Products

1. Experiment preparation: be sure that the experiment areas must be different with those of the step of reverse transcription and the step of amplification. Double hands, a pipettor and an experiment tabletop were cleaned with a nucleic acid abluent.
2. 4-fold volume of absolute ethanol was added to Buffer RPE, turned upside down and mixed evenly for further use.
3. A PCR product was placed on an ice for 2 min, then centrifuged in a flash for further use.
4. 250 uL DNA Binding Buffer and 50 uL PCR product were successively added into a 1.5 mL EP tube. Then, the mixed solution was vortexed evenly, and centrifuged in a flash.
5. An adsorption column was inserted into a collecting cannula, and 300 uL mixed solution in step 4 was transferred to the adsorption column.
6. 14000×g centrifugation was performed for 30 s.
7. 200 uL ethanol-containing Wash buffer was added to the adsorption column, and 14000×g centrifugation for 30 s.
8. The step 7 was repeated once, and the waste fluid in the collecting cannula was discarded.
9. The adsorption column was inserted into the collecting cannula and subjected to 14000×g centrifugation for 2 min. Then, the collecting cannula was discarded.
10. The adsorption column was inserted into a new 1.5 ml. EP tube, and opened and dried in the air for 1 min.
11. 30 uL Elution buffer (provided by DNA Clean & Concentrator-5) was carefully added to the center of the adsorption column for incubation at room temperature for 1 min. 17000×g centrifuged for 2 min to collect a liquid, namely, a RNA amplified product.

12. 1 uL RNA was taken and quantified with Qubit DNA HS kit. The negative control RT-NC, which was set during reverse transcription, should has a concentration of less than 2 ng/uL after amplification; and the negative control PCR-NC, which was set during PCR, should has a concentration of less than 0.4 ng/uL after amplification. The cDNA amplification product of the sample should have a concentration of greater than 40 ng/uL. Subsequent sequencing step would be not taken for the RT-NC and PCR-NC.

Example 4 Quality Control of Amplified Products

1 μl purified cDNA amplified product was taken and reasonably diluted for detection. The operating instruction is shown in the High Sensitivity DNA Chip operation manual, and the result is shown in FIG. 1.

In general, the cDNA amplified product of the sample was distributing within 400-10000 bp; the main peak was located at 2000 bp around; as shown in FIG. 1, the cDNA used in the present application was in accordance with quality requirements.

Example 5 Transposition and Library Construction

1. DNA Fragmentation
   (1) A fragmentation buffer solution was taken out from −20° C., and thawed at room temperature, oscillated evenly, standby after centrifuged in a flash. According to the number (N) of samples, the reaction system was shown in Table 4.

TABLE 4

Preparation of a PCR reaction system

| Component | Volume |
| --- | --- |
| Fragmentation buffer solution | 8.5 uL × (N + 1) |
| Fragmentation enzyme | 1 uL × (N + 1) |
| Total volume | 9.5 uL × (N + 1) |

(2) 9.5 uL of the above prepared mixed fragmentation solution respectively was taken and subpackaged into a 0.2 mL PCR tube, and centrifuged in a flash, 0.5 uL (about 10 ng) MALBAC amplification product was taken and respectively added to the PCR tube loaded with 9.5 uL mixed fragmentation solution of the previous step. Then the mixed solution was vortexed and mixed evenly, and centrifuged in a flash.

(3) The prepared reaction system was put in a PCR amplifier; "On, 105° C." was selected for a "heated lid", then the heated lid was screwed down, and the reaction procedure was shown in Table 5.

TABLE 5

PCR reaction procedure

| Cycle number | Temperature | time |
| --- | --- | --- |
| 1 | 55° C. | 10 min |
|   | 10° C. | Hold |

2. Library Enrichment
   (1) An amplification buffer solution was taken out from −20° C., and thawed at room temperature, oscillated evenly, and standby after centrifuged in a flash. According to the number (N) of samples, the reaction system was shown in Table 6.

TABLE 6

PCR reaction system

| Component | Volume |
| --- | --- |
| Amplification buffer solution | 11.5 uL × (N + 1) |
| Amplification enzyme | 0.5 uL × (N + 1) |
| Total volume | 12 uL × (N + 1) |

(2) The mixed solution was vortexed and mixed well, and centrifuged in a flash.
   (3) 12 uL of the each above prepared mixed amplification solution was respectively taken and added to the fragmented product in "step 1.1", 3 uL tag primer was added to the above reaction system respectively, vortexed, mixed well, and centrifuged in a flash.
   (4) The serial number of the tag primer corresponding to each sample was recorded (note: there were 24 tag primers; one tag primer was added to each reaction, and samples in a same running batch should have different, unduplicated tag primer).
   (5) The prepared reaction system was put in a PCR amplifier; "On, 105° C." was selected for a "heated lid", then the lid was screwed down, and the reaction procedure was shown in Table 7.

TABLE 7

PCR reaction procedure

| Cycle number | Temperature | time |
| --- | --- | --- |
| 1 | 72° C. | 3 min |
| 1 | 98° C. | 30 s |
| 12 | 98° C. | 15 s |
|   | 60° C. | 30 s |
|   | 72° C. | 3 min |
| 1 | 72° C. | 5 min |
| 1 | 4° C. | Hold |

3. Library Purification
   (1) Magnetic beads were taken out from 4° C., and placed at room temperature, and balanced to room temperature. Magnetic beads were vortexed for 20 s to be thoroughly blended into a homogeneous solution.
   (2) 20 uL of each constructed library was placed to a new 1.5 mL centrifugal tube respectively, and 0.6× resuspended magnetic beads were respectively added (for example: if the initial library had a volume of 20 uL, 12 uL magnetic beads were added), vortexed evenly, and centrifuged in a flash, standing for 5 min at room temperature.
   (3) Centrifugation in a flash: the centrifugal tube was put on a magnetic frame such that magnetic beads were separated from supernate for about 5 min, the solution was clear, the centrifugal tube was kept on the magnetic frame, and a tube cap was carefully opened to prevent liquid spill, then supernate was carefully transferred to a new 1.5 mL centrifugal tube (note not to absorb the magnetic beads), and then the magnetic beads were discarded (note not to discard the supernate).
   (4) resuspended magnetic beads of a volume of 0.15× the volume of the initial library were added into the supernate (for example: if the initial library had a volume of 20 uL, 3 uL magnetic beads were added), vortexed, mixed evenly, and centrifuged in a flash, standing for 5 min at room temperature.
(5) The centrifugal tube was put on the magnetic frame such that the magnetic beads were separated from the supernate, about 5 min later, the liquid became clear, then the supernate was carefully absorbed and discarded (note to not discard and pipet the magnetic beads).
(6) The centrifugal tube was continuously kept fixed on the magnetic frame; about 200 uL of freshly prepared 80% ethanol was added to the centrifugal tube (note: ethanol was carefully added along with the tube wall to prevent the magnetic beads being scattered, thus ensuring that the magnetic beads were soaked by ethanol), put at room temperature for 30 s, then supernate was carefully removed.
(7) The previous step was repeated once.
(8) The centrifugal tube was kept fixed on the magnetic frame, standing for 10 min around at room temperature, such that ethanol fully volatilized.
(9) The centrifugal tube was taken out of the magnetic frame, and added to 17.5 uL eluent, vortexed to completely resuspend the magnetic beads, then centrifuged in a flash, and placed at room temperature for 5 min: the centrifugal tube was put to the magnetic frame such that the magnetic beads were separated from the liquid, about 5 min later, the solution was clear, 15 uL supernate was absorbed carefully into a new centrifugal tube (note to not absorb the magnetic beads), and preserved at −20° C.

4. Library Quality Control

The purified library may be quantified respectively with a Qubit dsDNA HS Assay Kit, and the concentration was generally more than 5 ng/ul (to obtain a high-quality sequencing result, real-time quantitative PCR may be carried out for qualification).

Example 6 Sequencing Run

Referring the instruction of the Illumina test kit for experimental procedures. Sequencing strategy: both single-ended or double-ended manners were available, with a read length of greater than 45 nt, and 2.5 million reads being ensured.

Example 7 Data Processing Steps

Figure 2:
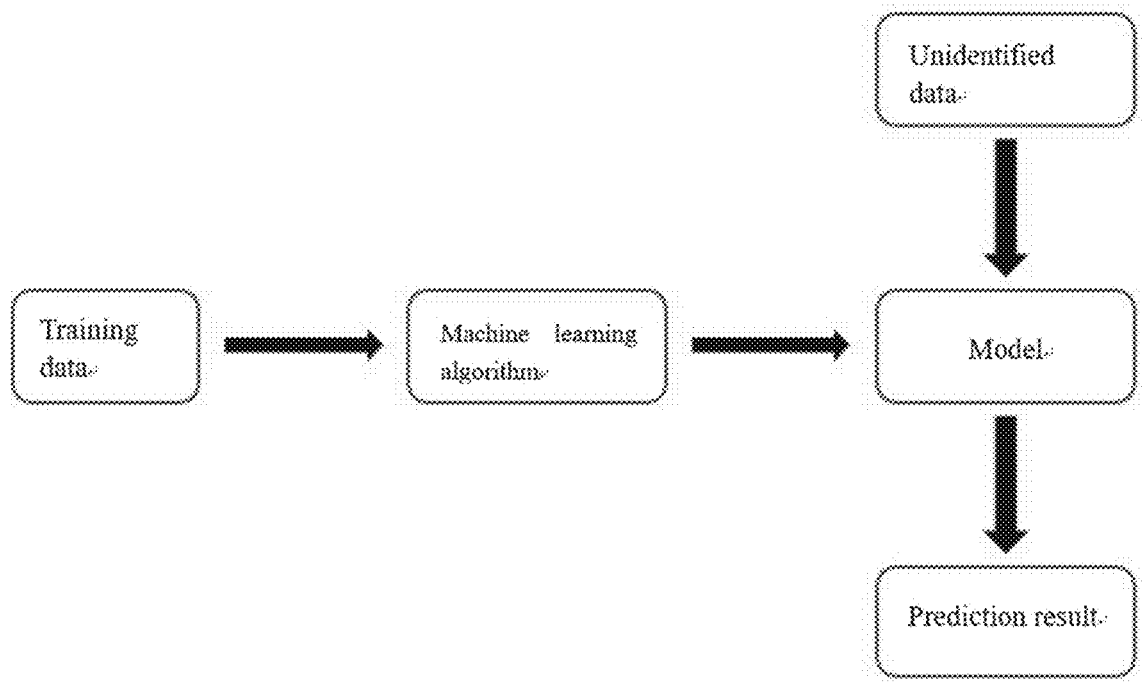
FIG. 2 depicts an overview of the process of the supervised learning method used in Example 7 of the present invention.

Expression profiles of samples from volunteers with definite clinical outcomes served as training data, and an analysis model was constructed by means of machine learning. Afterwards, position data was input, and the analysis model was used for pre-determination specifically as follows:

1. A supervised learning method (as shown in FIG. 2) was employed, and the "training data" used therein have a label, which is an expression profile feature of an endometrial tissue, a uterine fluid or other reproductive endocrinology-related body fluids or exfoliations under different receptivity statuss.

2. Grouping standards for determining "training data" or known as a "training set" in the model are as follows: different healthy Chinese females in natural cycles without past medical history or primary infertility, and having a body mass index within 19-25 kg/m$^2$. After acquiring RNA-seq data of the three labels. FPKM is used for the normalization by gene length and sequencing depth to exclude the impact of sequencing depth. Via the normalization process, the expression levels of different genes from (a plurality of) samples with different labels was compared, thus analyzing the differential expression of the genes, specifically as follows: all the genes with FPKM>0 of each sample are found, and intersections of the differently expressed genes between the "pre-receptivity period" vs. the "receptivity period", the "pre-receptivity period" vs. the "post-receptivity period", and the "receptivity period" vs. the "post-receptivity period" are screened out from all genes that belong to the training set samples with FPKM>0 (any gene satisfying p_value<0.05 and Fold_change>2 or Fold_change<0.5 meets the selection criteria), thus obtaining 12734 differentially expressed genes, including, ENSG00000000003. ENSG00000104881, ENSG00000128928, ENSG00000151116, ENSG00000171222, ENSG00000198961, ENSG00000261732, ENSG00000000419, ENSG00000104883. ENSG00000128944, ENSG00000151117, ENSG00000171223, ENSG00000198963, ENSG00000261740, ENSG00000000457, ENSG00000104886, ENSG00000128951, ENSG00000151131, ENSG00000171224, ENSG00000198964, ENSG00000261760, and the like. The codes of the above genes solely and determinately corresponds to the genes in NCBI database (https://www.ncbi.nlm.nih.gov/). There is no more detailed description herein to limit the length of the specification, despite the numerous differentially expressed genes that have been obtained.

Figure 3:
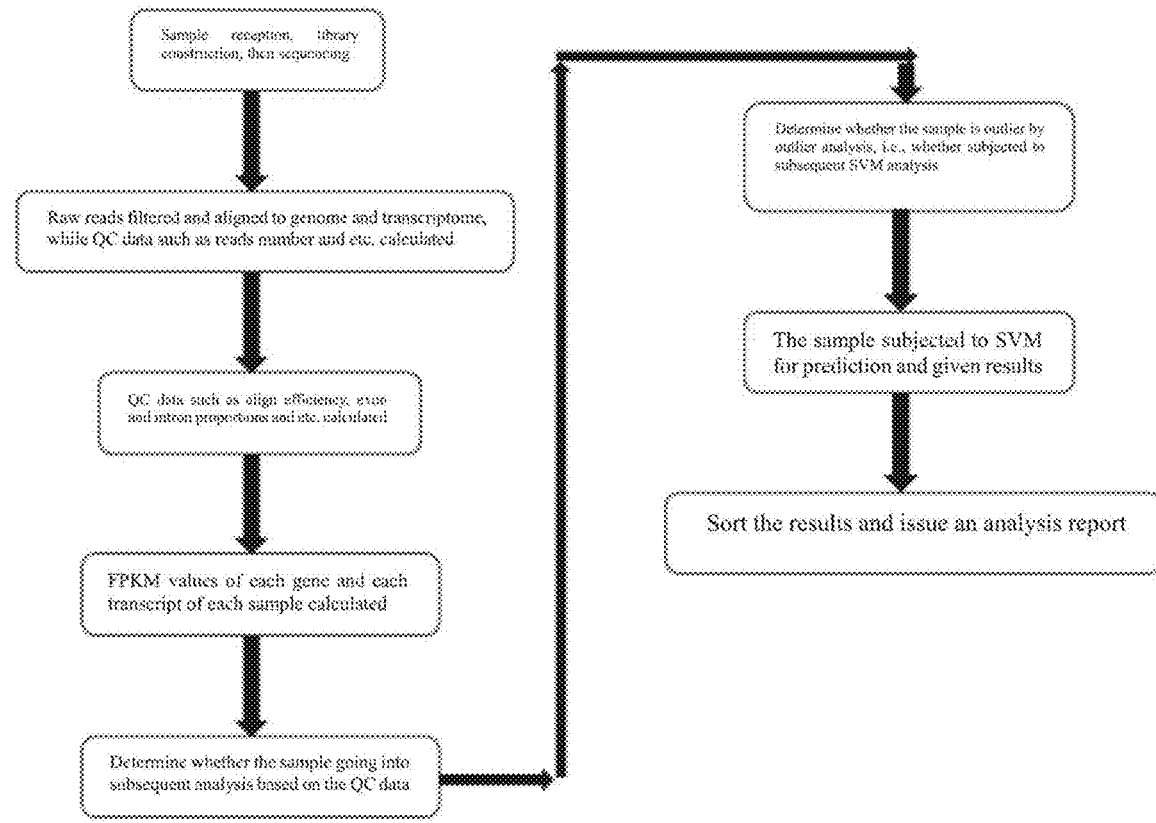
FIG. 3 depicts a flow diagram of data processing in Example 7 of the present invention.

3. In the supervised learning of the present invention, a model was constructed by using training data labeled with an pre-receptivity period, a receptivity window period and a post-receptivity period. The model obtained via training may be utilized to predict a receptivity status of unknown data (referring to a new sample). For example, a uterine fluid expression profile from a case was newly input, and the machine learning model was used to determine the receptivity status of the sample (as shown in FIG. 3).

4. SVM was used, and samples corresponding to the labels in 3 served as an input variable for training set construction. The script is as follows:

```
library(e1071)
svm.model<-svm(data.class~.,data4,kernel='linear')
summary(svm.model)
table(data$class,predict(svm.model,data4,type="data.class"))
mydata=read.table(file.choose( ),header=T,row.names=1)
mydata2=log2(mydata+1)
predict(svm.model,mydata2)
```

-continued

```
table(shdata3$shdata.class,predict(svm.model,shdata3,type="shdata.class"))
table(testdata$data.class,predict(svm.model,testdata,type="data.class"))
shdata=read.table(file.choose( ),header=T,row.names=1)
shdata2=log2(shdata[,-length(shdata[1,])]+1)
shdata3=data.frame(shdata2,shdata$class)
predict(svm.model,shdata3)
table(shdata3$shdata.class,predict(svm.model,shdata3,type="shdata.class"));
```

Figure 4:
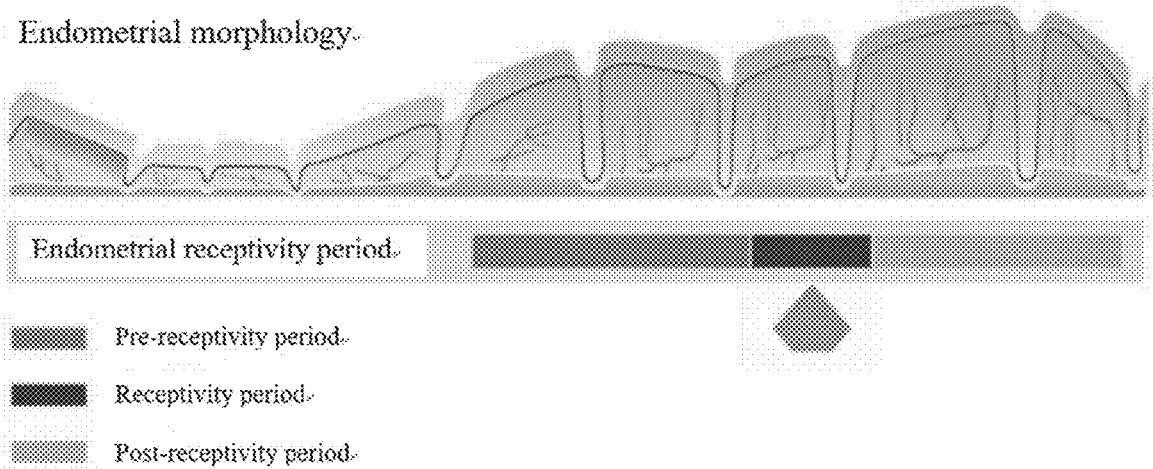
FIG. 4 depicts a schematic diagram showing the results after detection of patients in Example 7 of the present invention.
Figure 5:
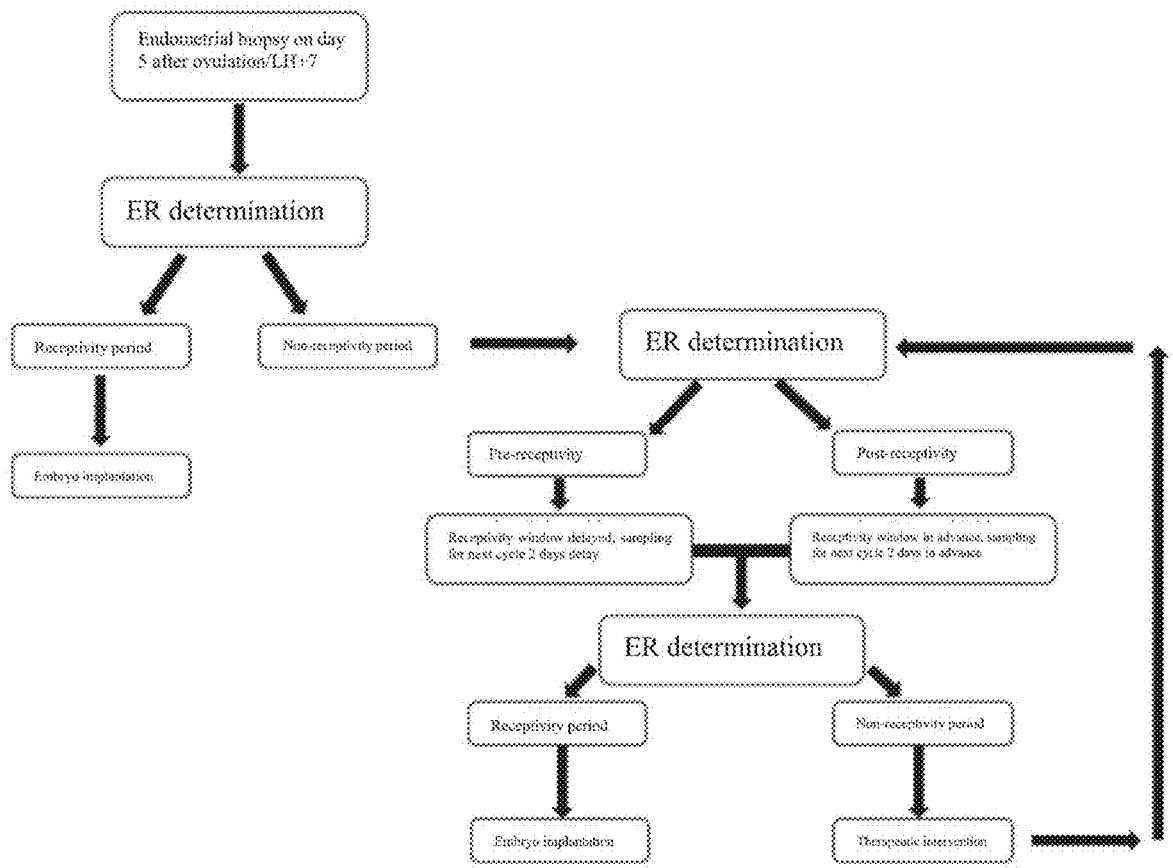
FIG. 5 depicts a diagram showing the detection mode of subjects in Example 7 of the present invention.

5. According to the result of the SVM, a receptivity status of an unknown sample was defined to determine the endometrial receptivity of the sample, and embryo implantation (as shown in FIG. 4) was directed according to the receptivity status. To obtain a good pregnancy outcome, the sampling time may be adjusted for many times in several cycles, and receptivity test was performed (as shown in FIG. 5).

Example 8 Clinical Verification

Different infertile individuals aged from 23 to 39 were selected as objects, and the analysis model constructed in the present invention was used for prediction. Based on the result of the SVM, an unknown sample receptivity status was defined to determine the endometrial receptivity of the sample. The embryo implantation was directed based on the receptivity status, and pregnancy outcomes were recorded, and the results were shown in Tables 8-1, 8-2 and 8-3.

Table 8-1 Model Prediction and Pregnancy Outcomes

TABLE 8-1

Model prediction and pregnancy outcomes

| Period of sample | Type of sample | Patient ID | Age | Past history | Type of infertility | RNA concentration | cDNA concentration | Dna size(rends) | Unique Mapping Ratio | Exon proportion | SVM classification | Implantation method | Pregnancy outcome |
|---|---|---|---|---|---|---|---|---|---|---|---|---|---|
| LH+7 period | uterine fluid | 1 | 31 | None | Secondary infertility | 0 | 81.2 | 10,635,198 | 34.29% | 55.02% | Receptivity period | Blastocyst implantation during "receptivity period" of the next cycle | IVF-ET Pregnant |
| LH+7 period | Endometrial tissue | | 3 | None | Secondary infertility | 0 | 64.6 | 8,984,513 | 18.95% | 51.74% | Receptivity period | Blastocyst implantation during "receptivity period" of the next cycle | IVF-ET Pregnant |
| LH+5 period | uterine fluid | 2 | 28 | None | Secondary infertility | 0 | 39.6 | 7,366,229 | 41.21% | 48.53% | Pre-receptivity period | Blastocyst implantation during "receptivity period" of the next cycle | IVF-ET Pregnant |
| LH+5 period | Endometrial tissue | | 28 | None | Secondary infertility | 160 | 53.6 | 5,864,724 | 48.09% | 46.53% | Pre-receptivity period | Blastocyst implantation during "receptivity period" of the next cycle | IVF-ET Pregnant |
| LH+7 period | uterine fluid | | 28 | None | Secondary infertility | 0 | 24 | 8,367,228 | 44.23% | 61.19% | Receptivity period | Blastocyst implantation during "receptivity period" of the next cycle | IVF-ET Pregnant |
| LH+7 period | Endometrial tissue | | 28 | None | Secondary infertility | 112 | 81.6 | 4,946,105 | 48.01% | 73.22% | Receptivity period | Blastocyst implantation during "receptivity period" of the next cycle | IVF-ET Pregnant |
| LH+9 period | uterine fluid | | 28 | None | Secondary infertility | 0 | 84.4 | 5,399,853 | 51.69% | 64.63% | Post-receptivity period | Blastocyst implantation during "receptivity period" of the next cycle | IVF-ET Pregnant |
| LH+9 period | Endometrial tissue | | 28 | None | Secondary infertility | 144 | 64.2 | 6,052,718 | 52.06% | 59.22% | Post-receptivity period | Blastocyst implantation during "receptivity period" of the next cycle | IVF-ET Pregnant |
| LH+5 period | uterine fluid | 3 | 27 | None | Secondary infertility | 7.82 | 67.2 | 6,066,330 | 48.59% | 54.52% | Pre-receptivity period | Blastocyst implantation during "receptivity period" of the next cycle | IVF-ET Pregnant |
| LH+5 period | Endometrial tissue | | 27 | None | Secondary infertility | 148 | 79.8 | 4,835,997 | 53.56% | 57.55% | Pre-receptivity period | Blastocyst implantation during "receptivity period" of the next cycle | IVF-ET Pregnant |
| LH+7 period | uterine fluid | | 27 | None | Secondary infertility | 18.6 | 54.4 | 6,692,290 | 45.46% | 53.71% | Receptivity period | Blastocyst implantation during "receptivity period" of the next cycle | IVF-ET Pregnant |
| LH+7 period | Endometrial tissue | | 27 | None | Secondary infertility | 178 | 44 | 5,245,452 | 57.68% | 60.35% | Receptivity period | Blastocyst implantation during "receptivity period" of the next cycle | IVF-ET Pregnant |
| LH+9 period | uterine fluid | | 27 | None | Secondary infertility | 21.6 | 55.2 | 5,504,474 | 48.84% | 64.59% | Post-receptivity period | Blastocyst implantation during "receptivity period" of the next cycle | IVF-ET Pregnant |
| LH+9 period | Endometrial tissue | | 27 | None | Secondary infertility | 192 | 104 | 5,097,609 | 59.37% | 60.50% | Post-receptivity period | Blastocyst implantation during "receptivity period" of the next cycle | IVF-ET Pregnant |
| LH+5 period | uterine fluid | 4 | 27 | None | Secondary infertility | 24.8 | 53 | 5,010,066 | 51.13% | 62.53% | Pre-receptivity period | Blastocyst implantation during "receptivity period" of the next cycle | IVF-ET Pregnant |
| LH+5 period | Endometrial tissue | | 27 | None | Secondary infertility | 120 | 63.6 | 4,624,497 | 52.66% | 65.58% | Pre-receptivity period | Blastocyst implantation during "receptivity period" of the next cycle | IVF-ET Pregnant |
| LH+7 period | uterine fluid | | 27 | None | Secondary infertility | 58 | 66.2 | 7,024,178 | 40.36% | 50.83% | Receptivity period | Blastocyst implantation during "receptivity period" of the next cycle | IVF-ET Pregnant |
| LH+7 period | Endometrial tissue | | 27 | None | Secondary infertility | 128 | 57 | 5,925,818 | 51.38% | 59.36% | Receptivity period | Blastocyst implantation during "receptivity period" of the next cycle | IVF-ET Pregnant |
| LH+9 period | uterine fluid | | 27 | None | Secondary infertility | 4 | 48 | 7,736,758 | 24.26% | 42.32% | Post-receptivity period | Blastocyst implantation during "receptivity period" of the next cycle | IVF-ET Pregnant |
| LH+9 period | Endometrial tissue | | 27 | None | Secondary infertility | 110 | 24.6 | 6,400,251 | 37.20% | 42.50% | Post-receptivity period | Blastocyst implantation during "receptivity period" of the next cycle | IVF-ET Pregnant |
| LH+5 period | uterine fluid | 5 | 31 | None | Secondary infertility | 162 | 92 | 5,492,542 | 54.88% | 69.15% | Pre-receptivity period | Blastocyst implantation during "receptivity period" of the next cycle | IVF-ET Pregnant |
| LH+5 period | Endometrial tissue | | 31 | None | Secondary infertility | 102 | 112 | 5,259,137 | 52.54% | 74.39% | Pre-receptivity period | Blastocyst implantation during "receptivity period" of the next cycle | IVF-ET Pregnant |

TABLE 8-1-continued

Model prediction and pregnancy outcomes

| Period of sample | Type of sample | Patient ID | Age | Past history | Type of infertility | RNA concentration | cDNA concentration | Dna size(rends) | Unique Mapping Ratio | Exon proportion | SVM classification | Implantation method | Pregnancy outcome |
|---|---|---|---|---|---|---|---|---|---|---|---|---|---|
| LH+7 period | uterine fluid | | 31 | None | Secondary infertility | 176 | 92 | 6,832,561 | 55.13% | 66.40% | Receptivity period | Blastocyst implantation during "receptivity period" of the next cycle | IVF-ET Pregnant |
| LH+7 period | Endometrial tissue | | 31 | None | Secondary infertility | 124 | 61 | 7,302,798 | 49.80% | 55.48% | Receptivity period | Blastocyst implantation during "receptivity period" of the next cycle | IVF-ET Pregnant |
| LH+9 period | uterine fluid | | 31 | None | Secondary infertility | 16.1 | 38 | 6,575,280 | 18.98% | 49.14% | Post-receptivity period | Blastocyst implantation during "receptivity period" of the next cycle | IVF-ET Pregnant |
| LH+9 period | Endometrial tissue | | 31 | None | Secondary infertility | 194 | 106 | 5,454,770 | 50.00% | 73.46% | Post-receptivity period | Blastocyst implantation during "receptivity period" of the next cycle | IVF-ET Pregnant |
| LH+5 period | uterine fluid | 6 | 30 | None | Secondary infertility | 104 | 106 | 4,510,704 | 50.58% | 72.62% | Pre-receptivity period | Blastocyst implantation during "receptivity period" of the next cycle | IVF-ET Pregnant |
| LH+5 period | Endometrial tissue | | 30 | None | Secondary infertility | 96.4 | 98.6 | 7,068,301 | 50.58% | 63.75% | Pre-receptivity period | Blastocyst implantation during "receptivity period" of the next cycle | IVF-ET Pregnant |
| LH+7 period | uterine fluid | | 30 | None | Secondary infertility | 0 | 27 | 4,745,513 | 46.00% | 52.70% | Receptivity period | Blastocyst implantation during "receptivity period" of the next cycle | IVF-ET Pregnant |
| LH+7 period | Endometrial tissue | | 30 | None | Secondary infertility | 62.6 | 54.6 | 6,945,542 | 50.85% | 70.00% | Receptivity period | Blastocyst implantation during "receptivity period" of the next cycle | IVF-ET Pregnant |
| LH+9 period | uterine fluid | | 30 | None | Secondary infertility | 26 | 108 | 5,036,149 | 52.55% | 68.81% | Post-receptivity period | Blastocyst implantation during "receptivity period" of the next cycle | IVF-ET Pregnant |
| LH+9 period | Endometrial tissue | | 30 | None | Secondary infertility | 92 | 52.2 | 5,811,641 | 54.20% | 68.86% | Post-receptivity period | Blastocyst implantation during "receptivity period" of the next cycle | IVF-ET Pregnant |
| 3 days after ovulation | uterine fluid | 7 | 26 | None | Secondary infertility | 0 | 45.8 | 8,957,163 | 33.84% | 53.31% | Pre-receptivity period | Blastocyst implantation during "receptivity period" of the next cycle | IVF-ET Pregnant |
| 3 days after ovulation | Endometrial tissue | | 26 | None | Secondary infertility | 102 | 97.2 | 5,236,557 | 51.96% | 68.43% | Pre-receptivity period | Blastocyst implantation during "receptivity period" of the next cycle | IVF-ET Pregnant |
| 5 days after ovulation | uterine fluid | | 26 | None | Secondary infertility | 9 | 76.2 | 6,488,926 | 40.60% | 60.14% | Receptivity period | Blastocyst implantation during "receptivity period" of the next cycle | IVF-ET Pregnant |
| 5 days after ovulation | Endometrial tissue | | 26 | None | Secondary infertility | 93 | 102 | 4,371,220 | 55.12% | 65.24% | Receptivity period | Blastocyst implantation during "receptivity period" of the next cycle | IVF-ET Pregnant |
| 7 days after ovulation | uterine fluid | | 26 | None | Secondary infertility | 11 | 120 | 5,166,478 | 53.26% | 64.20% | Post-receptivity period | Blastocyst implantation during "receptivity period" of the next cycle | IVF-ET Pregnant |
| 7 days after ovulation | Endometrial tissue | | 26 | None | Secondary infertility | 176 | 106 | 4,435,202 | 50.36% | 70.49% | Post-receptivity period | Blastocyst implantation during "receptivity period" of the next cycle | IVF-ET Pregnant |

TABLE 8-2

Model prediction and pregnancy outcomes

| Period | Sample | | | | Infertility | | | | | | | Receptivity | Outcome prediction | Result |
|---|---|---|---|---|---|---|---|---|---|---|---|---|---|---|
| LH+5 period | uterine fluid | 8 | 24 | None | Secondary infertility | 23 | 60.2 | 6,717,074 | 53.46% | 70.38% | Pre-receptivity period | Blastocyst implantation during "receptivity period" of the next cycle | IVF-ET Pregnant |
| LH+5 period | Endometrial tissue | | 24 | None | Secondary infertility | 80 | 106 | 6,729,719 | 51.11% | 68.10% | Pre-receptivity period | Blastocyst implantation during "receptivity period" of the next cycle | IVF-ET Pregnant |
| LH+7 period | uterine fluid | | 24 | None | Secondary infertility | 12 | 112 | 5,748,132 | 45.64% | 77.99% | Receptivity period | Blastocyst implantation during "receptivity period" of the next cycle | IVF-ET Pregnant |
| LH+7 period | Endometrial tissue | | 24 | None | Secondary infertility | 62 | 54 | 5,034,379 | 50.65% | 73.17% | Receptivity period | Blastocyst implantation during "receptivity period" of the next cycle | TVF-ET Pregnant |
| LH+9 period | uterine fluid | | 24 | None | Secondary infertility | 0 | 5.24 | 4,747,475 | 29.68% | 41.57% | Post-receptivity period | Blastocyst implantation during "receptivity period" of the next cycle | IVF-ET Pregnant |
| LH+9 period | Endometrial tissue | | 24 | None | Secondary infertility | 76 | 118 | 4,889,057 | 52.01% | 65.77% | Post-receptivity period | Blastocyst implantation during "receptivity period" of the next cycle | IVF-ET Pregnant |
| 3 days after ovulation | uterine fluid | 9 | 32 | None | Secondary infertility | 0 | 8.64 | 6,066,330 | 48.59% | 54.52% | Pre-receptivity period | Blastocyst implantation during "receptivity period" of the next cycle | IVF-ET Pregnant |
| 3 days after ovulation | Endometrial tissue | | 32 | None | Secondary infertility | 138 | 65 | 4,835,997 | 53.56% | 57.55% | Pre-receptivity period | Blastocyst implantation during "receptivity period" of the next cycle | IVF-ET Pregnant |
| 5 days after ovulation | uterine fluid | | 32 | None | Secondary infertility | 0 | 32.6 | 8,596,785 | 48.20% | 54.40% | Receptivity period | Blastocyst implantation during "receptivity period" of the next cycle | IVF-ET Pregnant |
| 5 days after ovulation | Endometrial tissue | | 32 | None | Secondary infertility | 108 | 61 | 6,137,031 | 45.00% | 70.90% | Receptivity period | Blastocyst implantation during "receptivity period" of the next cycle | IVF-ET Pregnant |
| 7 days after ovulation | uterine fluid | | 32 | None | Secondary infertility | 16 | 69.2 | 6,923,122 | 33.20% | 47.80% | Post-receptivity period | Blastocyst implantation during "receptivity period" of the next cycle | IVF-ET Pregnant |
| 7 days after ovulation | Endometrial tissue | | 32 | None | Secondary infertility | 112 | 70 | 7,662,447 | 44.80% | 45.60% | Post-receptivity period | Blastocyst implantation during "receptivity period" of the next cycle | IVF-ET Pregnant |
| 3 days after ovulation | uterine fluid | 10 | 28 | None | Secondary infertility | Not tested | 61.4 | 6118576 | 60.00% | 44.00% | Pre-receptivity period | Blastocyst implantation during "receptivity period" of the next cycle | IVF-ET Pregnant |
| 3 days after ovulation | Endometrial tissue | | 28 | None | Secondary infertility | Not tested | 65.6 | 1242191 | 79.00% | 42.00% | Pre-receptivity period | Blastocyst implantation during "receptivity period" of the next cycle | IVF-ET Pregnant |
| 5 days after ovulation | uterine fluid | | 28 | None | Secondary infertility | Not tested | 12.1 | 7487618 | 33.00% | 54.00% | Receptivity period | Blastocyst implantation during "receptivity period" of the next cycle | IVF-ET Pregnant |
| 5 days after ovulation | Endometrial tissue | | 28 | None | Secondary infertility | Not tested | 87.6 | 4935389 | 64.00% | 59.00% | Receptivity period | Blastocyst implantation during "receptivity period" of the next cycle | IVF-ET Pregnant |
| 7 days after ovulation | uterine fluid | | 28 | None | Secondary infertility | Not tested | 84.8 | 5031336 | 51.00% | 70.00% | Post-receptivity period | Blastocyst implantation during "receptivity period" of the next cycle | IVF-ET Pregnant |
| 7 days after ovulation | Endometrial tissue | | 28 | None | Secondary infertility | Not tested | 97.4 | 4466278 | 52.00% | 79.00% | Post-receptivity period | Blastocyst implantation during "receptivity period" of the next cycle | IVF-ET Pregnant |
| LH+5 period | uterine fluid | 11 | 23 | None | Secondary infertility | 5.42 | 53.2 | 1030614238 | 27.99% | 45.44% | Pre-receptivity period | Blastocyst implantation during "receptivity period" of the next cycle | IVF-ET Pregnant |
| LH+5 period | Endometrial tissue | | 23 | None | Secondary infertility | 140 | 42.2 | 8894452.94 | 18.79% | 40.80% | Pre-receptivity period | Blastocyst implantation during "receptivity period" of the next cycle | IVF-ET Pregnant |
| LH+7 period | uterine fluid | | 23 | None | Secondary infertility | 0 | 8.3 | 11607721.67 | 30.75% | 42.58% | Receptivity period | Blastocyst implantation during "receptivity period" of the next cycle | IVF-ET Pregnant |
| LH+7 period | Endometrial tissue | | 23 | None | Secondary infertility | 200 | 65.8 | 7819291.1 | 46.56% | 50.93% | Receptivity period | Blastocyst implantation during "receptivity period" of the next cycle | IVF-ET Pregnant |
| LH+9 period | uterine fluid | | 23 | None | Secondary infertility | 0 | 8.3 | 9499864.001 | 13.23% | 30.40% | Post-receptivity period | Blastocyst implantation during "receptivity period" of the next cycle | IVF-ET Pregnant |

TABLE 8-2-continued

| | | | | | | | | | Model prediction and pregnancy outcomes | | | | |
|---|---|---|---|---|---|---|---|---|---|---|---|---|---|
| LH+9 period | Endometrial tissue | | 23 | None | Secondary infertility | 200 | 65.8 | 9538610.054 | 31.48% | 40.92% | Post-receptivity period | Blastocyst implantation during "receptivity period" of the next cycle | IVF-ET Pregnant |
| 3 days after ovulation | uterine fluid | 12 | 24 | None | Secondary infertility | 52 | 64.6 | 6209003.013 | 34.09% | 46.83% | Pre-receptivity period | Blastocyst implantation during "receptivity period" of the next cycle | IVF-ET Pregnant |
| 3 days after ovulation | Endometrial tissue | | 24 | None | Secondary infertility | 128 | 100 | 6754515.311 | 54.35% | 47.66% | Pre-receptivity period | Blastocyst implantation during "receptivity period" of the next cycle | IVF-ET Pregnant |
| 5 days after ovulation | Endometrial tissue | | 24 | None | Secondary infertility | 172 | 2.54 | 6452089.985 | 54.22% | 46.37% | Receptivity period | Blastocyst implantation during "receptivity period" of the next cycle | IVF-ET Pregnant |
| 7 days after ovulation | uterine fluid | | 24 | None | Secondary infertility | 23.8 | 91 | 6056181.926 | 40.70% | 54.66% | Post-receptivity period | Blastocyst implantation during "receptivity period" of the next cycle | IVF-ET Pregnant |
| 3 days after ovulation | uterine fluid | 13 | 34 | None | Secondary infertility | 0 | 1.91 | 5642094 | 49.50% | 66.80% | Pre-receptivity period | Blastocyst implantation during "receptivity period" of the next cycle | IVF-ET Pregnant |
| 5 days after ovulation | uterine fluid | | 34 | None | Secondary infertility | 0 | 6.5 | 4608218 | 44.00% | 57.90% | Receptivity period | Blastocyst implantation during "receptivity period" of the next cycle | IVF-ET Pregnant |
| 5 days after ovulation | Endometrial tissue | | 34 | None | Secondary infertility | 244 | 44 | 4095698 | 37.10% | 84.10% | Receptivity period | Blastocyst implantation during "receptivity period" of the next cycle | IVF-ET Pregnant |
| 7 days after ovulation | uterine fluid | | 34 | None | Secondary infertility | 0 | 42.2 | 4648207 | 52.10% | 74.60% | Post-receptivity period | Blastocyst implantation during "receptivity period" of the next cycle | IVF-ET Pregnant |
| 7 days after ovulation | Endometrial tissue | | 34 | None | Secondary infertility | 92.8 | 74.4 | 2718053 | 50.80% | 81.90% | Post-receptivity period | Blastocyst implantation during "receptivity period" of the next cycle | IVF-ET Pregnant |
| 3 days after ovulation | uterine fluid | 14 | 26 | None | Secondary infertility | 0 | 18.1 | 5502959 | 32.30 | 61.80 | Pre-receptivity period | Blastocyst implantation during "receptivity period" of the next cycle | IVF-ET Pregnant |
| 5 days after ovulation | uterine fluid | | 26 | None | Secondary infertility | 26 | 39.4 | 2462886 | 39.70% | 74.30% | Receptivity period | Blastocyst implantation during "receptivity period" of the next cycle | IVF-ET Pregnant |
| 5 days after ovulation | Endometrial tissue | | 26 | None | Secondary infertility | 194 | 20.6 | 3239263 | 31.90% | 69.80% | Receptivity period | Blastocyst implantation during "receptivity period" of the next cycle | IVF-ET Pregnant |
| 7 days after ovulation | uterine fluid | | 26 | None | Secondary infertility | 9.14 | 84.2 | 2418597 | 51.90% | 82.80% | Post-receptivity period | Blastocyst implantation during "receptivity period" of the next cycle | IVF-ET Pregnant |
| 7 days after ovulation | Endometrial tissue | | 26 | None | Secondary infertility | 118 | 55.8 | 2896012 | 46.70% | 82.10% | Post-receptivity period | Blastocyst implantation during "receptivity period" of the next cycle | IVF-ET Pregnant |

TABLE 8-3

| | | | | | | | | | | | | Model prediction and pregnancy outcomes | | |
|---|---|---|---|---|---|---|---|---|---|---|---|---|---|---|
| 3 days after ovulation | uterine fluid | 15 | 27 | None | Obstructive azoospermia (the man) | 0 | 1.6 | 7674189 | 47.90% | 72.00% | Pre-receptivity period | Blastocyst implantation during "receptivity period" of the next cycle | IVF-ET Pregnant |
| 5 days after ovulation | uterine fluid | | 27 | None | Obstructive azoospermia (the man) | 0 | 3.12 | 6385459 | 43.20% | 62.30% | Receptivity period | Blastocyst implantation during "receptivity period" of the next cycle | IVF-ET Pregnant |
| 5 days after ovulation | Endometrial tissue | | 27 | None | Obstructive azoospermia (the man) | 292 | 58.2 | 5134139 | 39.20% | 81.80% | Receptivity period | Blastocyst implantation during "receptivity period" of the next cycle | IVF-ET Pregnant |
| 7 days after ovulation | uterine fluid | | 27 | None | Obstructive azoospermia (the man) | 0 | 89.4 | 5397661 | 54.30% | 78.90% | Post-receptivity period | Blastocyst implantation during "receptivity period" of the next cycle | IVF-ET Pregnant |
| 7 days after ovulation | Endometrial tissue | | 27 | None | Obstructive azoospermia (the man) | 120 | 59.6 | 3801143 | 39.20% | 86.00% | Post-receptivity period | Blastocyst implantation during "receptivity period" of the next cycle | IVF-ET Pregnant |
| LH+7 period | uterine fluid | 16 | 33 | Secondary infertility, SEM after monitored ovulation in other hospital | Secondary infertility | 31 | 73.8 | 6103341 | 42.83% | 56.87% | Receptivity period | Blastocyst implantation during "receptivity period" of the next cycle | IVF-ET Pregnant |
| LH+7 period | Endometrial tissue | | 33 | Secondary infertility, SEM after monitored ovulation in other hospital | Secondary infertility | 138 | 76 | 5327655 | 54.95% | 49.84% | Receptivity period | Blastocyst implantation during "receptivity period" of the next cycle | IVF-ET Pregnant |
| LH+9 period | uterine fluid | | 33 | Secondary infertility, SEM after monitored ovulation in other hospital | Secondary infertility | 15.8 | 65.4 | 7449101 | 7.13% | 32.69% | Post-receptivity period | Blastocyst implantation during "receptivity period" of the next cycle | IVF-ET Pregnant |
| LH+9 period | Endometrial tissue | | 33 | Secondary infertility, SEM after monitored ovulation in other hospital | Secondary infertility | 140 | 23.6 | 4995230 | 59.81% | 47.10% | Post-receptivity period | Blastocyst implantation during "receptivity period" of the next cycle | IVF-ET Pregnant |

TABLE 8-3-continued

| | | | | | Model prediction and pregnancy outcomes | | | | | | |
|---|---|---|---|---|---|---|---|---|---|---|---|
| 3 days after ovulation | 17 | 39 | None | Secondary infertility | 5.88 | 59.2 | 4092431 | 60.50% | 77.00% | Pre-receptivity period | Blastocyst implantation during "receptivity period" of the next cycle | IVF-ET Pregnant |
| 5 days after ovulation | | 39 | None | Secondary infertility | 0 | 8.96 | 3696035 | 33.40% | 75.80% | Receptivity period | Blastocyst implantation during "receptivity period" of the next cycle | IVF-ET Pregnant |
| 7 days after ovulation | | 39 | None | Secondary infertility | 6.08 | 29.6 | 3563590 | 31.80% | 70.30% | Post-receptivity period | Blastocyst implantation during "receptivity period" of the next cycle | IVF-ET Pregnant |
| 7 days after ovulation | | 39 | None | Endometrial tissue | 86.6 | 55.2 | 2805838 | 51.80% | 78.70% | Post-receptivity period | Blastocyst implantation during "receptivity period" of the next cycle | IVF-ET Pregnant |
| 3 days after ovulation | 18 | 31 | Secondary infertility, SEM after monitored ovulation in other hospital | Secondary infertility | 7.14 | 42 | 7311542 | 54.90% | 79.80% | Pre-receptivity period | Blastocyst implantation during "receptivity period" of the next cycle | IVF-ET Pregnant |
| 5 days after ovulation | | 31 | Secondary infertility, SEM after monitored ovulation in other hospital | Secondary infertility | 0 | 7.36 | 6764044 | 54.00% | 79.20% | Receptivity period | Blastocyst implantation during "receptivity period" of the next cycle | IVF-ET Pregnant |
| 5 days after ovulation | | 31 | Secondary infertility, SEM after monitored ovulation in other hospital | Endometrial tissue | 154 | 50.4 | 5048192 | 52.70% | 86.80% | Receptivity period | Blastocyst implantation during "receptivity period" of the next cycle | IVF-ET Pregnant |

TABLE 8-3-continued

| | | | | | Model prediction and pregnancy outcomes | | | | | | | | |
|---|---|---|---|---|---|---|---|---|---|---|---|---|---|
| 7 days after ovulation | uterine fluid | 31 | Secondary infertility, SEM after monitored ovulation in other hospital | Secondary infertility | 8.74 | 104 | 4233778 | 61.20% | 87.90% | Post-receptivity period | Blastocyst implantation during "receptivity period" of the next cycle | IVF-ET | Pregnant |
| 7 days after ovulation | Endometrial tissue | 3 | Secondary infertility, SEM after monitored ovulation in other hospital | Secondary infertility | 316 | 37.2 | 4331894 | 49.60% | 70.10% | Post-receptivity period | Blastocyst implantation during "receptivity period" of the next cycle | IVF-ET | Pregnant |
| 3 days after ovulation | uterine fluid | 19 | Unknown | Secondary infertility | 9.76 | 47.4 | 2501047 | 62.70% | 79.70% | Pre-receptivity period | Blastocyst implantation during "receptivity period" of the next cycle | IVF-ET | Pregnant |
| 5 days after ovulation | uterine fluid | 32 | Unknown | Secondary infertility | 6.42 | 28.2 | 3022173 | 57.90% | 86.20% | Receptivity period | Blastocyst implantation during "receptivity period" of the next cycle | IVF-ET | Pregnant |
| 7 days after ovulation | uterine fluid | 32 | Unknown | Secondary infertility | 5.76 | 26.6 | 3675291 | 46.40% | 79.10% | Post-receptivity period | Blastocyst implantation during "receptivity period" of the next cycle | IVF-ET | Pregnant |
| 7 days after ovulation | Endometrial tissue | 32 | Unknown | Secondary infertility | 200 | 18.3 | 2762684 | 55.40% | 52.40% | Post-receptivity period | Blastocyst implantation during "receptivity period" of the next cycle | IVF-ET | Pregnant |

The sample periods, sample type, past medical history, and infertility type are clinic information of the sample; RNA concentration, cDNA concentration, sequencing data size, Unique Mapping Ratio, and exons proportion are quality control information of sequencing; support vector classification (SVC) is a receptivity status determined by machine learning, and the implantation method refers to adjustment of implantation time according to the analysis results of the machine learning. It can be seen from Tables 8-1, 8-2 and 8-3 that by clinical verifications, 19 cases of infertile women achieve successful pregnancy by directing the embryo implantation timing with the model of the present invention, indicating that the model of the present invention has a very high accuracy rate and thus, is conducive to promoting medical advancement.

The determination results of the markers of the present invention are shown in Table 9.

TABLE 9

| ensaembl_gene_id | external_gene_name | Pre-ER period gene SD | Pre-ER gene SD | Intermediate gene SD | Intermediate gene mean number | Post-ER gene SD | Post-ER gene mean number | Intermediate-pre |
|---|---|---|---|---|---|---|---|---|
| ENSG00000111707 | SUDS3 | 5.827578 | 18.89926 | 3.454929 | 9.33763 | 1.7061 | 4.720257 | −9.56163 |
| ENSG00000182670 | TTC3 | 4.93912 | 15.00196 | 2.352544 | 7.391707 | 2.188738 | 6.071595 | −7.61025 |
| ENSG00000131981 | LGALS3 | 48.36064 | 163.8633 | 137.5628 | 346.0276 | 103.0354 | 290.66436 | 182.1643 |
| ENSG00000104812 | GYS1 | 3.834962 | 9.973973 | 1.985116 | 5.959859 | 1.539906 | 4.351716 | −4.01411 |
| ENSG00000101577 | LPIN2 | 1.719962 | 5.036125 | 2.790048 | 7.19635 | 1.760414 | 4.813174 | 2.160226 |
| ENSG00000100300 | TSPO | 10.91361 | 34.50906 | 22.77423 | 63.15479 | 30.91007 | 80.23195 | 28.64573 |
| ENSG00000037637 | FBXO42 | 1.969053 | 5.682224 | 1.711024 | 4.436953 | 1.176221 | 2.983219 | −1.24527 |
| ENSG00000100722 | ZC3H14 | 0.912249 | 2.989194 | 0.668473 | 1.994112 | 0.573353 | 1.465716 | −0.99508 |
| ENSG00000198917 | SPOUT1 | 1.972204 | 6.637025 | 1.162251 | 3.684933 | 1.057725 | 3.10696 | −2.95209 |
| ENSG00000101193 | GID8 | 2.514717 | 8.744355 | 2.413587 | 6.370614 | 1.862542 | 4.813886 | −2.37374 |
| ENSG00000134324 | LPIN1 | 1.001867 | 3.006886 | 0.900924 | 2.529849 | 0.61586 | 1.658121 | −0.47704 |
| ENSG00000170776 | AKAP13 | 3.348973 | 11.42381 | 2.988059 | 8.349162 | 1.963399 | 5.84479 | −3.07464 |
| ENSG00000204256 | BRD2 | 3.766828 | 11.16832 | 2.665761 | 7.839714 | 2.215262 | 5.978196 | −3.32861 |
| ENSG00000177731 | FLII | 1.576378 | 6.106304 | 3.513613 | 10.03185 | 3.596424 | 11.92527 | 3.925549 |
| ENSG00000100941 | PNN | 9.501966 | 26.5265 | 4.215423 | 15.33568 | 4.614242 | 13.84748 | −11.1908 |
| ENSG00000133226 | SRRM1 | 3.64146 | 11.11637 | 1.491204 | 6.252355 | 1.803735 | 5.73432 | −4.86402 |
| ENSG00000134884 | ARGLU1 | 7.403077 | 21.9497 | 6.348559 | 17.64962 | 4.156759 | 12.57287 | −4.30008 |
| ENSG00000145241 | CENPC | 1.035908 | 2.904006 | 0.83143 | 2.189482 | 0.659297 | 1.648927 | −0.71452 |
| ENSG00000163807 | KIAA1143 | 2.897959 | 11.69338 | 2.324151 | 8.247213 | 1.826812 | 6.330284 | −3.44617 |
| ENSG00000197448 | GSTK1 | 7.091504 | 26.10278 | 7.194731 | 21.4404 | 5.677916 | 15.4931 | −4.66238 |
| ENSG00000127838 | PNKD | 6.111581 | 19.76746 | 3.510712 | 12.04386 | 4.573485 | 14.07302 | −7.7236 |
| ENSG00000100897 | DCAF11 | 4.852968 | 12.46743 | 3.921142 | 10.37796 | 2.911093 | 7.924041 | −2.08947 |
| ENSG00000109083 | IFT20 | 3.386648 | 9.195255 | 2.676048 | 6.921739 | 1.923505 | 5.319012 | −2.27352 |
| ENSG00000115677 | HDLBP | 6.306764 | 20.84502 | 4.99432 | 14.86621 | 4.181092 | 12.05786 | −5.97882 |
| ENSG00000123200 | ZC3H13 | 3.316903 | 113.3078 | 2.892413 | 9.852437 | 3.018947 | 7.90076 | −3.45537 |
| ENSG00000130985 | UBA1 | 11.396581 | 38.90203 | 7.79073 | 27.27794 | 6.85736 | 22.11879 | −11.6241 |
| ENSG00000132466 | ANKRD17 | 1.859906 | 6.988819 | 1.431257 | 4.974037 | 1.549987 | 4.074584 | −2.01478 |
| ENSG00000132780 | NASP | 3.650077 | 11.14633 | 2.088425 | 6.840818 | 2.011318 | 6.267084 | −4.30552 |
| ENSG00000139990 | DCAF5 | 1.024517 | 3.52193 | 0.829116 | 2.705521 | 0.831611 | 2.087311 | −0.81641 |
| ENSG00000142864 | SERBP1 | 8.535815 | 28.99984 | 6.727192 | 19.37432 | 6.224702 | 16.94423 | −9.62552 |
| ENSG00000166295 | ANAPC16 | 14.87284 | 44.08439 | 11.8572 | 33.35002 | 9.55299 | 26.16014 | −10.7344 |
| ENSG00000170653 | ATF7 | 1.617936 | 5.032078 | 1.151156 | 3.50754 | 90.880841 | 2.919776 | −1.52453 |
| ENSG00000173726 | TOMM20 | 11.74229 | 37.42464 | 9.492573 | 24.3714 | 8.176943 | 20.63295 | −13.0532 |
| ENSG00000198960 | ARMCX6 | 2.669028 | 7.692253 | 2.014098 | 5.928683 | 1.601258 | 4.595346 | −1.76357 |
| ENSG00000160818 | GPATCH4 | 1.639054 | 4.527852 | 1.226094 | 3.339114 | 1.65733 | 4.280999 | −1.18874 |
| ENSG00000116698 | SMG7 | 1.473307 | 4.59847 | 1.6815641 | 5.394498 | 1.182456 | 3.919166 | 0.80365 |
| ENSG00000158710 | TAGLN2 | 39.00713 | 120.5111 | 91.66035 | 235.5015 | 92.8136 | 232.2594 | 114.9904 |
| ENSG00000134283 | PPHLN1 | 2.095578 | 6.229367 | 1.819583 | 4.637407 | 1.488239 | 3.761161 | −1.59196 |
| ENSG00000134748 | PRPF38A | 3.57035 | 11.22159 | 3.103664 | 8.405398 | 2.517209 | 7.081677 | −2.81619 |
| ENSG00000135390 | ATP5MC2 | 14.10025 | 46.20418 | 12.07739 | 31.12551 | 9.402648 | 28.85352 | −15.0787 |
| ENSG00000135457 | TFCP2 | 3.232505 | 8.624231 | 2.000415 | 5.507024 | 1.870024 | 5.088395 | −3.11721 |
| ENSG00000136861 | CDKSRAP2 | 0.5478 | 1.773632 | 0.664948 | 1.741121 | 0.413599 | 1.151316 | −0.03251 |
| ENSG00000137038 | DMAC1 | 5.643215 | 20.279 | 4.834104 | 15.41353 | 4.694519 | 12.4945 | −4.85737 |
| ENSG00000140750 | ARHGAP17 | 1.082225 | 3.271902 | 1.066181 | 2.762606 | 0.805001 | 2.073451 | −0.5093 |
| ENSG00000148730 | EIF4EBP2 | 4.059283 | 11.61912 | 3.486293 | 10.88796 | 2.905864 | 7.591884 | −0.73116 |
| ENSG00000151445 | VIPAS39 | 2.311752 | 5.900657 | 1.45348 | 4.519151 | 1.388751 | 3.696184 | −1.38151 |
| ENSG00000163344 | PMVK | 10.85603 | 35.18472 | 9.91305 | 27.89104 | 8.216113 | 21.78567 | −7.29368 |
| ENSG00000166887 | VPS39 | 2.213064 | 5.769397 | 1.627363 | 4.586065 | 1.277627 | 3.622852 | −1.18333 |
| ENSG00000170473 | PYM1 | 4.991384 | 14.55042 | 3.114714 | 9.58722 | 2.471778 | 8.75343 | −4.9632 |
| ENSG00000213516 | RBMXL1 | 2.099229 | 6.836574 | 1.998913 | 5.79192 | 1.671696 | 4.354454 | −1.04465 |
| ENSG00000114850 | SSR3 | 20.31763 | 56.11063 | 14.45758 | 37.65026 | 15.52081 | 40.62713 | −18.4604 |
| ENSG00000198736 | MSRB1 | 2.992451 | 9.260101 | 6.751634 | 17.01384 | 5.395247 | 16.69027 | 7.753737 |
| ENSG00000137312 | FLOT1 | 4.8555 | 18.40606 | 8.517192 | 26.42347 | 11.79634 | 30.25097 | 8.017404 |
| ENSG00000143198 | MGST3 | 1.956434 | 6.121338 | 82.96828 | 8.147101 | 6273.843 | 9.824981 | 2.025764 |
| ENSG00000163840 | DTX3L | 2.636189 | 9.131346 | 26.05676 | 915.2407 | 2045.803 | 16.1538 | 6.109446 |
| ENSG00000001631 | KRIT1 | 1.761623 | 5.327619 | 1.179015 | 4.313178 | 1.344845 | 3.612571 | −1.01444 |
| ENSG00000035928 | RFC1 | 2.344331 | 6.226617 | 1.567679 | 4.870246 | 1.577593 | 4.193996 | −1.35637 |
| ENSG00000048828 | FAM120A | 5.419083 | 16.32842 | 3.731671 | 11.19568 | 4.003162 | 10.20743 | −5.13274 |
| ENSG00000064995 | TAF11 | 5.885379 | 19.16229 | 5.753667 | 16.50937 | 4.10642 | 13.05818 | −2.65292 |
| ENSG00000073050 | XRCC1 | 1.542506 | 5.279619 | 1.691647 | 4.318458 | 1.335389 | 3.553068 | −0.96116 |
| ENSG00000077235 | GTF3C1 | 0.82137 | 2.791141 | 0.719289 | 2.066927 | 0.664276 | 1.780048 | −0.72421 |
| ENSG00000083896 | YTHDC1 | 1.916206 | 5.111359 | 1.507733 | 4.276002 | 1.330235 | 3.559076 | −0.83536 |

TABLE 9-continued

| | | | | | | | | |
|---|---|---|---|---|---|---|---|---|
| ENSG00000100266 | PACSIN2 | 3.531351 | 11.1553 | 4.263255 | 10.66681 | 2.86517 | 7.966281 | −0.43872 |
| ENSG00000102606 | ARHGEF7 | 0.970849 | 3.550332 | 1.220794 | 3.382057 | 0.977361 | 2.545475 | −0.16827 |
| ENSG00000104957 | CCDC130 | 1.478008 | 5.148576 | 1.251423 | 4.116591 | 1.318245 | 3.355835 | −1.03198 |
| ENSG00000106609 | TMEM248 | 3.557622 | 9.177818 | 2.689205 | 6.746825 | 2.27925 | 5.755145 | −2.43099 |
| ENSG00000108389 | MTMR4 | 1.185324 | 3.926921 | 0.92854 | 62.92644 | 0.920 | 2.498758 | −1.00047 |
| ENSG00000108587 | GOSR1 | 1.704405 | 6.284172 | 1.446041 | 4.669596 | 1.538332 | 4.077062 | −1.6146 |
| ENSG00000111615 | KRR1 | 1.658937 | 5.030804 | 1.209855 | 3.635592 | 1.243549 | 3.26332 | −1.39521 |
| ENSG00000115211 | LEIF2B4 | 2.625917 | 9.101714 | 2.536731 | 6.884928 | 2.307899 | 6.061388 | −2.21679 |
| ENSG00000115942 | ORC2 | 1.194322 | 3.78154 | 0.960937 | 2.817427 | 0.931504 | 2.452152 | −0.96363 |
| ENSG00000116199 | FAM20B | 1.427375 | 4.011226 | 1.138576 | 3.035308 | 0.92737 | 2.57913 | −0.97592 |
| ENSG00000120137 | PANK3 | 2.094052 | 6.161102 | 1.491205 | 4.588162 | 1.487781 | 3.920996 | −1.57294 |
| ENSG00000120451 | SNX19 | 1.764038 | 4.996467 | 1.443302 | 3.760179 | 1.17382 | 3.235933 | −1.23629 |
| ENSG00000127914 | AKAP9 | 2.493812 | 6.971792 | 1.661478 | 5.703069 | 1.871315 | 4.733299 | −1.26872 |
| ENSG00000130254 | SAPB2 | 1.762541 | 5.955506 | 1.328781 | 4.175307 | 1.483067 | 3.756429 | −1.7802 |
| ENSG00000131263 | RLIM | 1.819161 | 6.750115 | 1.603751 | 4.791491 | 1.689782 | 4.272155 | −1.9587 |
| ENSG00000131473 | ACLY | 6.903375 | 18.97887 | 3.692773 | 12.91399 | 3.919459 | 11.57287 | −6.06488 |
| ENSG00000134899 | ERCCS | 1.379665 | 4.378544 | 1.348564 | 3.585739 | 1.005559 | 12.91946 | −0.7928 |
| ENSG00000143420 | ENSA | 5.047172 | 16.42825 | 4.631332 | 13.48253 | 3.88129 | 10.98916 | −2.94571 |
| ENSG00000145216 | FIP1L1 | 2.70633 | 9.123952 | 2.445185 | 6.487376 | 2.178967 | 5.885188 | −2.636581 |
| ENSG00000152795 | HNRNPDL | 14.69661 | 40.75375 | 9.274872 | 30.52196 | 8.707482 | 26.74435 | −10.2318 |
| ENSG00000155506 | LARP1 | 2.348747 | 8.681389 | 2.082429 | 7.109447 | 2.1763 | 5.946355 | −1.57969 |
| ENSG00000159592 | GPBP1L1 | 2.655689 | 8.227249 | 2.132658 | 6.63808 | 2.051241 | 5.472581 | −1.58917 |
| ENSG00000164609 | SLU7 | 5.752445 | 18.02156 | 5.522593 | 15.65111 | 4.511409 | 12.11937 | −2.37046 |
| ENSG00000165219 | GAPVD1 | 1.356134 | 4.288628 | 0.926598 | 3.005738 | 0.821982 | 2.707878 | −1.28289 |
| ENSG00000165671 | NSD1 | 1.163147 | 3.817705 | 1.074455 | 3.013237 | 1.002452 | 2.532623 | −0.80447 |
| ENSG00000170144 | HNRNPA3 | 7.378483 | 21.80852 | 5.230755 | 15.08443 | 5.311474 | 13.73181 | −6.72409 |
| ENSG00000172053 | QARS | 4.709714 | 16.68082 | 3.8628518 | 12.29202 | 3.46518 | 10.74705 | −4.3888 |
| ENSG00000176623 | RMDN1 | 2.578068 | 7.71211 | 2.220101 | 5.963294 | 1.888144 | 5.063092 | −1.74882 |
| ENSG00000187555 | USP7 | 1.623507 | 6.223279 | 1.529994 | 4.758393 | 1.535627 | 4.093502 | −1.46489 |
| ENSG00000204120 | GIGYF2 | 2.107201 | 5.302996 | 91.08932 | 13.97495 | 1.277573 | 3.453612 | −1.32805 |
| ENSG00000205659 | LINS2 | 2.259289 | 6.74755 | 1.762307 | 5.421816 | 1.698048 | 4.53358 | −1.31894 |
| ENSG00000096384 | HSP90AB1 | 107.1309 | 357.5469 | 97.11283 | 248.6939 | 92.2264 | 276.5771 | −108.853 |
| ENSG00000129351 | ILF3 | 1.747056 | 5.998801 | 1.255666 | 3.840643 | 1.5177 | 4.105205 | −2.15816 |
| ENSG00000132603 | NIP7 | 6.959156 | 18.19578 | 4.699623 | 12.44896 | 5.332591 | 13.46902 | −5.74682 |
| ENSG00000148296 | SURF6 | 2.55407 | 6.642677 | 1.448681 | 4.007724 | 1.391935 | 4.077794 | −2.63495 |
| ENSG00000161960 | EIF4A1 | 21.6824 | 59.93167 | 21.99279 | 56.9745 | 28.31866 | 78.24596 | −2.95717 |
| ENSG00000121680 | PEX16 | 1.953122 | 5.080393 | 2.197921 | 5.809799 | 1.570194 | 4.490951 | 0.729407 |
| ENSG00000153113 | CAST | 2.505606 | 8.22978 | 3.562163 | 10.49903 | 3.076626 | 8.583097 | 2.269248 |
| ENSG00000158793 | NIT1 | 1.724351 | 5.284683 | 2.326662 | 5.944744 | 1.833397 | 4.772404 | 0.660061 |
| ENSG00000136448 | NMT1 | 0.779268 | 3.317656 | 1.274739 | 3.998392 | 1.643398 | 4.760168 | 0.680736 |
| ENSG00000003756 | RBM5 | 2.28932 | 7.664702 | 72.26420 | 6.766449 | 2.059037 | 5.591111 | −0.89825 |
| ENSG00000058600 | POLR3E | 0.806337 | 2.246387 | 0.644659 | 1.617037 | 0.571865 | 1.562683 | −0.62935 |
| ENSG00000062194 | GPBP1 | 4.067406 | 13.05313 | 3.745493 | 11.13428 | 3.277077 | 9.031756 | −1.91886 |
| ENSG00000073614 | KDM5A | 1.586597 | 5.72213 | 1.383804 | 4.834213 | 1.31673 | 4.07313 | −0.88792 |
| ENSG00000096401 | CDCSL | 3.184655 | 9.018056 | 2.556712 | 7.199761 | 2.201461 | 6.356383 | −1.81829 |
| ENSG00000100888 | CHD8 | 1.065639 | 3.428383 | 0.958645 | 3.032804 | 0.942701 | 2.546689 | −0.39558 |
| ENSG00000101079 | NDRG3 | 4.005761 | 10.9552 | 3.341259 | 68.85839 | 2.735062 | 7.53487 | −2.04713 |
| ENSG00000108465 | CDK5RAP3 | 3.245639 | 9.991964 | 3.372876 | 9.3039 | 2.177786 | 7.400405 | −0.68806 |
| ENSG00000111642 | CHD4 | 2.741308 | 10.53244 | 2.225305 | 8.821099 | 2.587114 | 7.540851 | −1.71134 |
| ENSG00000112200 | ZNF451 | 1.164625 | 4.113511 | 1.251524 | 3.216534 | 1.065543 | 2.909826 | −0.89698 |
| ENSG00000112701 | SENP6 | 1.88977 | 4.874475 | 1.192517 | 3.783713 | 1.331653 | 3.413851 | −1.09076 |
| ENSG00000112739 | PRPF4B | 2.209641 | 6.290302 | 1.577592 | 4.698908 | 1.701828 | 4.279363 | −1.59139 |
| ENSG00000116580 | GON4L | 0.905043 | 3.434761 | 0.8171 | 2.759298 | 0.772228 | 2.37285 | −0.67546 |
| ENSG00000126653 | NSRP1 | 2.903303 | 10.9716 | 3.068821 | 8.614255 | 2.399731 | 7.319102 | −2.35735 |
| ENSG00000129197 | RPAIN | 1.431638 | 4.470108 | 1.328219 | 3.87799 | 1.098058 | 3.208095 | −0.59212 |
| ENSG00000130741 | EIF2S3 | 23.39678 | 68.30843 | 19.33434 | 53.44213 | 17.67643 | 47.85539 | −14.8663 |
| ENSG00000133706 | LARS | 3.27567 | 11.14765 | 2.575635 | 7.59092 | 2.5025187 | 7.089914 | −3.55672 |
| ENSG00000134825 | TMEM258 | 9.425595 | 33.40505 | 9.71326 | 25.63607 | 8.449626 | 23.57248 | −7.76897 |
| ENSG00000136813 | ECPAS | 1.985879 | 5.741233 | 1.587492 | 4.633589 | 1.304627 | 4.024751 | −1.10764 |
| ENSG00000138398 | PPIG | 3.480406 | 12.18107 | 2.832356 | 9.246175 | 3.218432 | 8.188006 | −2.93489 |
| ENSG00000138802 | SEC24B | 3.343558 | 9.289593 | 2.846747 | 8.124831 | 2.324631 | 6.788724 | −1.16476 |
| ENSG00000139613 | SMARCC2 | 1.71615 | 5.655992 | 1.506161 | 4.751252 | 1.136 | 3.899943 | −0.90474 |
| ENSG00000147123 | NDUFB11 | 16.26259 | 47.15707 | 14.42698 | 37.47439 | 11.11858 | 32.27648 | −9.68268 |
| ENSG00000147133 | TAF1 | 0.978278 | 2.953438 | 0.69486 | 2.213092 | 0.763909 | 1.981388 | −0.74035 |
| ENSG00000157500 | APPL1 | 3.187379 | 10.88151 | 2.713917 | 8.677246 | 2.733664 | 7.413209 | −2.20427 |
| ENSG00000163960 | UBXN7 | 1.130956 | 3.96507 | 0.893884 | 3.119526 | 0.776992 | 2.677973 | −0.84554 |
| ENSG00000165494 | PCF11 | 1.73874 | 4.874112 | 1.176545 | 3.646097 | 1.23507 | 3.288837 | −1.22802 |
| ENSG00000172466 | ZNF24 | 4.218487 | 11.17287 | 2.722997 | 8.459369 | 2.72798 | 7.50457 | −2.7135 |
| ENSG00000172775 | FAM192A | 2.909566 | 11.74339 | 3.557721 | 10.06495 | 2.829574 | 8.408685 | −1.72937 |
| ENSG00000174282 | ZBTB4 | 2.283907 | 6.487449 | 1.840397 | 5.449343 | 1.738505 | 4.452583 | −1.03811 |
| ENSG00000174903 | RAB1B | 15.21196 | 48.26585 | 13.82086 | 35.87512 | 10.81624 | 33.22336 | −12.3907 |
| ENSG00000177951 | BET1L | 3.52604 | 10.97096 | 2.880024 | 8.119518 | 2.743451 | 7.547477 | −2.85144 |
| ENSG00000177981 | ASB8 | 2.74857 | 9.27606 | 2.648633 | 8.187465 | 2.253699 | 6.802939 | −1.08859 |
| ENSG00000181222 | POLR2A | 1.5579 | 4.941768 | 1.740663 | 4.806502 | 0.96146 | 3.598176 | −0.13527 |
| ENSG00000182473 | EXOC7 | 1.471796 | 6.861734 | 1.425805 | 5.373571 | 1.500089 | 4.7401 | −1.48816 |
| ENSG00000230124 | ACBD6 | 1.144026 | 2.860172 | 0.722359 | 2.134026 | 0.761429 | 1.95253 | −0.72615 |
| ENSG00000237190 | CDKN2AIPNL | 7.131534 | 18.81088 | 5.182485 | 13.0065 | 4.84282 | 12.12446 | −5.80434 |
| ENSG00000249915 | PDCD6 | 4.599965 | 14.90627 | 3.996736 | 11.91907 | 3.891553 | 10.47889 | −2.9872 |
| ENSG00000278311 | GGNBP2 | 2.671959 | 10.64801 | 2.843493 | 8.970848 | 2.910868 | 7.484169 | −1.67716 |
| ENSG00000085872 | CHERP | 0.603839 | 1.928831 | 0.509732 | 1.462192 | 0.528182 | 1.611418 | −0.46664 |

TABLE 9-continued

| | | | | | | | | |
|---|---|---|---|---|---|---|---|---|
| ENSG000001087087 | SRRT | 1.804979 | 6.425264 | 1.240185 | 4.94575 | 1.71031 | 5.447334 | −1.47951 |
| ENSG00000092199 | HNRNPC | 16.46711 | 55.31811 | 15.11267 | 43.09244 | 15.12017 | 46.59831 | −12.2257 |
| ENSG00000101361 | NOP56 | 2.067428 | 7.536671 | 1.821058 | 5.588131 | 2.282823 | 6.091275 | −1.94854 |
| ENSG00000102030 | NAA10 | 1.706982 | 5.925067 | 1.459113 | 4.627901 | 1.677853 | 3235.055 | −1.29717 |
| ENSG00000115053 | NCL | 10.35737 | 34.44289 | 9.206454 | 26.45076 | 9.38649 | 28.55937 | −7.99213 |
| ENSG00000123992 | DNPEP | 1.517857 | 4.401247 | 1.401606 | 3.540154 | 1.499725 | 4.037848 | −0.86109 |
| ENSG00000135316 | SYNCRIP | 5.85398 | 15.98684 | 4.310812 | 11.2071 | 4.648656 | 12.0236 | −4.77974 |
| ENSG00000142186 | SCYL1 | 1.907118 | 6.393769 | 1.4712 | 4.602681 | 1.604849 | 4.781584 | −1.79109 |
| ENSG00000144591 | GMPPA | 1.526147 | 5.270551 | 1.414811 | 4.001869 | 1.663594 | 4.328905 | −1.26868 |
| ENSG00000165934 | CPSF2 | 1.101633 | 4.445921 | 1.10257 | 3.214086 | 1.141551 | 3.365894 | −1.23184 |
| ENSG00000167721 | TSR1 | 2.951925 | 9.326775 | 2.508573 | 7.304464 | 2.89868 | 8.292164 | −2.02231 |
| ENSG00000169100 | SLC25A6 | 26.90527 | 83.18482 | 24.08901 | 63.03457 | 27.10071 | 70.27866 | −20.1503 |
| ENSG00000172534 | HCFC1 | 0.930661 | 2.931261 | 0.886825 | 2.284543 | 0.902133 | 2.530622 | −0.64672 |
| ENSG00000122783 | CYREN | 2.35316 | 7.009729 | 2.708132 | 7.530239 | 2.262725 | 5.796874 | 0.52051 |
| ENSG00000151148 | UBE3B | 0.930024 | 2.492566 | 0.888308 | 2.599961 | 0.670735 | 2.080602 | 0.107396 |
| ENSG00000163931 | TKT | 1.602895 | 6.384006 | 3.237725 | 9.451215 | 2.716191 | 9.39488 | 3.06721 |
| ENSG00000168310 | IRF2 | 2.961864 | 9.227421 | 4.965385 | 12.98544 | 4.672868 | 12.58079 | 3.758022 |
| ENSG00000189077 | TMEM120A | 2.606135 | 8.455202 | 4.079067 | 10.47494 | 2.652276 | 9.148792 | 2.019735 |
| ENSG00000197694 | SPTAN1 | 0.584854 | 2.359791 | 0.855721 | 2.751443 | 0.819585 | 2.266248 | 0.391652 |
| ENSG00000100345 | MYH9 | 3.878618 | 16.5614 | 8.885426 | 23.66244 | 7.125386 | 25.36621 | 7.10104 |
| ENSG00000101150 | TPD52L2 | 5.557303 | 16.12975 | 7.605709 | 20.3462 | 9.441246 | 24.00072 | 4.216466 |
| ENSG00000130706 | ADRM1 | 3.990787 | 12.87757 | 84.42155 | 14.4385 | 6.075493 | 17.16886 | 1.560929 |
| ENSG00000164054 | SHISA5 | 3.853321 | 10.32965 | 4.278729 | 13.13082 | 5.807901 | 15.32043 | 2.801169 |
| ENSG00000005483 | KMT2E | 3.39577 | 12.50028 | 3.072022 | 10.88778 | 3.43156 | 9.516251 | −1.61249 |
| ENSG00000054267 | ARID4B | 2.820148 | 8.165316 | 2.682738 | 7.424657 | 2.315241 | 6.016781 | −0.74066 |
| ENSG00000071994 | PDCD2 | 1.806848 | 6.073017 | 1.923535 | 5.24970 | 1.720324 | 4.479251 | −0.82331 |
| ENSG00000072364 | AFF4 | 2.24669 | 8.218851 | 2.488679 | 7.181497 | 2.454088 | 6.174998 | −1.03735 |
| ENSG00000075292 | ZNF638 | 1.462862 | 5.533831 | 1.226096 | 4.125155 | 1.391353 | 3.974164 | −1.40868 |
| ENSG00000078142 | PIK3C3 | 0.673781 | 2.026031 | 0.602898 | 1.938454 | 0.618375 | 1.577225 | −0.08758 |
| ENSG00000089154 | GCN1 | 1.284668 | 4.15523 | 1.279908 | 3.443635 | 0.935962 | 3.091657 | −0.71159 |
| ENSG00000095787 | WAC | 2.026504 | 5.652737 | 1.463051 | 5.150951 | 1.628986 | 4.29561 | −0.50179 |
| ENSG00000100348 | TXN2 | 9.641132 | 33.18024 | 9.260895 | 27.628 | 8.127471 | 25.54525 | −5.55224 |
| ENSG00000100393 | EP300 | 1.286423 | 5.015718 | 1.498838 | 4.55729 | 1.350244 | 3.756817 | −0.45846 |
| ENSG00000100413 | POLR3H | 1.10027 | 4.424936 | 1.106098 | 3.029456 | 1.184744 | 3.028828 | −1.39548 |
| ENSG00000101138 | CSTF1 | 2.79759 | 9.413731 | 2.484008 | 7.489407 | 2.521727 | 6.880956 | −1.92432 |
| ENSG00000106400 | ZNHIT1 | 2.767894 | 11.95447 | 3.451499 | 10.37761 | 3.115988 | 9.128927 | −1.57686 |
| ENSG00000106603 | COA1 | 0.982939 | 3.421782 | 0.96478 | 2.499983 | 0.691772 | 2.360054 | −0.9218 |
| ENSG00000114416 | FXR1 | 1.590468 | 4.663599 | 1.361099 | 3.501315 | 1.154812 | 3.301861 | −1.16228 |
| ENSG00000114982 | KANSL3 | 1.315544 | 4.315239 | 1.390888 | 3.709103 | 1.236611 | 3.23131 | −0.60614 |
| ENSG00000116560 | SFPQ | 3.102749 | 12.14655 | 3.051067 | 8.870893 | 3.27682 | 8.472234 | −3.27566 |
| ENSG00000120616 | EPC1 | 0.594036 | 1.961274 | 0.530416 | 1.653348 | 0.532005 | 1.399318 | −0.30793 |
| ENSG00000124214 | STAU1 | 6.57915 | 23.06919 | 7.247102 | 20.59275 | 6.11799 | 18.14297 | −2.47644 |
| ENSG00000124733 | MEA1 | 15.59585 | 59.18204 | 15.29707 | 44.166 | 14.76446 | 43.10354 | −15.016 |
| ENSG00000125611 | CHCHD5 | 1.326223 | 4.032054 | 1.177393 | 3.304303 | 1.206238 | 3.033358 | −0.72775 |
| ENSG00000126012 | KDM5C | 0.871598 | 2.867574 | 0.79047 | 2.368592 | 0.715833 | 2.161013 | −0.49898 |
| ENSG00000130227 | XPO7 | 1.567787 | 5.621482 | 1.070292 | 4.428886 | 1.63003 | 4.113152 | −1.1926 |
| ENSG00000132591 | ERAL1 | 4.905115 | 13.77206 | 5.096625 | 13.08521 | 4.052685 | 10.61539 | −0.68686 |
| ENSG00000132670 | PTPRA | 1.638789 | 5.532579 | 2.024656 | 5.287109 | 1.712295 | 4.338859 | −0.24547 |
| ENSG00000137776 | SLTM | 2.699918 | 9.453329 | 2.118804 | 7.247521 | 2.092882 | 6.875871 | −2.20581 |
| ENSG00000138594 | TMOD3 | 2.716379 | 10.27982 | 3.264500 | 10.02119 | 2.74346 | 7.988337 | −2.25863 |
| ENSG00000141027 | NCOR1 | 1.98183 | 8.646255 | 1.908904 | 8.113424 | 1.850353 | 6.728171 | −0.53283 |
| ENSG00000143970 | ASXL2 | 0.909669 | 2.985514 | 0.931759 | 2.643145 | 0.884726 | 2.32037 | −0.34237 |
| ENSG00000148824 | MTG1 | 2.642321 | 8.147689 | 2.24962 | 6.167016 | 2.309285 | 5.782468 | −1.98067 |
| ENSG00000149187 | CELF1 | 2.719453 | 7.91242 | 2.085129 | 6.68572 | 2.329118 | 5.851289 | −1.2267 |
| ENSG00000149761 | NUDT22 | 1.403281 | 3.768206 | 1.120796 | 2.826536 | 0.929547 | 2.636268 | −0.94167 |
| ENSG00000152684 | PELO | 2.806786 | 7.803063 | 2.313738 | 5.885457 | 2.164599 | 5.717607 | −1.91761 |
| ENSG00000152700 | SAR1B | 2.636754 | 7.881211 | 2.610891 | 7.200508 | 2.294541 | 5.970202 | −0.6807 |
| ENSG00000154781 | CCDC174 | 2.669061 | 7.305185 | 2.058504 | 6.01141 | 1.992512 | 5.453341 | −1.29377 |
| ENSG00000159792 | PSKH1 | 1.577106 | 4.767841 | 1.43747 | 3.862104 | 1.3261306 | 3.559226 | −0.90574 |
| ENSG00000161920 | MED11 | 4.133219 | 14.20128 | 3.645988 | 12.12222 | 3.425068 | 10.24987 | −2.07906 |
| ENSG00000164808 | SPIDR | 1.297202 | 3.556007 | 1.167315 | 3.302833 | 0.999868 | 2.708005 | −0.25317 |
| ENSG00000166913 | YWHAB | 18.50337 | 58.6639 | 17.70195 | 49.79787 | 12.69544 | 43.70788 | −8.86603 |
| ENSG00000168066 | SF1 | 2.522313 | 8.699348 | 2.598452 | 7.128562 | 1.925541 | 6.420458 | −1.57079 |
| ENSG00000168397 | ATG4B | 1.537642 | 4.415166 | 1.406943 | 3.819627 | 1.181576 | 3.251421 | −0.59554 |
| ENSG00000169375 | SIN3A | 0.850973 | 2.632318 | 0.785583 | 2.453067 | 0.81257 | 2.061213 | −0.17925 |
| ENSG00000169727 | GPS1 | 1.664065 | 5.942083 | 1.49653 | 4.781428 | 1.476957 | 4.297126 | −1.16066 |
| ENSG00000174821 | PRPF8 | 3.220512 | 8.731638 | 2.917629 | 7.441534 | 2.4431 | 6.538122 | −1.2901 |
| ENSG00000175216 | CKAP5 | 1.144886 | 4.36178 | 1.109243 | 3.641225 | 1.087531 | 3.32964 | −0.72056 |
| ENSG00000176410 | DNAJC30 | 2.045906 | 5.216095 | 1.399698 | 4.221118 | 1.308192 | 3.755449 | −0.99498 |
| ENSG00000179335 | CLK3 | 0.423848 | 1.54753 | 0.406736 | 1.338196 | 0.354633 | 1.154447 | −0.20933 |
| ENSG00000198900 | TOP1 | 3.41327 | 14.66051 | 4.02154 | 12.87195 | 3.930145 | 11.39119 | −1.78857 |
| ENSG00000204469 | PRRC2A | 0.83604 | 2.912055 | 0.827644 | 2.139651 | 0.810212 | 2.041733 | −0.7724 |
| ENSG00000214046 | SMIM7 | 2.24918 | 6.664559 | 1.974671 | 5.664561 | 1.717492 | 4.933006 | −1 |
| ENSG00000253729 | PRKDC | 1.54977 | 5.004252 | 1.479881 | 3.762174 | 1.388247 | 3.59245 | −1.24208 |
| ENSG00000056097 | ZFR | 4.15526 | 13.50086 | 3.072662 | 10.82771 | 4.042502 | 11.86673 | −2.67315 |
| ENSG00000087191 | PSMC5 | 9.80783 | 32.21951 | 7.78272 | 24.63823 | 7.271756 | 25.75595 | −7.58128 |
| ENSG00000099783 | HNRNPM | 4.924377 | 17.15822 | 4.789421 | 13.30128 | 5.316155 | 14.18582 | −3.85693 |
| ENSG00000110717 | NDUFS8 | 3.019342 | 9.225531 | 2.779212 | 7.756966 | 3.469146 | 8.762204 | −1.46856 |
| ENSG00000113649 | TCERG1 | 1.513017 | 3.927335 | 0.95665 | 2.869322 | 1.164918 | 2.963639 | −1.05801 |
| ENSG00000125835 | SNRPB | 16.08849 | 49.86496 | 17.17238 | 45.32356 | 19.31918 | 56.08025 | −4.5414 |

TABLE 9-continued

| | | | | | | | | |
|---|---|---|---|---|---|---|---|---|
| ENSG00000131652 | THOC6 | 2.507077 | 6.885083 | 2.552585 | 6.517131 | 2.945561 | 7.861203 | −0.36795 |
| ENSG00000135624 | CCT7 | 11.68417 | 36.89189 | 10.62998 | 28.6152 | 9.580857 | 29.86279 | −8.2767 |
| ENSG00000141644 | MBD1 | 0.94708 | 2.763784 | 0.604347 | 2.246473 | 0.813458 | 2.447242 | −0.51731 |
| ENSG00000165916 | PSMC3 | 15.48577 | 47.67473 | 14.38191 | 39.13706 | 15.70;566 | 43.27308 | −8.53767 |
| ENSG00000169564 | PCBP1 | 21.24947 | 61.35917 | 17.08023 | 48.87056 | 17.675 | 52.92755 | −12.4886 |
| ENSG00000170515 | PA2G4 | 12.39247 | 39.97661 | 9.898216 | 28.79784 | 9.971443 | 29.32007 | −11.1788 |
| ENSG00000175376 | EIF1AD | 3.39595 | 9.645608 | 2.993134 | 8.623941 | 3.904346 | 10.10149 | −1.02167 |
| ENSG00000185504 | FAAP100 | 0.973393 | 2.699626 | 0.755456 | 2.21672 | 0.952959 | 2.43286 | −0.48291 |
| ENSG00000188976 | NOC2L | 2.13956 | 6.241215 | 1.912584 | 5.332928 | 1.986326 | 6.094431 | −0.90829 |
| ENSG00000197345 | MRPL21 | 5.378561 | 15.22368 | 3.025614 | 10.61447 | 3.309273 | 10.69442 | −4.60921 |
| ENSG00000225663 | MCRIP1 | 1.736545 | 5.263526 | 1.763603 | 4.800597 | 1.98319 | 5.933958 | −0.46293 |
| ENSG00000262814 | MRPL12 | 8.695244 | 28.59665 | 8.256443 | 21.21453 | 8.145978 | 22.42392 | −7.38212 |
| ENSG00000063854 | HAGH | 1.124191 | 3.32574 | 1.335891 | 3.932953 | 1.167662 | 3.337917 | 0.607213 |
| ENSG00000071859 | FAM50A | 5.125793 | 13.66832 | 6.232494 | 16.41817 | 5.361503 | 14.9008 | 2.74985 |
| ENSG00000125971 | DYNLRB1 | 7.829662 | 23.27274 | 8.848083 | 25.48023 | 7.428756 | 20.63357 | 2.207492 |
| ENSG00000140553 | UNC45A | 1.585513 | 4.929321 | 1.885534 | 5.224222 | 1.676654 | 4.268878 | 0.29491 |
| ENSG00000141279 | NPEPPS | 1.865144 | 6.816096 | 2.78794 | 7.531145 | 2.39983 | 6.292929 | 0.71505 |
| ENSG00000160310 | PRMT2 | 2.45195 | 8.155807 | 3.440542 | 10.50692 | 3.513236 | 9.873496 | 2.351118 |
| ENSG00000163681 | SLMAP | 0.658927 | 2.477488 | 1.0164944 | 2.85912 | 0.967326 | 2.442416 | 0.381632 |
| ENSG00000240230 | COX19 | 0.869287 | 2.786557 | 0.93363 | 3.079786 | 0.852727 | 2.58115 | 0.293229 |
| ENSG00000101182 | PSMA7 | 23.03983 | 86.45334 | 32.88651 | 94.08179 | 41.33013 | 113.9875 | 7.628447 |
| ENSG00000163866 | SMIM12 | 1.308291 | 3.311425 | 1.475375 | 4.150257 | 1.674687 | 4.586889 | 0.838832 |
| ENSG00000172531 | PPP1CA | 7.395485 | 27.3149 | 10.24355 | 31.00967 | 13.04478 | 36.11884 | 3.699188 |
| ENSG00000185359 | HGS | 1.07152 | 3.833545 | 1.447739 | 4.990623 | 1.98595 | 5.164922 | 1.157078 |
| ENSG00000047410 | TPR | 1.843525 | 8.421291 | 2.061875 | 7.665886 | 2.215378 | 6.767828 | −0.75541 |
| ENSG00000054118 | THRAP3 | 6.965462 | 24.07609 | 8.500029 | 23.27607 | 7.349876 | 19.05787 | −0.80003 |
| ENSG00000064490 | RFXANK | 1.790461 | 6.278733 | 1.724684 | 5.353831 | 1.780134 | 4.788902 | −0.9249 |
| ENSG00000065526 | SPEN | 1.05306 | 3.079087 | 0.996251 | 2.525912 | 0.923049 | 2.443013 | −0.55317 |
| ENSG00000075407 | ZNF37A | 1.279558 | 3.875802 | 1.074135 | 3.073996 | 1.04891 | 2.937214 | −0.80181 |
| ENSG00000075914 | EXOSC7 | 2.327068 | 8.717142 | 2.587186 | 6.987612 | 2.405498 | 6.575056 | −1.72953 |
| ENSG00000081791 | DELE1 | 1.463946 | 3.851663 | 1.098389 | 3.09336 | 1.160677 | 2.943781 | −0.7583 |
| ENSG00000084072 | PPIE | 1.316929 | 3.775157 | 1.154641 | 3.308004 | 1.031503 | 2.99231 | −0.46715 |
| ENSG00000086102 | NFX1 | 2.619077 | 7.703419 | 2.459782 | 7.054194 | 2.119937 | 6.163982 | −0.64923 |
| ENSG00000092203 | TOX4 | 3.873257 | 11.64296 | 3.872035 | 10.11187 | 2.794292 | 9.012124 | −1.53109 |
| ENSG00000100099 | HPS4 | 0.475649 | 1.552533 | 0.492952 | 1.385996 | 0.497439 | 1.288202 | −0.16654 |
| ENSG00000100353 | EIF3D | 12.26172 | 35.80024 | 11.29872 | 28.3424 | 9.335463 | 27.18688 | −7.45783 |
| ENSG00000100461 | RBM23 | 1.171653 | 3.621634 | 1.18035 | 3.590434 | 0.990886 | 3.007304 | −0.0312 |
| ENSG00000103245 | CIAO3 | 0.611419 | 1.62618 | 0.492389 | 1.440277 | 0.528568 | 1.323872 | −0.1859 |
| ENSG00000104872 | HMOX2 | 5.226622 | 15.35068 | 4.747429 | 14.21706 | 4.702937 | 12.56756 | −1.13362 |
| ENSG00000104872 | PIH1D1 | 2.149245 | 7.890979 | 2.291898 | 6.426917 | 2.113051 | 5.982111 | −1.46406 |
| ENSG00000105968 | H2AFV | 4.264318 | 13.71992 | 3.023953 | 10.87787 | 3.385904 | 10.14315 | −2.84205 |
| ENSG00000106153 | CHCHD2 | 78.20703 | 262.0657 | 85.53508 | 233.5743 | 67.57061 | 208.0878 | −28.4915 |
| ENSG00000106245 | BUD31 | 10.05372 | 26.77773 | 8.315352 | 23.42474 | 7.29824 | 21.5427 | −3.35299 |
| ENSG00000107581 | EIF3A | 5.466498 | 25.98894 | 7.083609 | 23.0654 | 6.55777 | 21.21089 | −2.92354 |
| ENSG00000107862 | GBF1 | 1.834853 | 6.133473 | 1.578666 | 4.823387 | 1.427625 | 4.593197 | −1.31009 |
| ENSG00000108349 | CASC3 | 2.461515 | 9.674774 | 2.909097 | 8.964675 | 2.712645 | 7.910078 | −0.7101 |
| ENSG00000111011 | RSRC2 | 1.871574 | 7.506163 | 2.210472 | 6.277849 | 1.771945 | 5.895262 | −1.22831 |
| ENSG00000111596 | CNOT2 | 1.503356 | 4.374921 | 1.383127 | 3.728168 | 1.204314 | 3.350087 | −0.64675 |
| ENSG00000113141 | IK | 6.554964 | 25.43998 | 6.199609 | 22.43988 | 6.581179 | 20.54192 | −3.0001 |
| ENSG00000114options | PRKARZA | 2.885432 | 8.384738 | 2.575429 | 7.158952 | 2.593731 | 6.579631 | −1.22579 |
| ENSG00000115561 | CHMP3 | 5.919588 | 21.00292 | 6.83087 | 19.50048 | 5.646643 | 16.82266 | −1.50244 |
| ENSG00000116918 | TSNAX | 4.680083 | 13.03155 | 3.933526 | 10.53604 | 3.539398 | 10.15635 | −2.4955 |
| ENSG00000117305 | HMGCL | 2.745101 | 8.794144 | 3.314475 | 8.743903 | 2.812847 | 7.216364 | −0.05024 |
| ENSG00000117523 | PRRC2C | 3.919521 | 11.35391 | 3.298162 | 10.12506 | 3.279808 | 9.101426 | −1.22885 |
| ENSG00000121067 | SPOP | 2.165314 | 7.387428 | 2.158172 | 6.36742 | 2.143542 | 5.884116 | −1.02001 |
| ENSG00000125107 | CNOT1 | 2.84054 | 8.593356 | 2.81882 | 7.256427 | 2.414389 | 6.451504 | −1.33693 |
| ENSG00000126756 | UXT | 15.66825 | 51.27515 | 15.05863 | 39.67163 | 13.74978 | 38.75847 | −11.6035 |
| ENSG00000130939 | UBE4B | 0.870268 | 2.864729 | 1.005182 | 2.692613 | 0.831142 | 2.279468 | −0.17212 |
| ENSG00000131051 | RBM39 | 5.388617 | 18.82339 | 5.736641 | 17.80103 | 5.262544 | 15.71756 | −1.02236 |
| ENSG00000133028 | SCO1 | 1.551082 | 3.968657 | 1.23326 | 3.22623 | 1.159707 | 3.064091 | −0.74243 |
| ENSG00000136699 | SMPD4 | 0.658761 | 2.571051 | 0.779113 | 2.260904 | 0.687289 | 2.047794 | −0.31015 |
| ENSG00000136875 | PRPF4 | 3.211685 | 9.861307 | 2.899951 | 8.583329 | 2.827313 | 7.849572 | −1.27798 |
| ENSG00000139697 | SBNO1 | 2.352462 | 8.041013 | 2.346737 | 7.237799 | 2.518568 | 6.68744 | −0.80321 |
| ENSG00000140350 | ANP32A | 1.459951 | 3.788005 | 1.05334 | 3.122987 | 0.983861 | 2.946958 | −0.66502 |
| ENSG00000140365 | COMMD4 | 1.097368 | 4.061418 | 1.099834 | 3.56828 | 1.010868 | 3.255499 | −0.49314 |
| ENSG00000141002 | TCF25 | 2.357962 | 10.89454 | 2.454018 | 9.545564 | 2.439955 | 8.693765 | −1.34898 |
| ENSG00000143436 | MRPL9 | 4.802413 | 14.80571 | 5.315665 | 13.58121 | 4.521065 | 11.97699 | −1.22451 |
| ENSG00000143569 | UBAP2L | 3.213718 | 9.461361 | 2.922525 | 7.624072 | 2.434672 | 7.284717 | −1.83729 |
| ENSG00000143612 | C1orf43 | 18.13147 | 56.4843 | 16.72421 | 47.14207 | 17.06905 | 45.11672 | −9.34222 |
| ENSG00000144043 | TEX261 | 1.778742 | 5.203451 | 1.79149 | 4.9082322 | 1.708365 | 4.336619 | −0.29522 |
| ENSG00000146007 | ZMAT2 | 8.548038 | 30.0295 | 10.05453 | 29.95568 | 9.047044 | 25.08066 | −0.07382 |
| ENSG00000146701 | MDH2 | 8.841885 | 27.58499 | 9.348331 | 25.91605 | 8.860642 | 22.22904 | −1.66894 |
| ENSG00000151532 | VTI1A | 0.788806 | 2.503825 | 0.870011 | 2.413021 | 0.767658 | 2.062468 | −0.0908 |
| ENSG00000152234 | ATPSF1A | 10.27935 | 31.99692 | 9.97856 | 25.44259 | 9.479172 | 24.24326 | −6.55433 |
| ENSG00000159210 | SNF8 | 1.20192 | 3.184046 | 1.057902 | 2.697895 | 0.945257 | 2.454892 | −0.48247 |
| ENSG00000162378 | ZYG11B | 1.66382 | 4.702427 | 1.265741 | 3.778434 | 1.154475 | 3.549129 | −0.92399 |
| ENSG00000163832 | ELP6 | 2.128619 | 7.841182 | 2.491092 | 6.671415 | 2.314381 | 5.940286 | −1.16977 |
| ENSG00000164190 | NIPBL | 1.519034 | 5.86157 | 1.785129 | 5.495686 | 1.778654 | 4.857958 | −0.36588 |
| ENSG00000164754 | RAD21 | 3.405246 | 11.61579 | 2.766873 | 9.283736 | 3.268613 | 8.713885 | −2.33206 |
| ENSG00000169641 | LUZP1 | 1.046267 | 2.962847 | 0.819074 | 2.806218 | 0.709186 | 2.39417 | −0.15663 |

TABLE 9-continued

| | | | | | | | | |
|---|---|---|---|---|---|---|---|---|
| ENSG00000173933 | RBM4 | 4.362769 | 15.16649 | 3.7565 | 12.50898 | 3.998142 | 11.93017 | −2.65752 |
| ENSG00000175387 | SMAD2 | 0.809105 | 2.949312 | 0.893249 | 2.7328 | 0.900535 | 2.333218 | −0.21651 |
| ENSG00000177971 | IMP3 | 5.419666 | 18.54096 | 5.571721 | 15.85806 | 5.137402 | 14.21356 | −2.6829 |
| ENSG00000178057 | NDUFAF3 | 5.880771 | 19.84717 | 5.818796 | 14.57971 | 4.264841 | 14.34601 | −5.26746 |
| ENSG00000181481 | RNF135 | 4.378248 | 13.45687 | 3.995092 | 12.17889 | 4.079588 | 10.77052 | −1.27798 |
| ENSG00000181991 | MRPS11 | 1.951285 | 5.984649 | 1.735089 | 4.635726 | 1.4633 | 4.526347 | −1.34892 |
| ENSG00000182923 | CEP63 | 0.623868 | 1.789247 | 0.594282 | 1.581853 | 0.568305 | 1.435511 | −0.20739 |
| ENSG00000184076 | UQCR10 | 31.14151 | 102.822 | 33.05889 | 97.86766 | 31.00224 | 86.08691 | −4.95438 |
| ENSG00000189091 | SF3B3 | 2.498597 | 7.395618 | 2.137786 | 5.841263 | 2.097111 | 5.585837 | −1.55436 |
| ENSG00000197157 | SND1 | 4.711405 | 16.57218 | 4.114266 | 13.10783 | 3.937988 | 12.69932 | −3.46435 |
| ENSG00000198218 | QRICH1 | 1.789448 | 4.83794 | 1.584213 | 4.456061 | 1.3217 | 3.822396 | −0.38188 |
| ENSG00000198563 | DDX39B | 3.905474 | 13.98155 | 4.032917 | 10.99125 | 3.095882 | 10.34846 | −2.9903 |
| ENSG00000204569 | PPP1R10 | 1.490549 | 7.509749 | 1.4679116 | 6.272891 | 1.63678 | 5.958457 | −1.23686 |
| ENSG00000234545 | FAM133B | 1.728222 | 5.435866 | 1.80462 | 4.714819 | 1.385111 | 4.269716 | −0.72105 |
| ENSG00000242485 | MRPL20 | 7.649653 | 25.5629 | 8.138561 | 20.94841 | 7.284605 | 19.93149 | −4.6145 |
| ENSG00000280071 | GATD3B | 2.354849 | 9.224216 | 2.982555 | 8.368882 | 2.728909 | 7.146999 | −0.85533 |
| ENSG00000007080 | CCDC124 | 3.484802 | 10.56282 | 3.248836 | 9.792948 | 4.038671 | 11.35513 | −0.76988 |
| ENSG00000025293 | PHF20 | 1.932494 | 6.355949 | 1.35598 | 5.168825 | 2.009011 | 5.498759 | −1.18712 |
| ENSG00000060339 | CCAR1 | 3.457773 | 11.92571 | 2.325179 | 8.997821 | 3.062925 | 9.071791 | −2.92789 |
| ENSG00000072501 | SMC1A | 2.451179 | 6.244867 | 1.829822 | 5.954146 | 2.434753 | 6.807411 | −0.29072 |
| ENSG00000072506 | HSD17B10 | 19.3163 | 50.65544 | 16.695 | 43.6912 | 17.79371 | 47.1509 | −6.96423 |
| ENSG00000087365 | SF3B2 | 1.893857 | 7.563373 | 1.859879 | 6.163109 | 1.796116 | 6.541416 | −1.40026 |
| ENSG00000100726 | TELO2 | 0.989372 | 2.606963 | 0.830008 | 2.116685 | 0.740601 | 2.183027 | −0.49028 |
| ENSG00000105197 | TIMM50 | 1.31037 | 4.379974 | 1.224871 | 3.708905 | 1.404208 | 4.18313 | −0.67107 |
| ENSG00000114867 | EIF4G1 | 3.297326 | 10.2048 | 2.331469 | 7.922531 | 2.701074 | 8.011848 | −2.2977 |
| ENSG00000116688 | MFN2 | 2.357098 | 7.467151 | 2.746792 | 7.207749 | 2.710775 | 8.389356 | −0.2594 |
| ENSG00000122218 | COPA | 9.94797 | 27.98416 | 7.206748 | 23.14972 | 7.141618 | 23.99373 | −4.83444 |
| ENSG00000130811 | EIF3G | 4.601413 | 13.33727 | 4.222712 | 11.42678 | 4.669985 | 12.52021 | −1.91049 |
| ENSG00000132323 | ILKAP | 0.91203 | 3.10427 | 1.032296 | 2.77547 | 1.163968 | 3.048342 | −0.3288 |
| ENSG00000134077 | THUMPD3 | 2.124667 | 5.731293 | 1.4866000 | 4.37668 | 1.522731 | 4.439748 | −1.35461 |
| ENSG00000136273 | HUS1 | 2.35064 | 6.559776 | 2.037425 | 5.444675 | 2.213944 | 5.590121 | −1.1151 |
| ENSG00000136485 | DCAF7 | 3.465378 | 11.7255 | 4.587856 | 11.54045 | 5.018448 | 13.83095 | −0.1801 |
| ENSG00000142751 | GPN2 | 0.878071 | 3.03352 | 0.943246 | 2.934469 | 1.439293 | 3.635631 | −0.09883 |
| ENSG00000145833 | DDX46 | 1.807209 | 5.603695 | 0.939955 | 4.622078 | 1.304642 | 4.74699 | −0.98162 |
| ENSG00000146223 | RPL7L1 | 4.91068 | 12.97256 | 4.030944 | 10.27951 | 3.643286 | 10.76118 | −2.69305 |
| ENSG00000161533 | ACOX1 | 2.301248 | 6.884947 | 1.848625 | 5.561857 | 2.269055 | 5.780057 | −1.32309 |
| ENSG00000168393 | DTYMK | 3.276593 | 8.407688 | 2.247484 | 6.598859 | 2.378551 | 7.073626 | −1.80883 |
| ENSG00000171497 | PPID | 9.784185 | 31.16847 | 9.439183 | 25.93985 | 9.28016 | 26.71362 | −5.22862 |
| ENSG00000175756 | AURKAIP1 | 6.954143 | 20.46441 | 6.461186 | 18.02858 | 7.453104 | 20.18935 | −2.43583 |
| ENSG00000179115 | FARSA | 5.105871 | 13.88489 | 4.086985 | 11.65663 | 4.389622 | 12.53125 | −2.22826 |
| ENSG00000179950 | PUF60 | 4.158035 | 14.11125 | 4.62492 | 12.51809 | 5.006054 | 14.12387 | −1.59316 |
| ENSG00000196504 | PRPF40A | 4.297091 | 13.09297 | 3.837922 | 10.69718 | 4.489687 | 11.29894 | −2.39579 |
| ENSG00000204574 | ABCF1 | 1.780809 | 6.444193 | 1.463887 | 6.152913 | 1.987505 | 6.952745 | −0.29128 |
| ENSG00000257727 | CNPY2 | 7.678734 | 21.28894 | 5.690854 | 15.82501 | 6.021633 | 15.98902 | −5.46394 |
| ENSG00000272886 | DCP1A | 2.055863 | 5.19849 | 1.656923 | 4.475636 | 1.648211 | 4.928423 | −0.72285 |
| ENSG00000071127 | WDR1 | 4.975054 | 16.63336 | 7.190021 | 21.55286 | 7.098504 | 21.12184 | 4.919494 |
| ENSG00000076108 | BAZ2A | 1.025259 | 3.100197 | 1.140454 | 3.105129 | 1.000644 | 2.506027 | 0.004932 |
| ENSG00000092841 | MYL6 | 38.17323 | 106.731 | 46.02643 | 132.406 | 49.01586 | 125.0503 | 25.67501 |
| ENSG00000102178 | UBL4A | 2.307161 | 7.721597 | 3.071992 | 8.623373 | 3.04799 | 7.998815 | 0.901776 |
| ENSG00000105341 | DMAC2 | 1.455979 | 4.862279 | 2.2726 | 5.985286 | 2.105497 | 5.721895 | 1.123008 |
| ENSG00000124702 | KLHDC3 | 9.993834 | 30.87984 | 11.53646 | 31.38377 | 9.792974 | 25.77409 | 0.503929 |
| ENSG00000141562 | NARF | 1.004419 | 3.303458 | 1.204759 | 3.884808 | 1.222945 | 3.569905 | 0.58135 |
| ENSG00000147439 | BIN3 | 0.97199 | 3.145842 | 1.393469 | 3.801864 | 1.309806 | 3.688318 | 0.656022 |
| ENSG00000159658 | EFCAB14 | 5.498938 | 18.34163 | 6.153656 | 18.81185 | 5.770563 | 15.30977 | 0.4702151 |
| ENSG00000169118 | CSNK1G1 | 1.190596 | 3.236117 | 1.35644 | 3.459766 | 1.150977 | 2.92519 | 0.223649 |
| ENSG00000172890 | NADSYN1 | 0.58573 | 1.908193 | 0.629844 | 2.044388 | 0.512503 | 1.759606 | 0.136196 |
| ENSG00000213983 | AP1G2 | 1.212767 | 3.545208 | 1.306784 | 3.779005 | 1.268604 | 3.208094 | 0.233796 |
| ENSG00000100605 | ITPK1 | 0.645422 | 2.427906 | 1.097423 | 3.245519 | 1.218672 | 3.249226 | 0.817614 |
| ENSG00000105401 | CDC37 | 8.367585 | 23.84263 | 8.796474 | 25.94997 | 10.13301 | 30.53469 | 2.10734 |
| ENSG00000116863 | ADPRHL2 | 4.87691 | 15.59635 | 7.097702 | 18.28533 | 7.830471 | 19.95686 | 2.688988 |
| ENSG00000161939 | RNASEK-C17orf49 | 4.582264 | 15.51043 | 6.114029 | 15.59456 | 7.407208 | 19.24082 | 0.084129 |
| ENSG00000166619 | BLCAP | 1.531452 | 4.373371 | 1.568093 | 4.861115 | 1.985467 | 5.23686 | 0.487744 |
| ENSG00000180370 | PAK2 | 2.35683 | 9.817479 | 3.543871 | 10.79756 | 4.880267 | 12.4472 | 0.980081 |
| ENSG00000186577 | SMIM29 | 1.622188 | 6.160342 | 2.564072 | 7.840532 | 2.76065 | 8.260291 | 1.680189 |
| ENSG00000269858 | EGLN2 | 1.353626 | 3.749704 | 1.634322 | 4.307293 | 1.675929 | 4.746 | 0.557589 |
| ENSG00000202702 | KIAA0100 | 1.885254 | 5.167496 | 1.604166 | 4.585347 | 1.28861 | 4.36934 | −0.58215 |
| ENSG00000021776 | AQR | 0.99515 | 3.05538 | 1.099213 | 2.789295 | 1.011232 | 2.530466 | −0.26574 |
| ENSG00000060971 | ACAA1 | 1.801216 | 5.61332 | 1.734291 | 5.550501 | 1.790369 | 4.879385 | −0.06282 |
| ENSG00000071462 | BUD23 | 2.79907 | 8.376582 | 2.467422 | 7.193203 | 2.471228 | 7.011255 | −1.18338 |
| ENSG00000074582 | BCS1L | 1.640996 | 4.804511 | 1.532779 | 4.197464 | 1.595022 | 4.063769 | −0.60705 |
| ENSG00000089737 | DDX24 | 1.78452 | 6.50875 | 1.876921 | 5.638727 | 1.272078 | 5.461299 | −0.87002 |
| ENSG00000090316 | MAEA | 1.133646 | 3.935955 | 1.078604 | 3.31568 | 1.087152 | 3.116926 | −0.62027 |
| ENSG00000099995 | SF3A1 | 1.395808 | 5.031884 | 1.572171 | 4.633404 | 1.39498 | 4.211216 | −0.39848 |
| ENSG00000100239 | PPP6R2 | 1.24322 | 3.330381 | 1.221203 | 3.275778 | 0.996166 | 2.862368 | −0.0546 |
| ENSG00000100281 | HMGXB4 | 1.252599 | 3.495804 | 1.012392 | 3.010508 | 1.102753 | 2.817594 | −0.4853 |
| ENSG00000101161 | PRPF6 | 5.572416 | 21.95938 | 5.844794 | 18.19586 | 5.692978 | 18.06189 | −3.76353 |
| ENSG00000101199 | ARFGAP1 | 0.998261 | 3.330276 | 0.990215 | 2.610287 | 0.894654 | 2.551998 | −0.71999 |
| ENSG00000102103 | PQBP1 | 3.466876 | 12.62619 | 3.075879 | 10.84645 | 3.345195 | 10.33065 | −1.77974 |
| ENSG00000105821 | DNAJC2 | 1.210398 | 4.041193 | 1.090844 | 3.172714 | 1.052542 | 3.148302 | −0.86848 |

TABLE 9-continued

| | | | | | | | | |
|---|---|---|---|---|---|---|---|---|
| ENSG00000109111 | SUPT6H | 0.672666 | 1.934314 | 0.662037 | 1.703452 | 0.558172 | 1.638593 | −0.23086 |
| ENSG00000113838 | TBCCD1 | 2.619149 | 7.845004 | 2.883547 | 7.478032 | 2.674583 | 6.698456 | −0.36697 |
| ENSG00000115685 | PPP1R7 | 3.529003 | 10.13419 | 3.413316 | 9.772556 | 2.791076 | 8.665191 | −0.36164 |
| ENSG00000116350 | SRSF4 | 2.087798 | 7.425881 | 1.857948 | 6.547075 | 1.960288 | 6.10623 | −0.87881 |
| ENSG00000123415 | SMUG1 | 0.925359 | 2.816775 | 0.940906 | 2.437719 | 0.778615 | 2.320969 | −0.37906 |
| ENSG00000124659 | TBCC | 7.449993 | 21.1335 | 6.947629 | 20.09639 | 6.839012 | 17.83071 | −1.03711 |
| ENSG00000126768 | TIMM17B | 3.855387 | 11.34384 | 3.191671 | 9.035009 | 3.040464 | 8.845944 | −2.30883 |
| ENSG00000131943 | C19orf12 | 1.03756 | 3.415958 | 1.20525 | 3.229332 | 1.1536 | 2.991732 | −0.18663 |
| ENSG00000132153 | DHX30 | 1.01528 | 4.131279 | 1.230383 | 3.496469 | 1.216115 | 3.251356 | −0.63481 |
| ENSG00000138433 | CIR1 | 5.609382 | 14.28897 | 4.05808 | 12.20785 | 4.65298 | 11.88619 | −2.08112 |
| ENSG00000143222 | UFC1 | 14.013 | 45.51224 | 13.48588 | 38.85686 | 14.60553 | 37.24033 | −6.65539 |
| ENSG00000144028 | SNRNP200 | 1.907392 | 7.429613 | 1.773474 | 6.440909 | 1.922615 | 6.253216 | −0.9887 |
| ENSG00000146540 | C7orf50 | 1.279027 | 4.65005 | 1.508267 | 4.158392 | 1.385763 | 3.937443 | −0.49166 |
| ENSG00000149532 | CPSF7 | 0.824169 | 2.518588 | 0.850596 | 2.193724 | 0.739793 | 2.065914 | −0.32486 |
| ENSG00000151657 | KIN | 1.013542 | 2.646854 | 0.736798 | 2.099953 | 0.778189 | 2.050764 | −0.5469 |
| ENSG00000155229 | MMS19 | 1.456794 | 4.486747 | 1.368803 | 4.422705 | 1.37188 | 3.857822 | −0.06404 |
| ENSG00000156304 | SCAFA | 0.876514 | 3.158617 | 0.976463 | 2.643614 | 0.68575 | 2.593566 | −0.515 |
| ENSG00000158615 | PPP1R15B | 2.696149 | 7.920456 | 2.500561 | 6.914975 | 2.235463 | 6.46818 | −1.00548 |
| ENSG00000159140 | SON | 3.89732 | 12.58251 | 3.78007 | 10.96549 | 4.09115 | 10.49934 | −1.61701 |
| ENSG00000160221 | GATD3A | 1.543996 | 4.475848 | 1.333718 | 3.97237 | 1.276009 | 3.715514 | −0.50348 |
| ENSG00000160710 | ADAR | 3.774394 | 14.29611 | 4.091496 | 11.29363 | 3.965186 | 11.08474 | −3.00249 |
| ENSG00000160799 | CCDC12 | 1.777541 | 7.478285 | 1.847045 | 6.461332 | 1.953881 | 6.185685 | −1.01695 |
| ENSG00000162385 | MAGOH | 4.482607 | 15.10972 | 5.07875 | 13.54763 | 5.000691 | 12.62888 | −1.56209 |
| ENSG00000167792 | NDUFV1 | 3.302169 | 10.82465 | 3.287569 | 10.1717 | 3.241303 | 9.105724 | −0.65295 |
| ENSG00000169976 | SF3B5 | 22.74899 | 73.63043 | 23.60412 | 63.60329 | 22.30812 | 61.10248 | −10.0271 |
| ENSG00000173141 | MRPL57 | 6.84634 | 22.5096 | 6.785059 | 18.44337 | 6.502713 | 18.38389 | −4.05759 |
| ENSG00000174197 | MGA | 0.823573 | 3.065799 | 1.034523 | 2.96328 | 0.826886 | 2.593665 | −0.10252 |
| ENSG00000176095 | IP6K1 | 2.36348 | 6.107975 | 2.376101 | 5.989962 | 1.896403 | 5.139893 | −0.11801 |
| ENSG00000181610 | MRPS23 | 2.945962 | 9.11662 | 2.976175 | 8.001605 | 2.928566 | 7.772136 | −1.11501 |
| ENSG00000181852 | RNF41 | 1.543935 | 4.927627 | 1.302379 | 4.523739 | 1.32511 | 4.096918 | −0.40389 |
| ENSG00000184110 | EIF3C | 4.300431 | 13.66753 | 3.550308 | 11.30937 | 4.13915 | 11.20744 | −2.35816 |
| ENSG00000188186 | LAMTOR4 | 4.913028 | 16.22442 | 5.315374 | 14.35259 | 5.226725 | 13.39895 | −1.87183 |
| ENSG00000197226 | TBC1D9B | 1.576706 | 4.917482 | 1.281924 | 4.551449 | 1.23217 | 4.1647 | −0.36663 |
| ENSG00000205609 | EIF3CL | 10.31022 | 34.06266 | 8.677399 | 27.43907 | 9.727374 | 27.01602 | −6.62359 |
| ENSG00000211450 | SELENOH | 3.295098 | 13.93789 | 4.140357 | 12.43774 | 4.334006 | 11.64794 | −1.50014 |
| ENSG00000214253 | FIS1 | 14.45243 | 37.18333 | 10.45028 | 31.42667 | 11.78432 | 30.6112 | −5.75666 |
| ENSG00000214736 | TOMM6 | 43.14685 | 122.3927 | 32.60951 | 101.8026 | 39.63897 | 100.8429 | −20.5901 |
| ENSG00000248333 | CDK11B | 1.848309 | 4.94657 | 1.518306 | 3.924712 | 1.517309 | 3.910667 | −1.02186 |
| ENSG00000278259 | MYO19 | 0.373569 | 1.203601 | 0.383483 | 1.125251 | 0.38931 | 1.008415 | −0.07835 |
| ENSG00000008838 | MED24 | 0.850702 | 2.673359 | 0.607819 | 2.370987 | 0.89769 | 2.515289 | −0.30237 |
| ENSG00000032389 | EIPR1 | 1.019464 | 2.756697 | 0.943954 | 2.47022 | 1.012962 | 2.601457 | −0.28648 |
| ENSG00000086504 | MRPL28 | 2.77143 | 7.718536 | 2.72654 | 7.311983 | 3.10671 | 7.968969 | −0.40655 |
| ENSG00000100395 | L3MBTL2 | 0.798284 | 2.607635 | 0.849088 | 2.383371 | 0.896499 | 2.589083 | −0.22426 |
| ENSG00000100865 | CINP | 1.602141 | 4.458805 | 1.555456 | 3.924752 | 1.588426 | 4.064205 | −0.53405 |
| ENSG00000103275 | UBE2I | 2.447684 | 6.240766 | 2.430821 | 6.091268 | 2.389938 | 7.18451 | −0.1495 |
| ENSG00000104969 | SGTA | 2.030704 | 5.538183 | 1.957998 | 5.027469 | 2.121074 | 5.505519 | −0.51071 |
| ENSG00000105669 | COPE | 10.2307 | 30.47792 | 10.54208 | 28.05564 | 10.50588 | 30.60499 | −2.42227 |
| ENSG00000107223 | EDF1 | 37.59101 | 117.1326 | 35.138 | 108.185 | 46.26798 | 120.5258 | −8.94757 |
| ENSG00000111669 | TPI1 | 95.95001 | 281.1777 | 97.32365 | 257.0091 | 108.2422 | 282.2271 | −24.1686 |
| ENSG00000126254 | RBM42 | 2.974976 | 10.18138 | 2.884835 | 9.113223 | 3.470675 | 9.433469 | −1.06815 |
| ENSG00000131143 | COX4I1 | 6.840099 | 18.37495 | 5.461598 | 16.28799 | 5.273454 | 16.99942 | −2.08696 |
| ENSG00000133316 | WDR74 | 1.456618 | 4.756941 | 1.277535 | 4.248873 | 1.692673 | 4.481674 | −0.50807 |
| ENSG00000136270 | TBRG4 | 0.995177 | 3.057037 | 0.944849 | 2.987446 | 1.134229 | 3.530603 | −0.06959 |
| ENSG00000136930 | PSMB7 | 23.17096 | 67.96639 | 22.43313 | 59.75661 | 23.81566 | 64.17501 | −8.20978 |
| ENSG00000138107 | ACTR1A | 5.611399 | 18.19821 | 5.933956 | 15.91885 | 6.212952 | 16.71464 | −2.27936 |
| ENSG00000140400 | MAN2C1 | 0.790195 | 2.131725 | 0.711577 | 1.848461 | 0.772789 | 1.963487 | −0.28326 |
| ENSG00000154832 | CXXC1 | 1.247244 | 4.293145 | 1.305424 | 3.775517 | 1.28744 | 3.899628 | −0.51763 |
| ENSG00000158417 | EIF5B | 2.575055 | 11.23778 | 1.898015 | 9.775524 | 2.639952 | 10.34079 | −1.46226 |
| ENSG00000160948 | VPS28 | 4.361961 | 13.0095 | 4.050088 | 11.39173 | 4.38734 | 11.88392 | −1.61777 |
| ENSG00000162191 | UBXN1 | 5.17693 | 13.02621 | 4.463995 | 11.32477 | 4.01932 | 11.78846 | −1.70144 |
| ENSG00000163166 | IWS1 | 2.895739 | 8.062034 | 2.538006 | 8.040823 | 3.031138 | 9.108281 | −0.02121 |
| ENSG00000163714 | U2SURP | 1.619849 | 4.667309 | 1.112241 | 3.657679 | 1.423692 | 3.662657 | −1.00963 |
| ENSG00000167397 | VKORC1 | 8.946964 | 23.27093 | 7.5993 | 22.45296 | 8.78345 | 24.30814 | −0.81798 |
| ENSG00000168259 | DNAJC7 | 2.263729 | 8.687131 | 2.81542 | 8.053218 | 3.174583 | 8.72458 | −0.63391 |
| ENSG00000168894 | RNF181 | 14.8558 | 39.64523 | 12.36 | 36.06909 | 14.08216 | 39.8073 | −3.57613 |
| ENSG00000173113 | TRMT112 | 16.01942 | 46.68657 | 15.55178 | 40.8494 | 16.41899 | 43.53501 | −5.83717 |
| ENSG00000174744 | BRMS1 | 2.434604 | 8.498895 | 2.965804 | 8.467501 | 3.514556 | 9.953978 | −0.0313 |
| ENSG00000182944 | EWSR1 | 4.259127 | 14.02238 | 4.829507 | 12.68406 | 5.060188 | 14.17214 | −1.33832 |
| ENSG00000185627 | PSMD13 | 4.90791 | 14.71771 | 4.300052 | 11.81374 | 4.638436 | 11.93426 | −2.90397 |
| ENSG00000187514 | PTMA | 60.53585 | 171.2906 | 52.38758 | 157.1646 | 63.15286 | 175.6049 | −14.126 |
| ENSG00000205937 | RNPS1 | 2.545673 | 6.596057 | 2.176734 | 5.702342 | 2.080855 | 5.921392 | −0.89372 |
| ENSG00000277791 | PSMB3 | 24.09348 | 87.85414 | 26.49634 | 80.33839 | 32.11789 | 87.17928 | −7.51575 |
| ENSG00000022840 | RNF10 | 4.124897 | 13.06669 | 4.695451 | 13.23788 | 3.841732 | 11.60247 | 0.171186 |
| ENSG00000088356 | PDRG1 | 3.22225 | 11.41951 | 3.941331 | 2.252918 | 4.25517 | 11.28455 | 0.833469 |
| ENSG00000097033 | SH3GLB1 | 4.872604 | 15.69689 | 5.945007 | 17.08089 | 6.28436 | 15.84612 | 1.383997 |
| ENSG00000105254 | TBCB | 4.021811 | 12.77741 | 4.386249 | 13.70861 | 4.196929 | 12.60928 | 0.931198 |
| ENSG00000114125 | RNF7 | 8.807381 | 25.96327 | 10.66548 | 27.17865 | 9.6873 | 24.84654 | 1.215381 |
| ENSG00000122359 | ANXA11 | 5.392663 | 15.04209 | 5.790856 | 16.17268 | 4.98396 | 14.59244 | 1.130591 |
| ENSG00000126107 | HECTD3 | 1.868301 | 4.732659 | 1.931559 | 6.031432 | 2.133434 | 5.928047 | 1.298773 |
| ENSG00000128989 | ARPP19 | 4.560193 | 15.42504 | 4.772279 | 17.10847 | 5.656387 | 15.66813 | 1.68343 |

TABLE 9-continued

| | | | | | | | | |
|---|---|---|---|---|---|---|---|---|
| ENSG00000131408 | NR1H2 | 2.823941 | 10.08903 | 3.257955 | 11.1802 | 3.261862 | 10.34818 | 1.09117 |
| ENSG00000136950 | ARPCSL | 3.1496 | 19.411897 | 4.083229 | 10.4296 | 3.631167 | 9.306381 | 1.01771 |
| ENSG00000137996 | RTCA | 7.64598 | 19.62148 | 7.507427 | 21.5464 | 7.14114 | 19.45891 | 1.924916 |
| ENSG00000143774 | GUK1 | 3.912446 | 11.6756 | 4.382891 | 12.3948 | 3.29002 | 11.02057 | 0.787247 |
| ENSG00000148634 | HERC4 | 1.020177 | 2.899314 | 0.9594 | 3.18416 | 1.119979 | 2.905692 | 0.284846 |
| ENSG00000158195 | WASF2 | 8.252392 | 32.00583 | 613.3253 | 35.6854 | 10.94674 | 33.79496 | 3.679566 |
| ENSG00000160688 | FLAD1 | 2.028045 | 6.486646 | 2.423461 | 6.800805 | 2.411686 | 6.273682 | 0.314159 |
| ENSG00000166750 | SLEN5 | 2.290682 | 6.404668 | 2.489836 | 7.237027 | 2.698337 | 6.88249 | 0.832359 |
| ENSG00000173915 | ATP5MD | 48.2763 | 135.7042 | 52.67174 | 136.1447 | 45.85983 | 116.9403 | 0.440444 |
| ENSG00000175203 | DCTN2 | 6.78014 | 20.04793 | 7.565467 | 20.52037 | 6.45734 | 17.72189 | 0.472436 |
| ENSG00000242498 | ARPIN | 1.022293 | 3.158621 | 1.244737 | 3.639496 | 1.306477 | 3.508741 | 0.480875 |
| ENSG00000255112 | CHMP1B | 9.576714 | 30.24547 | 11.45257 | 33.94859 | 11.10382 | 32.00321 | 3.703115 |
| ENSG00000011009 | LYPLAZ | 3.457347 | 11.11917 | 4.974967 | 13.00175 | 4.697886 | 13.76412 | 1.882573 |
| ENSG00000078902 | TOLLIP | 0.897776 | 2.773136 | 1.071311 | 3.19534 | 1.31771 | 3.408339 | 0.422204 |
| ENSG00000095485 | CWF19L1 | 1.990764 | 5.387267 | 1.952121 | 5.823229 | 2.456427 | 6.342664 | 0.435962 |
| ENSG00000104518 | GSDMD | 1.535334 | 4.148679 | 1.622931 | 4.51356 | 1.812567 | 5.096954 | 0.364827 |
| ENSG00000125826 | RBCK1 | 1.838603 | 6.986701 | 2.552366 | 7.289793 | 2.622563 | 8.119584 | 0.303092 |
| ENSG00000159069 | FBXW5 | 2.740687 | 8.966902 | 3.117606 | 9.226289 | 3.671254 | 10.66812 | 0.259387 |
| ENSG00000161217 | PCYT1A | 0.956775 | 4.06723 | 1.299381 | 4.306161 | 1.564964 | 4.834966 | 0.238931 |
| ENSG00000275700 | AATF | 1.99257 | 5.919943 | 2.408384 | 6.181714 | 2.551237 | 6.8194 | 0.261771 |
| ENSG00000011007 | ELOA | 2.077893 | 7.467556 | 2.388005 | 7.181901 | 2.344188 | 6.772423 | −0.28565 |
| ENSG00000041802 | LSG1 | 2.209779 | 6.502824 | 1.828624 | 5.946766 | 2.283388 | 5.752004 | −0.55606 |
| ENSG00000061936 | SFSWAP | 0.634897 | 1.716368 | 0.634202 | 1.672753 | 0.563784 | 1.488129 | −0.04361 |
| ENSG00000071894 | CPSF1 | 0.657847 | 2.46936 | 0.679383 | 2.216683 | 0.764453 | 2.185655 | −0.25268 |
| ENSG00000075856 | SART3 | 1.095455 | 3.412066 | 1.080078 | 2.939074 | 1.045292 | 2.872801 | −0.47299 |
| ENSG00000105127 | AKAP8 | 1.455843 | 4.34727 | 1.555783 | 4.239942 | 1.480665 | 3.914685 | −0.10078 |
| ENSG00000115207 | GTF3C2 | 1.951777 | 6.132782 | 1.76971 | 5.632307 | 1.754798 | 5.495424 | −0.50047 |
| ENSG00000118579 | MED28 | 1.471357 | 5.5498 | 1.895498 | 5.081234 | 1.768496 | 4.943439 | −0.46857 |
| ENSG00000119402 | FBXW2 | 1.284673 | 4.99713 | 1.409291 | 4.287726 | 1.387005 | 4.191235 | −0.7094 |
| ENSG00000125651 | GTF2F1 | 3.706308 | 12.44653 | 3.224442 | 10.75477 | 3.101214 | 10.64468 | −1.69175 |
| ENSG00000126775 | ATG14 | 1.425824 | 3.688868 | 1.140262 | 3.621246 | 1.216906 | 3.28405 | −0.06762 |
| ENSG00000133997 | MED6 | 2.491645 | 7.420399 | 2.103712 | 6.452951 | 2.239706 | 6.412902 | −0.96745 |
| ENSG00000135974 | C2orf49 | 0.732561 | 2.228536 | 0.820116 | 2.197593 | 0.757895 | 1.981323 | −0.03094 |
| ENSG00000141551 | CSNK1D | 1.116357 | 4.502262 | 1.58227 | 4.366299 | 1.377315 | 3.871241 | −0.13596 |
| ENSG00000143093 | STRIP1 | 1.116275 | 3.123594 | 1.180358 | 3.070398 | 1.109798 | 2.796901 | −0.0532 |
| ENSG00000143393 | PI4KB | 1.837157 | 5.624428 | 1.926287 | 5.492695 | 1.530793 | 5.013336 | −0.13173 |
| ENSG00000143751 | SDE2 | 4.206853 | 11.9307 | 3.664389 | 11.07498 | 3.4523 | 10.5134 | −0.82808 |
| ENSG00000160075 | SSU72 | 3.061399 | 10.80392 | 3.214266 | 10.52759 | 3.180659 | 9.61638 | −0.27633 |
| ENSG00000165525 | NEMF | 3.218746 | 10.5683 | 3.134736 | 10.24488 | 3.537451 | 9.457552 | −0.32343 |
| ENSG00000166783 | MARF1 | 1.08377 | 3.293645 | 1.139743 | 3.08444 | 1.098171 | 2.961535 | −0.2092 |
| ENSG00000167863 | ATP5PD | 18.201392 | 50.0318 | 17.23406 | 48.7451 | 16.06352 | 45.1478 | −1.28508 |
| ENSG00000167986 | DDB1 | 2.63073 | 6.751615 | 2.293828 | 6.612375 | 1.997737 | 5.991381 | −0.13924 |
| ENSG00000170445 | HARS | 621.804 | 6.052568 | 2.074769 | 5.595697 | 1.985543 | 5.316107 | −0.45687 |
| ENSG00000173575 | CHD2 | 1.401394 | 4.443006 | 1.415562 | 4.415837 | 1.491396 | 4.062557 | −0.02717 |
| ENSG00000179119 | SPTY2D1 | 1.2286 | 4.818319 | 1.229379 | 4.406276 | 1.278793 | 4.170052 | −0.41204 |
| ENSG00000186566 | GPATCH8 | 1.287977 | 4.382601 | 1.002916 | 3.950388 | 1.120628 | 3.799679 | −0.43221 |
| ENSG00000196470 | SIAH1 | 1.060188 | 2.858973 | 0.976985 | 2.811138 | 0.961855 | 2.500882 | −0.04783 |
| ENSG00000198258 | UBL5 | 21.96786 | 66.7078 | 19.29724 | 61.85587 | 16.24996 | 59.18295 | −4.85193 |
| ENSG00000204438 | GPANK1 | 1.204394 | 4.091675 | 1.386527 | 3.94604 | 1.132736 | 3.726196 | −0.14563 |
| ENSG00000204560 | DHX16 | 1.565611 | 5.802 | 1.936778 | 5.610718 | 1.883729 | 5.180422 | −0.19128 |
| ENSG00000205531 | NAP1L4 | 4.016885 | 14.82149 | 4.484947 | 14.64624 | 4.595157 | 13.4789 | −0.17525 |
| ENSG00000001497 | LAS1L | 1.533712 | 4.72106 | 1.589894 | 4.204406 | 1.633333 | 4.249298 | −0.51665 |
| ENSG00000055044 | NOP58 | 7.840255 | 23.94099 | 6.660692 | 20.3282 | 7.817441 | 20.66276 | −3.61279 |
| ENSG00000067829 | IDH3G | 4.829668 | 17.30182 | 5.673304 | 15.64062 | 5.734186 | 16.5379 | −1.6612 |
| ENSG00000080824 | HSP90AA1 | 38.66647 | 138.2683 | 43.92221 | 131.2859 | 47.75896 | 135.8815 | −6.98246 |
| ENSG00000100387 | RBX1 | 8.931103 | 34.75138 | 9.139082 | 130.92517 | 9.301527 | 31.2584 | −3.82621 |
| ENSG00000105618 | PRPF31 | 3.190017 | 11.00893 | 3.785333 | 10.59926 | 4.114003 | 11.25916 | −0.40967 |
| ENSG00000114383 | TUSC2 | 1.976014 | 8.21119 | 2.502401 | 7.479946 | 2.306571 | 7.926689 | −0.73124 |
| ENSG00000117360 | PRPF3 | 1.618708 | 6.04191 | 1.643587 | 5.841345 | 2.160695 | 6.312804 | −0.20056 |
| ENSG00000130175 | PRKCSH | 1.878006 | 4.743744 | 1.475421 | 4.317211 | 1.603531 | 4.447954 | −0.42653 |
| ENSG00000130640 | TUBGCP2 | 1.290313 | 4.632972 | 1.385907 | 4.355662 | 1.848722 | 4.641406 | −0.27731 |
| ENSG00000131381 | RBSN | 0.956632 | 3.164229 | 0.679182 | 2.659484 | 0.885541 | 2.691299 | −0.50475 |
| ENSG00000136758 | YME1L1 | 5.684487 | 18.84389 | 5.870192 | 17.85138 | 7.129489 | 19.17124 | −0.99252 |
| ENSG00000143321 | HDGF | 5.258542 | 13.57692 | 4.956784 | 13.37065 | 5.856278 | 14.8241 | −0.20627 |
| ENSG00000143575 | HAX1 | 5.197952 | 18.13696 | 6.804013 | 17.63728 | 7.026017 | 19.00265 | −0.49968 |
| ENSG00000143799 | PARP1 | 3.260902 | 11.0916 | 3.266135 | 9.385451 | 3.406527 | 9.442533 | −1.70615 |
| ENSG00000151304 | SRFBP1 | 2.531451 | 7.999186 | 2.689767 | 6.752766 | 2.465097 | 6.773948 | −1.24642 |
| ENSG00000156990 | RPUSD3 | 0.831588 | 3.388624 | 1.086515 | 3.161661 | 1.177507 | 3.314018 | −0.22696 |
| ENSG00000166716 | ZNF592 | 0.854465 | 2.377401 | 0.865146 | 2.222026 | 0.839551 | 2.304886 | −0.15537 |
| ENSG00000168411 | RFWD3 | 1.177729 | 3.006979 | 0.907521 | 2.879328 | 1.008496 | 2.995094 | −0.12765 |
| ENSG00000173486 | FKBP2 | 15.79619 | 41.38974 | 12.69464 | 40.12563 | 17.60642 | 45.10856 | −1.26411 |
| ENSG00000176715 | ACSF3 | 0.663005 | 1.721213 | 0.432541 | 1.616589 | 0.610559 | 1.684246 | −0.10462 |
| ENSG00000177156 | TALDO1 | 23.26834 | 60.29511 | 23.21524 | 59.91059 | 25.24813 | 65.54948 | −0.38452 |
| ENSG00000183258 | DDX41 | 2.115469 | 7.181735 | 2.20376 | 6.674489 | 2.683672 | 6.863456 | −0.50725 |
| ENSG00000185324 | CDK10 | 1.090756 | 3.568077 | 1.049088 | 3.083024 | 1.244879 | 3.112982 | −0.48505 |
| ENSG00000187051 | RPS19BP1 | 2.637297 | 6.884116 | 2.083421 | 6.309098 | 2.385503 | 6.468287 | −0.57502 |
| ENSG00000204316 | MRPL38 | 1.816719 | 5.409063 | 1.850946 | 5.137155 | 2.090869 | 5.498922 | −0.27191 |
| ENSG00000204435 | CSNK2B | 8.709422 | 24.1507 | 8.526073 | 21.450831 | 7.260873 | 21.8178 | −2.69987 |
| ENSG00000204568 | MRPS18B | 12.67525 | 40.01786 | 13.10999 | 34.68784 | 12.93735 | 34.90621 | −5.33002 |
| ENSG00000105287 | PRKD2 | 0.52339 | 1.764715 | 0.684672 | 1.824955 | 0.617597 | 1.635795 | 0.06024 |

TABLE 9-continued

| | | | | | | | | |
|---|---|---|---|---|---|---|---|---|
| ENSG00000114316 | USP4 | 2.145871 | 7.402038 | 3.031765 | 8.790349 | 3.116482 | 8.588733 | 1.38831 |
| ENSG00000116213 | WRAP73 | 0.497274 | 1.348691 | 0.544061 | 1.45484 | 0.504399 | 1.408344 | 0.106149 |
| ENSG00000131165 | CHMP1A | 4.202745 | 14.992 | 5.092555 | 16.1799 | 4.949363 | 15.50476 | 1.1879 |
| ENSG00000136807 | CDK9 | 1.332983 | 3.937904 | 1.684565 | 4.278083 | 1.609093 | 4.028209 | 0.34017 |
| ENSG00000140632 | GLYR1 | 1.78652 | 5.390763 | 2.067988 | 5.63968 | 2.179168 | 5.45836 | 0.248926 |
| ENSG00000173039 | RELA | 1.245306 | 3.804933 | 1.105345 | 4.147152 | 1.24283 | 3.880269 | 0.34222 |
| ENSG00000183576 | SETD3 | 3.158208 | 8.018345 | 3.188175 | 8.917418 | 3.416568 | 8.79603 | 0.899073 |
| ENSG00000185043 | CIB1 | 27.71986 | 82.40357 | 32.89977 | 89.86962 | 30.95425 | 84.15947 | 7.466044 |
| ENSG00000186432 | KPNA4 | 1.238121 | 4.923419 | 1.490277 | 5.457616 | 1.492707 | 5.105121 | 0.534197 |
| ENSG00000198373 | WWP2 | 0.73548 | 2.576244 | 0.924712 | 2.83368 | 0.845165 | 2.704087 | 0.257437 |
| ENSG00000204843 | DCTN1 | 1.695638 | 4.713689 | 1.716069 | 5.030433 | 1.802343 | 4.773907 | 0.316744 |
| ENSG00000257923 | CUX1 | 0.748514 | 2.746558 | 0.947978 | 2.803177 | 0.944275 | 2.54863 | 0.05661 |
| ENSG00000275066 | SYNRG | 0.655826 | 1.856852 | 0.720092 | 1.892344 | 0.603283 | 1.735563 | 0.035492 |
| ENSG00000068400 | GRIPAP1 | 0.970562 | 3.244826 | 0.734699 | 83.37526 | 1.204106 | 3.572611 | 0.130443 |
| ENSG00000110801 | PSMD9 | 1.173022 | 4.177356 | 1.669158 | 4.559201 | 1.648713 | 4.676989 | 0.381845 |
| ENSG00000113648 | H2AFY | 0.979149 | 3.111081 | 1.146986 | 3.18673 | 1.347724 | 3.554212 | 0.075649 |
| ENSG00000132522 | GPS2 | 1.994277 | 5.993148 | 2.345506 | 6.618069 | 2.230951 | 6.945682 | 0.624921 |
| ENSG00000134287 | ARF3 | 3.632276 | 11.45576 | 3.840739 | 12.4466 | 4.436333 | 13.31715 | 0.990839 |
| ENSG00000135930 | EIF4E2 | 3.418859 | 10.47993 | 4.02329 | 10.74755 | 4.596517 | 11.86904 | 0.267623 |
| ENSG00000161526 | SAP30BP | 1.133961 | 3.494586 | 1.381152 | 3.784809 | 1.281628 | 3.883462 | 0.290223 |
| ENSG00000178950 | GAK | 0.508967 | 1.644178 | 0.626035 | 1.801061 | 0.561579 | 1.874015 | 0.156883 |
| ENSG00000196262 | PPIA | 72.38148 | 218.3481 | 79.17863 | 228.0793 | 86.32401 | 240.2416 | 9731229 |
| ENSG00000196363 | WDR5 | 1.83187 | 4.949949 | 1.686385 | 4.958214 | 1.821899 | 5.393887 | 0.008265 |
| ENSG00000198952 | SMG5 | 2.117479 | 5.733044 | 2.320888 | 6.552754 | 2.31611 | 6.700934 | 0.819709 |
| ENSG00000006712 | PAF1 | 3.550562 | 9.497914 | 2.973942 | 8.646701 | 2.95198 | 8.491629 | −0.85121 |
| ENSG00000108256 | NUFIP2 | 1.282618 | 5.328209 | 1.613919 | 5.145952 | 1.876129 | 4.832825 | −0.18226 |
| ENSG00000124209 | RAB22A | 1.377154 | 4.630234 | 1.341941 | 4.238277 | 1.472174 | 4.197426 | 1−0.39196 |
| ENSG00000124228 | DDX27 | 1.741948 | 5.817505 | 1.819657 | 5.722629 | 2.082308 | 5.461451 | −0.09488 |
| ENSG00000124570 | SERPINB6 | 5.994283 | 15.86333 | 6.083504 | 15.86133 | 5.854104 | 15.14942 | −0.002 |
| ENSG00000126267 | COX6B1 | 43.35286 | 123.1466 | 34.99703 | 111.7001 | 30.04725 | 109.2097 | −11.4465 |
| ENSG00000134809 | TIMM10 | 16.64852 | 48.6211 | 13.917 | 44.37395 | 16.74438 | 43.51097 | 4.24715 |
| ENSG00000140983 | RHOT2 | 1.290268 | 3.804814 | 1.345306 | 3.513731 | 1.320983 | 3.471414 | 0.29108 |
| ENSG00000151461 | UPF2 | 1.903732 | 5.052171 | 1.63328 | 14.67564 | 1.4621161 | 4.639569 | −0.37653 |
| ENSG00000169018 | FEM18 | 2.185529 | 6.269595 | 1.666992 | 5.749669 | 1.655384 | 5.61207 | −0.51993 |
| ENSG00000172500 | FIBP | 3.536489 | 10.76402 | 3.392667 | 9.774957 | 3.71503 | 9.628084 | −0.98906 |
| ENSG00000204356 | NELFE | 5.399039 | 17.66619 | 6.101318 | 17.40588 | 5.888725 | 16.97052 | −0.26031 |
| ENSG00000234127 | TRIM26 | 2.179724 | 7.298135 | 2.340352 | 7.058123 | 2.660729 | 6.726432 | −0.24001 |
| ENSG00000031823 | RANBP3 | 0.534342 | 2.034538 | 0.623712 | 1.975661 | 0.78937 | 2.101385 | −0.05888 |
| ENSG00000058272 | PPP1R12A | 1.745592 | 5.700161 | 1.409948 | 5.367002 | 2.055025 | 5.457106 | −0.33316 |
| ENSG00000078061 | ARAF | 1.718728 | 5.502577 | 2.072335 | 5.33724 | 2.13076 | 5.708932 | −0.16534 |
| ENSG00000083168 | KAT6A | 0.856917 | 3.306908 | 1.083454 | 3.287762 | 1.297868 | 3.527142 | −0.01915 |
| ENSG00000099341 | PSMD8 | 8.777783 | 29.95189 | 9.117328 | 27.9179 | 10.77397 | 28.35369 | −2.034 |
| ENSG00000125656 | CLPP | 2.494064 | 8.240492 | 2.798617 | 8.055598 | 3.151093 | 8.458858 | −0.18489 |
| ENSG00000136271 | DDX56 | 3.429117 | 10.34221 | 3.306038 | 9.577423 | 3.659162 | 9.691937 | −0.76479 |
| ENSG00000166595 | CIAO2B | 12.06727 | 44.13475 | 16.0722 | 43.04284 | 17.27036 | 46.19073 | −1.0919 |
| ENSG00000169217 | CD2BP2 | 4.127896 | 13.26195 | 4.236823 | 12.1943 | 4.131753 | 12.42404 | −1.06764 |
| ENSG00000178741 | COX5A | 24.99369 | 85.51637 | 31.27551 | 83.05511 | 33.3705 | 85.9972 | −2.46126 |
| ENSG00000178952 | TUFM | 13.61911 | 41.02255 | 12.09686 | 38.05297 | 14.39412 | 38.90961 | −2.96958 |
| ENSG00000179639 | EIF3K | 9.554851 | 30.95741 | 10.58495 | 28.64539 | 9.702876 | 28.66914 | −2.31202 |
| ENSG00000180992 | MRPL14 | 18.49092 | 69.75207 | 22.74702 | 64.13903 | 24.56106 | 64.43588 | −5.61304 |
| ENSG00000182196 | ARL6IP4 | 3.602912 | 10.59358 | 3.392439 | 9.54607 | 2.721362 | 9.669329 | −1.04751 |
| ENSG00000186501 | TMEM222 | 1.673215 | 4.263818 | 1.385268 | 4.164391 | 1.764607 | 4.449155 | −0.09943 |
| ENSG00000196821 | C6orf106 | 2.0881 | 5.863957 | 1.462424 | 5.679433 | 1.745855 | 5.895886 | −0.18452 |
| ENSG00000273559 | CWC25 | 1.817873 | 5.510367 | 1.462889 | 5.477479 | 1.974971 | 5.824598 | −0.03289 |
| ENSG00000040059 | ARF5 | 11.94557 | 42.90629 | 14.21318 | 43.31796 | 15.78221 | 41.90367 | 0.411673 |
| ENSG00000028528 | SNX1 | 2.594722 | 8.289577 | 2.978393 | 8.327048 | 2.883912 | 7.995867 | 0.037471 |
| ENSG00000095380 | NANS | 3.05533 | 10.76101 | 3.546444 | 10.8728 | 3.814715 | 10.46764 | 0.111792 |
| ENSG00000099940 | SNAP29 | 2.162801 | 8.850184 | 2.711607 | 8.903783 | 3.025736 | 8.586088 | 0.053599 |
| ENSG00000135940 | COX5B | 31.34853 | 88.26126 | 33.59708 | 88.74073 | 29.62725 | 85.84588 | 0.479466 |
| ENSG00000160087 | UBE2J2 | 1.43528 | 3.97989 | 1.544568 | 4.003802 | 1.305905 | 3.804151 | 0.023911 |
| ENSG00000162517 | PEF1 | 7.784163 | 24.65086 | 9.380696 | 25.40641 | 7.893977 | 24.67675 | 0.755549 |
| ENSG00000163812 | ZDHHC3 | 1.496319 | 4.964912 | 1.46282 | 5.010657 | 1.564761 | 4.829122 | 0.045746 |
| ENSG00000171824 | EXOSC10 | 1.639258 | 5.174855 | 1.667616 | 5.276823 | 1.769052 | 5.072756 | 0.101968 |
| ENSG00000173120 | KDM2A | 0.984729 | 3.212804 | 1.238764 | 3.284428 | 0.985428 | 3.058062 | 0.071624 |
| ENSG00000187778 | MCRS1 | 2.1578 | 7.055245 | 1.958122 | 7.55892 | 2.632708 | 7.457083 | 0.503674 |
| ENSG00000242372 | EIF6 | 17.64881 | 61.35145 | 20.85762 | 63.69959 | 21.99355 | 62.63035 | 2.348134 |
| ENSG00000089159 | PXN | 1.703264 | 4.970791 | 1.494117 | 5.289334 | 1.422511 | 5.305485 | 0.318543 |
| ENSG00000099917 | MED15 | 0.7871 | 2.004089 | 0.780277 | 2.112689 | 0.808554 | 2.158162 | 0.108599 |
| ENSG00000128891 | CCDC32 | 410.957 | 3.015116 | 0.930491 | 3.01815 | 1.217866 | 3.150184 | 0.003033 |
| ENSG00000129071 | MBD4 | 2.757253 | 6.976865 | 2.532265 | 7.027673 | 2.629312 | 7.33079 | 0.050808 |
| ENSG00000130305 | NSUN5 | 1.204566 | 3.405127 | 1.102188 | 3.503388 | 1.306337 | 3.66271 | 0.098262 |
| ENSG00000132155 | RAF1 | 2.273341 | 7.593649 | 2.407366 | 7.719497 | 2.508428 | 7.964533 | 0.125847 |
| ENSG00000130520 | LSM4 | 4.579739 | 14.60137 | 4.622206 | 14.59563 | 4.872578 | 14.40114 | −0.00574 |
| ENSG00000166135 | HIF1AN | 1.129731 | 3.208593 | 1.140724 | 3.201698 | 1.184608 | 3.139408 | −0.00689 |
| ENSG00000172725 | CORO1B | 3.351684 | 8.759741 | 3.210412 | 8.567795 | 3.320717 | 8.535508 | −0.19195 |
| ENSG00000130313 | PGLS | 2.218698 | 6.223183 | 2.148009 | 6.257029 | 1.739245 | 6.197966 | 0.033846 |

TABLE 9-continued

| ENSG00000142546 | NOSIP | 2.318011 | 8.134532 | 2.482195 | 8.345668 | 2.704998 | 8.189745 | 0.211136 |
| ENSG00000160679 | CHTOP | 3.815585 | 11.67187 | 3.95633 | 11.73505 | 4.364616 | 11.57775 | 0.063181 |
| ENSG00000067900 | ROCK1 | 1.814404 | 6.126514 | 2.00513 | 6.234967 | 2.283759 | 6.367677 | 0.108453 |
| ENSG00000174243 | DDX23 | 1.981834 | 6.430898 | 1.655883 | 6.449029 | 2.014684 | 6.600883 | 0.018131 |

| ensaembl_gene_id | post-intermediate | Intermediate-pre (relative %) | Post-intermediate | Type of change | Grade of change of post-Intermediate | Grade of change Intermediate-pre | Analysis value | Type of change | Preferred type 1 | Preferred type 2 |
|---|---|---|---|---|---|---|---|---|---|---|
| ENSG00000111707 | −4.61737 | −67.77 | −65.69 | 1. Continuous decline | −10 | −14 | 24 | 1. Continuous decline | | High analysis value |
| ENSG00000182670 | −1.32011 | −67.97 | −19.61 | 1. Continuous decline | −10 | −4 | 14 | 1. Continuous decline | | High analysis value |
| ENSG00000131981 | −55.384 | 71.45 | −17.40 | | 10 | −4 | 14 | 3. | | High analysis value |
| ENSG00000104812 | −1.60814 | −50.38 | −31.19 | 1. Continuous decline | −7 | −6 | 13 | 1. Continuous decline | | High analysis value |
| ENSG00000101577 | −2.38318 | 35.32 | −39.69 | | 5 | −8 | 13 | 3. | | High analysis value |
| ENSG00000100300 | 17.07716 | 58.66 | 23.82 | 4. Continuous increase | 8 | 5 | 13 | 4. Continuous increase | | High analysis value |
| ENSG00000037637 | −1.45373 | −24.61 | −39.18 | 1. Continuous decline | −4 | −8 | 12 | 1. Continuous decline | | High analysis value |
| ENSG00000100722 | −0.5284 | −39.94 | −30.54 | 1. Continuous decline | −6 | −6 | 12 | 1. Continuous decline | | High analysis value |
| ENSG00000198917 | −0.57884 | −57.2 | −17.05 | 1 Continuous decline | −8 | −4 | 12 | 1. Continuous decline | | High analysis value |
| ENSG00000101193 | −1.55673 | −31.41 | −27.84 | 1. Continuous decline | −5 | −6 | 11 | 1. Continuous decline | | High analysis value |
| ENSG00000134324 | −0.87173 | −17.23 | −41.63 | 1. Continuous decline | −2 | −9 | 11 | 1. Continuous decline | | High analysis value |
| ENSG00000170776 | −2.50437 | −31.10 | −35.29 | 1. Continuous decline | −4 | −7 | 11 | 1. Continuous decline | | High analysis value |
| ENSG00000204256 | −1.86152 | −35.02 | −26.94 | 1. Continuous decline | −5 | −6 | 11 | 1. Continuous decline | | High analysis value |
| ENSG00000177731 | 1.893416 | 48.65 | 17.254 | 4. Continuous increase | 7 | 4 | 11 | 4. Continuous increase | | High analysis value |
| ENSG00000100941 | −1.4882 | −53.47 | −10.20 | 1. Continuous decline | −8 | −2 | 10 | 1. Continuous decline | | High analysis value |
| ENSG00000133226 | −0.51804 | −56.01 | −8.64 | 1. Continuous decline | −8 | −2 | 10 | 1. Continuous decline | | High analysis value |
| ENSG00000134884 | −5.07675 | −21.72 | −33.60 | 1. Continuous decline | −3 | −7 | 10 | 1. Continuous decline | | High analysis value |
| ENSG00000145241 | −0.54055 | −28.06 | −28.17 | 1. Continuous decline | −4 | −6 | 10 | 1. Continuous decline | | High analysis value |
| ENSG00000163807 | −1.91693 | −34.56 | −26.30 | 1. Continuous decline | −5 | −5 | 10 | 1. Continuous decline | | High analysis value |
| ENSG00000197448 | −5.9473 | −19.61 | −32.21 | 1. Continuous decline | −3 | −7 | 10 | 1. Continuous decline | | High analysis value |
| ENSG00000127838 | 2.029162 | −48.56 | 15.54 | | −7 | 3 | 10 | 2. Change preferred | | High analysis value |
| ENSG00000100897 | −2.45392 | −18.29 | −26.82 | 1. Continuous decline | −3 | −6 | 9 | 1. Continuous decline | | High analysis value |

TABLE 9-continued

| | | | | | | | | |
|---|---|---|---|---|---|---|---|---|
| ENSG00000109083 | −1.60273 | −28.21 | −26.19 | 1. Continuous decline | −4 | −5 | 9 | 1. Continuous decline | High analysis value |
| ENSG00000115677 | −2.80834 | −33.48 | −20.86 | 1. Continuous decline | −5 | −4 | 9 | 1. Continuous decline | High analysis value |
| ENSG00000123200 | −1.95168 | −29.84 | −21.99 | 1. Continuous decline | −4 | −5 | 9 | 1. Continuous decline | High analysis value |
| ENSG00000130985 | −5.15915 | −35.13 | −20.89 | 1. Continuous decline | −5 | −4 | 9 | 1. Continuous decline | High analysis value |
| ENSG00000132466 | −0.89945 | −33.68 | −19.88 | 1. Continuous decline | −5 | −4 | 9 | 1. Continuous decline | High analysis value |
| ENSG00000132780 | −0.57373 | −47.87 | −8.75 | 1. Continuous decline | −7 | −2 | 9 | 1. Continuous decline | High analysis value |
| ENSG00000139990 | −0.61821 | −26.22 | −25.80 | 1. Continuous decline | −4 | −5 | 9 | 1. Continuous decline | High analysis value |
| ENSG00000142864 | −2.43009 | −39.8 | −13.38 | 1. Continuous decline | −6 | −3 | 9 | 1. Continuous decline | High analysis value |
| ENSG00000166295 | 7.18988 | −27.73 | −24.16 | 1. Continuous decline | −4 | −5 | 9 | 1. Continuous decline | High analysis value |
| ENSG00000170653 | −0.58777 | −35.70 | −18.29 | 1. Continuous decline | −5 | −4 | 9 | 1. Continuous decline | High analysis value |
| ENSG00000173726 | −3.73845 | −42.25 | −16.61 | 1. Continuous decline | −6 | −3 | 9 | 1. Continuous decline | High analysis value |
| ENSG00000198960 | −1.33334 | −25.89 | −25.34 | 1. Continuous decline | −4 | −5 | 9 | 1. Continuous decline | High analysis value |
| ENSG00000160818 | −0.941885 | −30.22 | 24.72 | | −4 | 5 | 9 | Change preferred | High analysis value |
| ENSG00000116698 | −11.47533 | 16.10 | −31.68 | | 2 | −7 | 9 | | High analysis value |
| ENSG00000158710 | −3.24206 | 64.60 | −1.39 | 3.7V | 9 | 0 | 9 | | High analysis value |
| ENSG00000134283 | −0.87625 | −29.3 | −20.87 | 1. Continuous decline | −4 | −4 | 8 | 1. Continuous decline | High analysis value |
| ENSG00000134748 | −1.32372 | −28.7 | −17.09 | 1. Continuous decline | −4 | −4 | 8 | 1. Continuous decline | High analysis value |
| ENSG00000135390 | −2.27199 | −39.00 | −7.58 | 1. Continuous decline | −6 | −2 | 8 | 1. Continuous decline | High analysis value |
| ENSG00000135457 | −0.41863 | −44.12 | −7.90 | 1. Continuous decline | −6 | −2 | 8 | 1. Continuous decline | High analysis value |
| ENSG00000136861 | −0.58981 | −1.85 | −40.78 | 1. Continuous decline | 0 | −8 | 8 | 1. Continuous decline | High analysis value |
| ENSG00000137038 | −08 | −27.22 | −21.59 | 1. Continuous decline | −4 | −4 | 8 | 1. Continuous decline | High analysis value |
| ENSG00000140750 | −0.68915 | −16.88 | −28.50 | 1. Continuous decline | −2 | −6 | 8 | 1. Continuous decline | High analysis value |
| ENSG00000148730 | −3.29608 | −6.50 | −35.67 | 1. Continuous decline | −1 | −7 | 8 | 1. Continuous decline | High analysis value |
| ENSG00000151445 | −0.82297 | −26.52 | −20.03 | 1. Continuous decline | −4 | −4 | 8 | 1. Continuous decline | High analysis value |
| ENSG00000163344 | −6.10537 | −23.13 | −24.58 | 1. Continuous decline | −3 | −5 | 8 | 1. Continuous decline | High analysis value |
| ENSG00000166887 | −0.96321 | −22.85 | −23.47 | 1. Continuous decline | −3 | −5 | 8 | 1. Continuous decline | High analysis value |

TABLE 9-continued

| | | | | | | | | | |
|---|---|---|---|---|---|---|---|---|---|
| ENSG00000170473 | −0.83688 | −41.12 | −9.13 | 1. Continuous decline | −6 | −2 | 8 | 1. Continuous decline | High analysis value |
| ENSG00000213516 | −1.43747 | −16.54 | −28.33 | 1. Continuous decline | −2 | −6 | 8 | 1. Continuous decline | High analysis value |
| ENSG00000114850 | 2.976873 | −39.38 | 7.61 | | −6 | 2 | 8 | Change preferred | High analysis value |
| ENSG00000198736 | −0.32357 | 59.02 | −1.92 | | 8 | 0 | 8 | | High analysis value |
| ENSG00000137312 | 3.827503 | 35.77 | 13.51 | 4. Continuous increase | 5 | 3 | 8 | 4. Continuous increase | High analysis value |
| ENSG00000143198 | 1.67788 | 28.40 | 18.67 | 4. Continuous increase | 4 | 4 | 8 | 4. Continuous increase | High analysis value |
| ENSG00000163840 | 0.913005 | 50.13 | 5.82 | 4. Continuous increase | 7 | 1 | 8 | 4. Continuous increase | High analysis value |
| ENSG00000001631 | 0.70061 | −21.04 | −17.68 | 1. Continuous decline | −3 | −4 | 7 | 1. Continuous decline | High analysis value |
| ENSG00000035928 | −0.67625 | −24.45 | −14.92 | 1. Continuous decline | −4 | −3 | 7 | 1. Continuous decline | High analysis value |
| ENSG00000048828 | −0.98825 | −37.3 | −9.23 | 1. Continuous decline | −5 | −2 | 7 | 1. Continuous decline | High analysis value |
| ENSG00000064995 | −3.45119 | −14.87 | −23.34 | 1. Continuous decline | −2 | −5 | 7 | 1. Continuous decline | High analysis value |
| ENSG00000073050 | −0.76539 | −20.03 | −19.45 | 1. Continuous decline | −3 | −4 | 7 | 1. Continuous decline | High analysis value |
| ENSG00000077235 | −0.28688 | −29.81 | −14.91 | 1. Continuous decline | −4 | −3 | 7 | 1. Continuous decline | High analysis value |
| ENSG00000083896 | −0.71693 | −17.8 | −18.30 | 1. Continuous decline | −3 | −4 | 7 | 1. Continuous decline | High analysis value |
| ENSG00000100266 | −2.70053 | −4.03 | −28.99 | 1. Continuous decline | −1 | −6 | 7 | 1. Continuous decline | High analysis value |
| ENSG00000102606 | −0.83658 | −4.85 | −28.23 | 1. Continuous decline | −1 | −6 | 7 | 1. Continuous decline | High analysis value |
| ENSG00000104957 | −0.76076 | −22.28 | −20.36 | 1. Continuous decline | −3 | −4 | 7 | 1. Continuous decline | High analysis value |
| ENSG00000106609 | −0.99168 | −30.53 | −15.86 | 1. Continuous decline | −4 | −3 | 7 | 1. Continuous decline | High analysis value |
| ENSG00000108389 | −0.42769 | −29.20 | −15.77 | 1. Continuous decline | −4 | −3 | 7 | 1. Continuous decline | High analysis value |
| ENSG00000108587 | −0.59251 | −29.48 | −13.55 | 1. Continuous decline | −4 | −3 | 7 | 1. Continuous decline | High analysis value |
| ENSG00000111615 | −0.37227 | −32.2 | −10.79 | 1. Continuous decline | −5 | −2 | 7 | 1. Continuous decline | High analysis value |
| ENSG00000115211 | −0.82354 | −27.73 | −12.72 | 1. Continuous decline | −4 | −3 | 7 | 1. Continuous decline | High analysis value |
| ENSG00000115942 | −0.36528 | −29.21 | −13.86 | 1. Continuous decline | −4 | −3 | 7 | 1. Continuous decline | High analysis value |
| ENSG00000116199 | −0.45618 | −27.70 | −16.25 | 1. Continuous decline | −4 | −3 | 7 | 1. Continuous decline | High analysis value |
| ENSG00000120137 | −0.66717 | −29.27 | −15.68 | 1. Continuous decline | −4 | −3 | 7 | 1. Continuous decline | High analysis value |
| ENSG00000120451 | −0.52425 | −28.24 | −14.99 | 1. Continuous decline | −4 | −3 | 7 | 1. Continuous decline | High analysis value |

TABLE 9-continued

| | | | | | | | | | |
|---|---|---|---|---|---|---|---|---|---|
| ENSG00000127914 | −0.96977 | −20.02 | −18.58 | 1. Continuous decline | −3 | −4 | 7 | 1. Continuous decline | High analysis value |
| ENSG00000130254 | −0.41888 | −35.14 | −10.56 | 1. Continuous decline | −5 | −2 | 7 | 1. Continuous decline | High analysis value |
| ENSG00000131263 | −0.51926 | −33.94 | −11.46 | 1. Continuous decline | −5 | −2 | 7 | 1. Continuous decline | High analysis value |
| ENSG00000131473 | −1.34113 | −38.03 | −10.95 | 1. Continuous decline | −5 | −2 | 7 | 1. Continuous decline | High analysis value |
| ENSG00000134899 | −0.66628 | −19.91 | −20.48 | 1. Continuous decline | −3 | −4 | 7 | 1. Continuous decline | High analysis value |
| ENSG00000143420 | −2.49338 | −19.70 | −20.38 | 1. Continuous decline | −3 | −4 | 7 | 1. Continuous decline | High analysis value |
| ENSG00000145216 | 0.60219 | −33.78 | −9.731 | 1. Continuous decline | −5 | −2 | 7 | 1. Continuous decline | High analysis value |
| ENSG00000152795 | −3.77761 | −28.71 | −13.19 | 1. Continuous decline | −4 | −3 | 7 | 1. Continuous decline | High analysis value |
| ENSG00000155506 | −1.16309 | −20.00 | −17.82 | 1. Continuous decline | −3 | −4 | 7 | 1. Continuous decline | High analysis value |
| ENSG00000159592 | −1.1655 | −21.38 | −19.25 | 1. Continuous decline | −3 | −4 | 7 | 1. Continuous decline | High analysis value |
| ENSG00000164609 | −3.53173 | −14.08 | −25.44 | 1. Continuous decline | −2 | −5 | 7 | 1. Continuous decline | High analysis value |
| ENSG00000165219 | −0.29786 | −35.17 | −10.43 | 1. Continuous decline | −5 | −2 | 7 | 1. Continuous decline | High analysis value |
| ENSG00000165671 | −0.48061 | −23.55 | −17.33 | 1. Continuous decline | −3 | −4 | 7 | 1. Continuous decline | High analysis value |
| ENSG00000170144 | −1.35262 | −36.45 | −9.39 | 1. Continuous decline | −5 | −2 | 7 | 1. Continuous decline | High analysis value |
| ENSG00000172053 | −1.54497 | −30.30 | −13.41 | 1. Continuous decline | −4 | −3 | 7 | 1. Continuous decline | High analysis value |
| ENSG00000176623 | −0.9002 | −25.58 | −16.33 | 1. Continuous decline | −4 | −3 | 7 | 1. Continuous decline | High analysis value |
| ENSG00000187555 | −0.66489 | −26.68 | −15.02 | 1. Continuous decline | −4 | −3 | 7 | 1. Continuous decline | High analysis value |
| ENSG00000204120 | 0.52134 | −28.63 | −14.04 | 1. Continuous decline | −4 | 3 | 7 | 1. Continuous decline | High analysis value |
| ENSG00000205659 | −0.88824 | −21.69 | −17.84 | 1. Continuous decline | −3 | −4 | 7 | 1. Continuous decline | High analysis value |
| ENSG00000096384 | 27.88323 | −35.91 | 10.62 | | −5 | 2 | 7 | 2 Change preferred | High analysis value |
| ENSG00000129351 | 0.264562 | −43.87 | 6.66 | | −6 | 1 | 7 | Change preferred | High analysis value |
| ENSG00000132603 | 1.020061 | −37.51 | 7.87 | | −5 | 2 | 7 | Change preferred | High analysis value |
| ENSG00000148296 | 0.070069 | −49.48 | 1.73 | | −7 | 0 | 7 | Change preferred | High analysis value |
| ENSG00000161960 | 21.27147 | −5.06 | 31.46 | | −1 | 6 | 7 | Change preferred | High analysis value |
| ENSG00000121680 | −1.31885 | 13.40 | −25.61 | | 2 | −5 | 7 | | High analysis value |
| ENSG00000153113 | −1.91593 | 24.23 | −20.08 | | 3 | −4 | 7 | | High analysis value |

TABLE 9-continued

| | | | | | | | | |
|---|---|---|---|---|---|---|---|---|
| ENSG00000158793 | −1.17234 | 11.76 | −21.88 | | 2 | −5 | 7 | | High analysis value |
| ENSG00000136448 | 0.761776 | 18.61 | 17.40 | 4. Continuous increase | 3 | 4 | 7 | 4. Continuous increase | High analysis value |
| ENSG00000003756 | −1.17534 | −12.45 | −19.02 | 1. Continuous decline | −2 | −4 | 6 | 1. Continuous decline | High analysis value |
| ENSG00000058600 | −0.05435 | −32.58 | −3.42 | 1. Continuous decline | −5 | −1 | 6 | 1. Continuous decline | High analysis value |
| ENSG00000062194 | −2.10252 | −15.87 | −20.85 | 1. Continuous decline | −2 | −4 | 6 | 1. Continuous decline | High analysis value |
| ENSG00000073614 | −0.76108 | −16.82 | −17.09 | 1. Continuous decline | −2 | −4 | 6 | 1. Continuous decline | High analysis value |
| ENSG00000096401 | −0.84338 | −22.42 | −12.44 | 1. Continuous decline | −3 | −3 | 6 | 1. Continuous decline | High analysis value |
| ENSG00000100888 | −0.48611 | −12.24 | −17.43 | 1. Continuous decline | −2 | −4 | 6 | 1. Continuous decline | High analysis value |
| ENSG00000101079 | −1.32353 | −20.72 | −16.15 | 1. Continuous decline | −3 | −3 | 6 | 1. Continuous decline | High analysis value |
| ENSG00000108465 | −1.9035 | −7.13 | −22.79 | 1. Continuous decline | −1 | −5 | 6 | 1. Continuous decline | High analysis value |
| ENSG00000111642 | −1.28025 | −17.69 | −15.65 | 1. Continuous decline | −3 | −3 | 6 | 1. Continuous decline | High analysis value |
| ENSG00000112200 | −0.30671 | −24.47 | −10.01 | 1. Continuous decline | −4 | 2 | 6 | 1. Continuous decline | High analysis value |
| ENSG00000112701 | −0.36986 | −25.20 | −10.28 | 1. Continuous decline | −4 | −2 | 6 | 1. Continuous decline | High analysis value |
| ENSG00000112739 | −0.41954 | −28.96 | −9.35 | 1. Continuous decline | −4 | 2 | 6 | 1. Continuous decline | High analysis value |
| ENSG00000116580 | −0.38645 | −21.81 | −15.06 | 1. Continuous decline | −3 | −3 | 6 | 1. Continuous decline | High analysis value |
| ENSG00000126653 | −1.29515 | −24.07 | −16.26 | 1. Continuous decline | −3 | −3 | 6 | 1. Continuous decline | High analysis value |
| ENSG00000129197 | −0.6699 | −14.19 | −18.91 | 1. Continuous decline | −2 | −4 | 6 | 1. Continuous decline | High analysis value |
| ENSG00000130741 | −5.58674 | −24.42 | −11.03 | 1. Continuous decline | −4 | −2 | 6 | 1. Continuous decline | High analysis value |
| ENSG00000133706 | −0.50101 | −37.96 | −6.83 | 1. Continuous decline | −5 | −1 | 6 | 1. Continuous decline | High analysis value |
| ENSG00000134825 | −2.0636 | −26.32 | −8.39 | 1. Continuous decline | −4 | −2 | 6 | 1. Continuous decline | High analysis value |
| ENSG00000136813 | −0.60884 | −21.35 | −14.06 | 1. Continuous decline | −3 | −3 | 6 | 1. Continuous decline | High analysis value |
| ENSG00000138398 | −1.05817 | −27.39 | −12.14 | 1. Continuous decline | −4 | −2 | 6 | 1. Continuous decline | High analysis value |
| ENSG00000138802 | −1.33611 | −13.38 | −17.92 | 1. Continuous decline | −2 | −4 | 6 | 1. Continuous decline | High analysis value |
| ENSG00000139613 | −0.85131 | −17.39 | −19.68 | 1. Continuous decline | −2 | −4 | 6 | 1. Continuous decline | High analysis value |
| ENSG00000147123 | −5.19791 | −22.88 | −14.90 | 1. Continuous decline | −3 | −3 | 6 | 1. Continuous decline | High analysis value |
| ENSG00000147133 | −0.2317 | −28.66 | −11.05 | 1. Continuous decline | −4 | −2 | 6 | 1. Continuous decline | High analysis value |

TABLE 9-continued

| | | | | | | | | |
|---|---|---|---|---|---|---|---|---|
| ENSG00000157500 | −1.26404 | −22.54 | −15.71 | 1. Continuous decline | −3 | −3 | 6 | 1. Continuous decline | High analysis value |
| ENSG00000163960 | −0.44155 | −23.87 | −15.23 | 1. Continuous decline | −3 | −3 | 6 | 1. Continuous decline | High analysis value |
| ENSG00000165494 | −0.35726 | −28.83 | −10.30 | 1. Continuous decline | −4 | −2 | 6 | 1. Continuous decline | High analysis value |
| ENSG00000172466 | −0.95531 | −27.64 | −11.97 | 1. Continuous decline | −4 | −2 | 6 | 1. Continuous decline | High analysis value |
| ENSG00000172775 | −1.65627 | −15.82 | −17.93 | 1. Continuous decline | −2 | −4 | 6 | 1. Continuous decline | High analysis value |
| ENSG00000174282 | −0.99676 | −17.39 | −20.13 | 1. Continuous decline | −2 | −4 | 6 | 1. Continuous decline | High analysis value |
| ENSG00000174903 | −2.65176 | −29.45 | −7.68 | 1. Continuous decline | −4 | −2 | 6 | 1. Continuous decline | High analysis value |
| ENSG00000177951 | −0.57204 | −29.87 | −7.30 | 1. Continuous decline | −4 | −2 | 6 | 1. Continuous decline | High analysis value |
| ENSG00000177981 | −1.38453 | −12.47 | −18.47 | 1. Continuous decline | −2 | −4 | 6 | 1. Continuous decline | High analysis value |
| ENSG00000181222 | −1.20833 | −2.78 | −28.75 | 1. Continuous decline | 0 | −6 | 6 | 1. Continuous decline | High analysis value |
| ENSG00000182473 | −0.63347 | −24.33 | −12.53 | 1. Continuous decline | −3 | −3 | 6 | 1. Continuous decline | High analysis value |
| ENSG00000230124 | −0.1815 | −29.08 | −8.88 | 1. Continuous decline | −4 | −2 | 6 | 1. Continuous decline | High analysis value |
| ENSG00000237190 | −0.88208 | −36.49 | −7.02 | 1. Continuous decline | −5 | −1 | 6 | 1. Continuous decline | High analysis value |
| ENSG00000249915 | −1.44018 | −22.27 | −12.86 | 1. Continuous decline | −3 | −3 | 6 | 1. Continuous decline | High analysis value |
| ENSG00000278311 | −1.48668 | −17.10 | −18.07 | 1. Continuous decline | −2 | −4 | 6 | 1. Continuous decline | High analysis value |
| ENSG00000085872 | 0.149225 | −27.52 | 9.71 | | −4 | 2 | 6 | Change preferred | High analysis value |
| ENSG000001087087 | 0.501585 | −26.02 | 9.65 | | −4 | 2 | 6 | Change preferred | High analysis value |
| ENSG00000092199 | 3.505868 | −24.85 | 7.82 | | −4 | 2 | 6 | Change preferred | High analysis value |
| ENSG00000101361 | 0.503144 | −29.69 | 8.62 | | −4 | 2 | 6 | Change preferred | High analysis value |
| ENSG00000102030 | 0.427422 | −24.58 | 8.83 | | −4 | 2 | 6 | Change preferred | High analysis value |
| ENSG00000115053 | 2.108608 | −26.25 | 7.67 | | −4 | 2 | 6 | Change preferred | High analysis value |
| ENSG00000123992 | 0.497694 | −21.69 | 13.14 | | −3 | 3 | 6 | Change preferred | High analysis value |
| ENSG00000135316 | 0.81654 | −35.15 | 7.03 | | 5 | 1 | 6 | Change preferred | High analysis value |
| ENSG00000142186 | 0.17894 | −32.58 | 3.81 | | −5 | 1 | 6 | Change preferred | High analysis value |
| ENSG00000144591 | 0.327035 | −27.36 | 7.85 | | −4 | 2 | 6 | Change preferred | High analysis value |
| ENSG00000165934 | 0.151808 | −32.16 | 4.61 | | −5 | 1 | 6 | Change preferred | High analysis value |

TABLE 9-continued

| | | | | | | | | |
|---|---|---|---|---|---|---|---|---|
| ENSG00000167721 | 0.9877 | −24.32 | 12.67 | | −3 | 3 | 6 | Change preferred | High analysis value |
| ENSG00000169100 | 7.244096 | −27.56 | 10.87 | | −4 | 2 | 6 | Change preferred | High analysis value |
| ENSG00000172534 | 0.246079 | −24.80 | 10.22 | | −4 | 2 | 6 | Change preferred | High analysis value |
| ENSG00000122783 | −1.73336 | 7.16 | −26.01 | | 1 | −5 | 6 | | High analysis value |
| ENSG00000151148 | −0.51936 | 4.22 | −22.19 | | 1 | −5 | 6 | | High analysis value |
| ENSG00000163931 | −0.05634 | 38.74 | −0.60 | | 6 | 0 | 6 | | High analysis value |
| ENSG00000168310 | −0.40465 | 33.84 | −3.17 | | 5 | −1 | 6 | | High analysis value |
| ENSG00000189077 | −1.32615 | 21.34 | −13.52 | | 3 | −3 | 6 | | High analysis value |
| ENSG00000197694 | −0.48519 | 15.33 | −19.34 | | 2 | −4 | 6 | | High analysis value |
| ENSG00000100345 | 1.70377 | 35.31 | 6.95 | 4. Continuous increase | 5 | 1 | 6 | 4. Continuous increase | High analysis value |
| ENSG00000101150 | 3.654058 | 23.12 | 16.48 | 4. Continuous increase | 3 | 3 | 6 | 4. Continuous increase | High analysis value |
| ENSG00000130706 | 2.730362 | 11.43 | 17.28 | 4. Continuous increase | 2 | 4 | 6 | 4. Continuous increase | High analysis value |
| ENSG00000164054 | 2.189613 | 23.88 | 15.39 | 4. Continuous increase | 3 | 3 | 6 | 4. Continuous increase | High analysis value |
| ENSG00000005483 | −1.37153 | −13.79 | −13.44 | 1. Continuous decline | −2 | −3 | 5 | 1. Continuous decline | High analysis value |
| ENSG00000054267 | −1.40788 | −9.50 | −20.95 | 1. Continuous decline | −1 | −4 | 5 | 1. Continuous decline | High analysis value |
| ENSG00000071994 | −0.77045 | −14.54 | −15.84 | 1. Continuous decline | −2 | −3 | 5 | 1. Continuous decline | High analysis value |
| ENSG00000072364 | −1.0065 | −13.47 | −15.07 | 1. Continuous decline | −2 | −3 | 5 | 1. Continuous decline | High analysis value |
| ENSG00000075292 | −0.15074 | −29.17 | −3.72 | 1. Continuous decline | −4 | −1 | 5 | 1. Continuous decline | High analysis value |
| ENSG00000078142 | −0.36123 | −4.42 | −20.55 | 1. Continuous decline | −1 | −4 | 5 | 1. Continuous decline | High analysis value |
| ENSG00000089154 | −0.35198 | −18.73 | −10.77 | 1. Continuous decline | −3 | −2 | 5 | 1. Continuous decline | High analysis value |
| ENSG00000095787 | −0.85534 | −9.29 | −18.11 | 1. Continuous decline | −1 | −4 | 5 | 1. Continuous decline | High analysis value |
| ENSG00000100348 | −2.08275 | −18.26 | −7.83 | 1. Continuous decline | −3 | −2 | 5 | 1. Continuous decline | High analysis value |
| ENSG00000100393 | −0.80044 | −9.58 | −19.26 | 1. Continuous decline | −1 | −4 | 5 | 1. Continuous decline | High analysis value |
| ENSG00000100413 | −0.00063 | −37.44 | −0.02 | 1. Continuous decline | −5 | 0 | 5 | 1. Continuous decline | High analysis value |
| ENSG00000101138 | −0.60845 | −22.77 | −8.47 | 1. Continuous decline | −3 | −2 | 5 | 1. Continuous decline | High analysis value |
| ENSG00000106400 | −1.24869 | −14.12 | −12.80 | 1. Continuous decline | −2 | −3 | 5 | 1. Continuous decline | High analysis value |

TABLE 9-continued

| | | | | | | | | |
|---|---|---|---|---|---|---|---|---|
| ENSG00000106603 | −0.13993 | −31.13 | −5.76 | 1. Continuous decline | −4 | −1 | 5 | 1. Continuous decline | High analysis value |
| ENSG00000114416 | −0.19945 | −28.47 | −5.86 | 1. Continuous decline | −4 | −1 | 5 | 1. Continuous decline | High analysis value |
| ENSG00000114982 | −0.47779 | −15.11 | −13.77 | 1. Continuous decline | −2 | −3 | 5 | 1. Continuous decline | High analysis value |
| ENSG00000116560 | −0.39866 | −31.17 | −4.60 | 1. Continuous decline | −4 | −1 | 5 | 1. Continuous decline | High analysis value |
| ENSG00000120616 | −0.25403 | −17.04 | −16.64 | 1. Continuous decline | −2 | −3 | 5 | 1. Continuous decline | High analysis value |
| ENSG00000124214 | −2.44978 | −11.34 | −12.65 | 1. Continuous decline | −2 | −3 | 5 | 1. Continuous decline | High analysis value |
| ENSG00000124733 | −1.06246 | −29.06 | −2.43 | 1. Continuous decline | −4 | −1 | 5 | 1. Continuous decline | High analysis value |
| ENSG00000125611 | −0.27095 | −19.84 | −8.55 | 1. Continuous decline | −3 | −2 | 5 | 1. Continuous decline | High analysis value |
| ENSG00000126012 | −0.20758 | −19.06 | −9.17 | 1. Continuous decline | −3 | −2 | 5 | 1. Continuous decline | High analysis value |
| ENSG00000130227 | −0.31573 | −23.73 | −7.39 | 1. Continuous decline | −3 | −2 | 5 | 1. Continuous decline | High analysis value |
| ENSG00000132591 | −2.46981 | −5.11 | −20.84 | 1. Continuous decline | −1 | −4 | 5 | 1. Continuous decline | High analysis value |
| ENSG00000132670 | −0.94825 | −4.54 | −19.70 | 1. Continuous decline | −1 | −4 | 5 | 1. Continuous decline | High analysis value |
| ENSG00000137776 | −0.37165 | −26.42 | −5.26 | 1. Continuous decline | −4 | −1 | 5 | 1. Continuous decline | High analysis value |
| ENSG00000138594 | −2.03285 | −2.55 | −22.58 | 1. Continuous decline | 0 | −5 | 5 | 1. Continuous decline | High analysis value |
| ENSG00000141027 | −1.38525 | −6.36 | −18.67 | 1. Continuous decline | −1 | −4 | 5 | 1. Continuous decline | High analysis value |
| ENSG00000143970 | −0.32277 | −12.17 | −13.01 | 1. Continuous decline | −2 | −3 | 5 | 1. Continuous decline | High analysis value |
| ENSG00000148824 | −0.38455 | −27.67 | −6.44 | 1. Continuous decline | −4 | −1 | 5 | 1. Continuous decline | High analysis value |
| ENSG00000149187 | −0.83443 | −16.81 | −13.31 | 1. Continuous decline | −2 | −3 | 5 | 1. Continuous decline | High analysis value |
| ENSG00000149761 | −0.19027 | −28.56 | −6.97 | 1. Continuous decline | −4 | −1 | 5 | 1. Continuous decline | High analysis value |
| ENSG00000152684 | −0.16785 | −28.02 | −2.89 | 1. Continuous decline | −4 | −1 | 5 | 1. Continuous decline | High analysis value |
| ENSG00000152700 | −1.23031 | −9.03 | −18.68 | 1. Continuous decline | −1 | −4 | 5 | 1. Continuous decline | High analysis value |
| ENSG00000154781 | −0.55807 | −19.43 | −9.74 | 1. Continuous decline | −3 | −2 | 5 | 1. Continuous decline | High analysis value |
| ENSG00000159792 | −0.30288 | −20.99 | −8.16 | 1. Continuous decline | −3 | −2 | 5 | 1. Continuous decline | High analysis value |
| ENSG00000161920 | −1.87235 | −15.80 | −16.74 | 1. Continuous decline | −2 | −3 | 5 | 1. Continuous decline | High analysis value |
| ENSG00000164808 | −0.59483 | −7.38 | −19.79 | 1. Continuous decline | −1 | −4 | 5 | 1. Continuous decline | High analysis value |
| ENSG00000166913 | −6.08999 | −16.35 | −13.03 | 1. Continuous decline | −2 | −3 | 5 | 1. Continuous decline | High analysis value |

TABLE 9-continued

| | | | | | | | | | |
|---|---|---|---|---|---|---|---|---|---|
| ENSG00000168066 | −0.7081 | −19.85 | −10.45 | 1. Continuous decline | −3 | −2 | 5 | 1. Continuous decline | High analysis value |
| ENSG00000168397 | −0.56821 | −14.46 | −16.07 | 1. Continuous decline | −2 | −3 | 5 | 1. Continuous decline | High analysis value |
| ENSG00000169375 | −0.39185 | −7.05 | −17.36 | 1. Continuous decline | −1 | −4 | 5 | 1. Continuous decline | High analysis value |
| ENSG00000169727 | −0.4843 | −21.65 | −10.67 | 1. Continuous decline | −3 | −2 | 5 | 1. Continuous decline | High analysis value |
| ENSG00000174231 | −0.90341 | −15.95 | −12.92 | 1. Continuous decline | −2 | −3 | 5 | 1. Continuous decline | High analysis value |
| ENSG00000175216 | −0.31216 | −18.01 | −8.96 | 1. Continuous decline | −3 | −2 | 5 | 1. Continuous decline | High analysis value |
| ENSG00000176410 | −0.46567 | −21.09 | −11.68 | 1. Continuous decline | −3 | −2 | 5 | 1. Continuous decline | High analysis value |
| ENSG00000179335 | −0.18375 | −14.51 | −14.74 | 1. Continuous decline | −2 | −3 | 5 | 1. Continuous decline | High analysis value |
| ENSG00000198900 | −1.48076 | −12.99 | −12.21 | 1. Continuous decline | −2 | −3 | 5 | 1. Continuous decline | High analysis value |
| ENSG00000204469 | −0.09792 | −30.58 | −4.68 | 1. Continuous decline | −4 | −1 | 5 | 1. Continuous decline | High analysis value |
| ENSG00000214046 | −0.73156 | −16.22 | −13.81 | 1. Continuous decline | −2 | −3 | 5 | 1. Continuous decline | High analysis value |
| ENSG00000253729 | −0.16972 | −28.34 | −4.62 | 1. Continuous decline | −4 | −1 | 5 | 1. Continuous decline | High analysis value |
| ENSG00000056097 | 1.03902 | −21.98 | 9.16 | | −3 | 2 | 5 | 2. Change preferred | High analysis value |
| ENSG00000087191 | 1.117721 | −26.67 | 4.44 | | −4 | 1 | 5 | Change preferred | High analysis value |
| ENSG00000099783 | 0.884536 | −25.32 | 6.44 | | −4 | 1 | 5 | Change preferred | High analysis value |
| ENSG00000110717 | 1.005238 | −17.30 | 12.17 | | −2 | 3 | 5 | Change preferred | High analysis value |
| ENSG00000113649 | 0.094317 | −31.13 | 3.23 | | −4 | 1 | 5 | Change preferred | High analysis value |
| ENSG00000125835 | 10.75669 | −9.54 | 21.22 | | −1 | 4 | 5 | Change preferred | High analysis value |
| ENSG00000131652 | 1.344071 | −5.49 | 18.7 | | −1 | 4 | 5 | Change preferred | High analysis value |
| ENSG00000135624 | 1.247589 | −25.27 | 4.27 | | −4 | 1 | 5 | Change preferred | High analysis value |
| ENSG00000141644 | 0.200768 | −20.65 | 8.55 | | −3 | 2 | 5 | Change preferred | High analysis value |
| ENSG00000165916 | 4.136018 | −19.67 | 10.04 | | −3 | 2 | 5 | Change preferred | High analysis value |
| ENSG00000169564 | 4.056999 | −22.66 | 7.97 | | −3 | 2 | 5 | Change preferred | High analysis value |
| ENSG00000170515 | 0.522233 | −32.51 | 1.80 | | −5 | 0 | 5 | Change preferred | High analysis value |
| ENSG00000175376 | 1.477548 | −11.18 | 15.78 | | −2 | 3 | 5 | Change preferred | High analysis value |
| ENSG00000185504 | 0.215366 | −19.64 | 9.27 | | −3 | 2 | 5 | Change preferred | High analysis value |

TABLE 9-continued

| | | | | | | | | |
|---|---|---|---|---|---|---|---|---|
| ENSG00000188976 | 0.761504 | −15.70 | 13.33 | | −2 | 3 | 5 | Change preferred | High analysis value |
| ENSG00000197345 | 0.079943 | −35.68 | 0.75 | | −5 | 0 | 5 | Change preferred | High analysis value |
| ENSG00000225663 | 1.133361 | −9.20 | 21.12 | | −1 | 4 | 5 | Change preferred | High analysis value |
| ENSG00000262814 | 1.209396 | −29.64 | 5.54 | | −4 | 1 | 5 | Change preferred | High analysis value |
| ENSG00000063854 | −0.59504 | 16.73 | −16.37 | | 2 | −3 | 5 | | High analysis value |
| ENSG00000071859 | −1.51809 | 18.28 | −9.69 | | 3 | −2 | 5 | | High analysis value |
| ENSG00000125971 | −4.84667 | 9.06 | −21.02 | | 1 | −4 | 5 | | High analysis value |
| ENSG00000140553 | −0.95534 | 5.81 | −20.13 | | 1 | −4 | 5 | | High analysis value |
| ENSG00000141279 | −1.23822 | 9.97 | −17.91 | | 1 | −4 | 5 | | High analysis value |
| ENSG00000160310 | −0.63343 | 25.20 | −6.22 | | 4 | −1 | 5 | | High analysis value |
| ENSG00000163681 | −0.41666 | 14.30 | −15.72 | | 2 | −3 | 5 | | High analysis value |
| ENSG00000240230 | −0.49864 | 10.00 | −17.62 | | 1 | −4 | 5 | | High analysis value |
| ENSG00000101182 | 19.90571 | 8.45 | 19.13 | 4. Continuous increase | 1 | 4 | 5 | 4. Continuous increase | High analysis value |
| ENSG00000163866 | 0.436632 | 22.48 | 9.99 | 4. Continuous increase | 3 | 2 | 5 | 4. Continuous increase | High analysis value |
| ENSG00000172531 | 5.109169 | 12.69 | 15.22 | 4. Continuous increase | 2 | 3 | 5 | 4. Continuous increase | High analysis value |
| ENSG00000185359 | 0.174299 | 26.23 | 3.43 | 4. Continuous increase | 4 | 1 | 5 | 4. Continuous increase | High analysis value |
| ENSG00000047410 | −0.89806 | −9.39 | −12.44 | 1. Continuous decline | −1 | −3 | 4 | 1. Continuous decline | |
| ENSG00000054118 | −4.21819 | −3.38 | −19.93 | 1. Continuous decline | 0 | −4 | 4 | 1. Continuous decline | |
| ENSG00000064490 | 0.56493 | −15.90 | −11.14 | 1. Continuous decline | −2 | −2 | 4 | 1. Continuous decline | |
| ENSG00000065526 | −0.0829 | −19.74 | −3.34 | 1. Continuous decline | −3 | −1 | 4 | 1. Continuous decline | |
| ENSG00000075407 | −0.13678 | −23.07 | −4.55 | 1. Continuous decline | −3 | −1 | 4 | 1. Continuous decline | |
| ENSG00000075914 | −0.41256 | −22.03 | −6.08 | 1. Continuous decline | −3 | −1 | 4 | 1. Continuous decline | |
| ENSG00000081791 | −0.14958 | −21.84 | −4.96 | 1. Continuous decline | −3 | −1 | 4 | 1. Continuous decline | |
| ENSG00000084072 | −0.31569 | −13.19 | −10.02 | 1. Continuous decline | −2 | −2 | 4 | 1. Continuous decline | |
| ENSG00000086102 | −0.89021 | −8.80 | −13.47 | 1. Continuous decline | −1 | −3 | 4 | 1. Continuous decline | |
| ENSG00000092203 | −1.09975 | −14.08 | −11.50 | 1. Continuous decline | −2 | −2 | 4 | 1. Continuous decline | |

TABLE 9-continued

| | | | | | | | | |
|---|---|---|---|---|---|---|---|---|
| ENSG00000100099 | −0.09779 | −11.33 | −7.31 | 1. Continuous decline | −2 | −2 | 4 | 1. Continuous decline |
| ENSG00000100353 | −1.15552 | −23.25 | −4.16 | 1. Continuous decline | −3 | −1 | 4 | 1. Continuous decline |
| ENSG00000100461 | −0.58313 | −0.87 | −17.68 | 1. Continuous decline | 0 | −4 | 4 | 1. Continuous decline |
| ENSG00000103245 | −0.1164 | −12.12 | −8.42 | 1. Continuous decline | −2 | −2 | 4 | 1. Continuous decline |
| ENSG00000104872 | −1.64949 | −7.67 | −12.32 | 1. Continuous decline | −1 | −3 | 4 | 1. Continuous decline |
| ENSG00000104872 | −0.44481 | −20.45 | −7.17 | 1. Continuous decline | −3 | −1 | 4 | 1. Continuous decline |
| ENSG00000105968 | −0.73472 | −23.11 | −6.99 | 1. Continuous decline | −3 | −1 | 4 | 1. Continuous decline |
| ENSG00000106153 | −25.4864 | −11.50 | −11.54 | 1. Continuous decline | −2 | −2 | 4 | 1. Continuous decline |
| ENSG00000106245 | −1.88204 | −13.36 | −8.37 | 1. Continuous decline | −2 | −2 | 4 | 1. Continuous decline |
| ENSG00000107581 | −1.85451 | −11.92 | −8.38 | 1. Continuous decline | −2 | −2 | 4 | 1. Continuous decline |
| ENSG00000107862 | −0.23019 | −23.91 | −4.89 | 1. Continuous decline | −2 | −1 | 4 | 1. Continuous decline |
| ENSG00000108349 | −1.0546 | −7.62 | −12.50 | 1. Continuous decline | −1 | −3 | 4 | 1. Continuous decline |
| ENSG00000111011 | −0.38259 | −17.82 | −6.29 | 1. Continuous decline | −3 | −1 | 4 | 1. Continuous decline |
| ENSG00000111596 | −0.37808 | −15.96 | −10.68 | 1. Continuous decline | −2 | −2 | 4 | 1. Continuous decline |
| ENSG00000113141 | −1.89795 | −12.53 | −8.83 | 1. Continuous decline | −2 | −2 | 4 | 1. Continuous decline |
| ENSG00000114302 | −0.57932 | −15.77 | −8.43 | 1. Continuous decline | −2 | −2 | 4 | 1. Continuous decline |
| ENSG00000115561 | −2.67782 | −7.42 | −14.74 | 1. Continuous decline | −1 | −3 | 4 | 1. Continuous decline |
| ENSG00000116918 | −0.37969 | −21.18 | −3.67 | 1. Continuous decline | −3 | −1 | 4 | 1. Continuous decline |
| ENSG00000117305 | −1.52754 | −0.57 | −19.14 | 1. Continuous decline | 0 | −4 | 4 | 1. Continuous decline |
| ENSG00000117523 | −1.02363 | −11.44 | −10.65 | 1. Continuous decline | −2 | −2 | 4 | 1. Continuous decline |
| ENSG00000121067 | −0.4833 | −14.83 | −7.89 | 1. Continuous decline | −2 | −2 | 4 | 1. Continuous decline |
| ENSG00000125107 | −0.80492 | −16.87 | −11.74 | 1. Continuous decline | −2 | −2 | 4 | 1. Continuous decline |
| ENSG00000126756 | −0.91317 | −25.52 | −2.33 | 1. Continuous decline | −4 | 0 | 4 | 1. Continuous decline |
| ENSG00000130939 | −0.41314 | −6.19 | −16.62 | 1. Continuous decline | −1 | 3 | 4 | 1. Continuous decline |
| ENSG00000131051 | −2.08347 | −5.58 | −12.43 | 1. Continuous decline | −1 | −3 | 4 | 1. Continuous decline |
| ENSG00000133028 | −0.16214 | −20.64 | −5.16 | 1. Continuous decline | −3 | −1 | 4 | 1. Continuous decline |

TABLE 9-continued

| | | | | | | | | |
|---|---|---|---|---|---|---|---|---|
| ENSG00000136699 | −0.21311 | −12.84 | −9.89 | 1. Continuous decline | −2 | −2 | 4 | 1. Continuous decline |
| ENSG00000136875 | −0.73376 | −13.86 | −8.93 | 1. Continuous decline | −2 | −2 | 4 | 1. Continuous decline |
| ENSG00000139697 | −0.55036 | −10.51 | −7.90 | 1. Continuous decline | −2 | −2 | 4 | 1. Continuous decline |
| ENSG00000140350 | −0.17603 | −19.25 | −5.80 | 1. Continuous decline | −3 | −1 | 4 | 1. Continuous decline |
| ENSG00000140365 | −0.31278 | −12.93 | −9.17 | 1. Continuous decline | −2 | −2 | 4 | 1. Continuous decline |
| ENSG00000141002 | −0.8518 | −13.20 | −9.34 | 1. Continuous decline | −2 | −2 | 4 | 1. Continuous decline |
| ENSG00000143436 | −1.60421 | −8.63 | −12.55 | 1. Continuous decline | −1 | −3 | 4 | 1. Continuous decline |
| ENSG00000143569 | −0.33936 | −21.51 | −4.55 | 1. Continuous decline | −3 | −1 | 4 | 1. Continuous decline |
| ENSG00000143612 | −2.02535 | −18.03 | −4.39 | 1. Continuous decline | −3 | −1 | 4 | 1. Continuous decline |
| ENSG00000144043 | −0.57161 | −5.84 | −12.37 | 1. Continuous decline | −1 | −3 | 4 | 1. Continuous decline |
| ENSG00000146007 | −4.87502 | −0.25 | −17.72 | 1. Continuous decline | 0 | −4 | 4 | 1. Continuous decline |
| ENSG00000146701 | −3.68701 | −6.24 | −15.32 | 1. Continuous decline | −1 | −3 | 4 | 1. Continuous decline |
| ENSG00000151532 | −0.35055 | −3.69 | −15.67 | 1. Continuous decline | −1 | −3 | 4 | 1. Continuous decline |
| ENSG00000152234 | −1.19933 | −22.82 | −4.83 | 1. Continuous decline | −3 | −1 | 4 | 1. Continuous decline |
| ENSG00000159210 | −0.24309 | −16.42 | −9.44 | 1. Continuous decline | −2 | −2 | 4 | 1. Continuous decline |
| ENSG00000162378 | −0.22931 | −21.79 | −6.26 | 1. Continuous decline | −3 | −1 | 4 | 1. Continuous decline |
| ENSG00000163832 | −0.73113 | −16.12 | −11.59 | 1. Continuous decline | −2 | −2 | 4 | 1. Continuous decline |
| ENSG00000164190 | −0.63773 | −6.44 | −12.32 | 1. Continuous decline | −1 | −3 | 4 | 1. Continuous decline |
| ENSG00000164754 | −0.56985 | −22.32 | −6.33 | 1. Continuous decline | −3 | −1 | 4 | 1. Continuous decline |
| ENSG00000169641 | −0.41205 | −5.43 | −15.85 | 1. Continuous decline | −1 | −3 | 4 | 1. Continuous decline |
| ENSG00000173933 | −0.57881 | −19.20 | −4.74 | 1. Continuous decline | −3 | −1 | 4 | 1. Continuous decline |
| ENSG00000175387 | −0.39958 | −7.62 | −15.77 | 1. Continuous decline | −1 | −3 | 4 | 1. Continuous decline |
| ENSG00000177971 | −1.6445 | −15.60 | −10.94 | 1. Continuous decline | −2 | −2 | 4 | 1. Continuous decline |
| ENSG00000178057 | −0.2337 | −30.60 | −1.62 | 1. Continuous decline | −4 | 0 | 4 | 1. Continuous decline |
| ENSG00000181481 | −1.40837 | −9.97 | −12.27 | 1. Continuous decline | −1 | −3 | 4 | 1. Continuous decline |
| ENSG00000181991 | −0.10938 | −25.40 | −2.39 | 1. Continuous decline | −4 | 0 | 4 | 1. Continuous decline |

TABLE 9-continued

| | | | | | | | | |
|---|---|---|---|---|---|---|---|---|
| ENSG00000182923 | −0.14634 | −12.30 | −9.70 | 1. Continuous decline | −2 | −2 | 4 | 1. Continuous decline |
| ENSG00000184076 | −11.7808 | −4.94 | −12.81 | 1. Continuous decline | −1 | −3 | 4 | 1. Continuous decline |
| ENSG00000189091 | −0.25543 | −23.49 | −4.47 | 1. Continuous decline | −3 | −1 | 4 | 1. Continuous decline |
| ENSG00000197157 | −0.4085 | −23.34 | −3.17 | 1. Continuous decline | −3 | −1 | 4 | 1. Continuous decline |
| ENSG00000198218 | −0.63367 | −8.22 | −15.31 | 1. Continuous decline | −1 | −3 | 4 | 1. Continuous decline |
| ENSG00000198563 | −0.64279 | −23.95 | −6.02 | 1. Continuous decline | −3 | −1 | 4 | 1. Continuous decline |
| ENSG00000204569 | −0.31443 | −17.95 | −5.14 | 1. Continuous decline | −3 | −1 | 4 | 1. Continuous decline |
| ENSG00000234545 | −0.4451 | −14.21 | −9.91 | 1. Continuous decline | −2 | −2 | 4 | 1. Continuous decline |
| ENSG00000242485 | −1.01692 | −19.84 | −4.98 | 1. Continuous decline | −3 | −1 | 4 | 1. Continuous decline |
| ENSG00000280071 | −1.22188 | −9.72 | −15.75 | 1. Continuous decline | −1 | −3 | 4 | 1. Continuous decline |
| ENSG00000007080 | 1.54256 | −7.56 | 14.60 | | −1 | 3 | 4 | 2. Change preferred |
| ENSG00000025293 | 0.329934 | −20.60 | 6.19 | | −3 | 1 | 4 | Change preferred |
| ENSG00000060339 | 0.07397 | −27.99 | 0.82 | | −4 | 0 | 4 | Change preferred |
| ENSG00000072501 | 0.853265 | −4.77 | 13.37 | | −1 | 3 | 4 | Change preferred |
| ENSG00000072506 | 3.459694 | −14.76 | 7.62 | | −2 | 2 | 4 | Change preferred |
| ENSG00000087365 | 0.378306 | −20.40 | 5.96 | | −3 | 1 | 4 | Change preferred |
| ENSG00000100726 | 0.066342 | −20.76 | 3.09 | | −3 | 1 | 4 | Change preferred |
| ENSG00000105197 | 0.474225 | −16.59 | 12.02 | | −2 | 2 | 4 | Change preferred |
| ENSG00000114867 | 0.089062 | −25.14 | 1.12 | | −4 | 0 | 4 | Change preferred |
| ENSG00000116688 | 1.181607 | −3.54 | 15.15 | | −1 | 3 | 4 | Change preferred |
| ENSG00000122218 | 0.844007 | −18.91 | 3.58 | | −3 | 1 | 4 | Change preferred |
| ENSG00000130811 | 1.09343 | −15.43 | 9.13 | | −2 | 2 | 4 | Change preferred |
| ENSG00000132323 | 0.272871 | −11.18 | 9.37 | | −2 | 2 | 4 | Change preferred |
| ENSG00000134077 | 0.063068 | −26.80 | 1.43 | | −4 | 0 | 4 | Change preferred |
| ENSG00000136273 | 0.145446 | −18.58 | 2.64 | | −3 | 1 | 4 | Change preferred |
| ENSG00000136485 | 2.2635 | −1.55 | 17.86 | | 0 | 4 | 4 | Change preferred |
| ENSG00000142751 | 0.700942 | −3.31 | 21.34 | | 0 | 4 | 4 | Change preferred |
| ENSG00000145833 | 0.124913 | −19.20 | 2.67 | | −3 | 1 | 4 | Change preferred |
| ENSG00000146223 | 0.481672 | −23.16 | 4.58 | | −3 | 1 | 4 | Change preferred |
| ENSG00000161533 | 0.2182 | −21.26 | 3.85 | | −3 | 1 | 4 | Change preferred |
| ENSG00000168393 | 0.474767 | −24.11 | 6.94 | | −3 | 1 | 4 | Change preferred |
| ENSG00000171497 | 0.773768 | −18.31 | 2.94 | | −3 | 1 | 4 | Change preferred |
| ENSG00000175756 | 2.160767 | −12.66 | 11.31 | | −2 | 2 | 4 | Change preferred |
| ENSG00000179115 | 0.874614 | −17.45 | 7.23 | | −3 | 1 | 4 | Change preferred |
| ENSG00000179950 | 1.605781 | −11.97 | 12.05 | | −2 | 2 | 4 | Change preferred |

TABLE 9-continued

| | | | | | | | |
|---|---|---|---|---|---|---|---|
| ENSG00000196504 | 0.601752 | −20.14 | 5.47 | −3 | 1 | 4 | Change preferred |
| ENSG00000204574 | 0.799831 | −4.62 | 12.21 | −1 | 3 | 4 | Change preferred |
| ENSG00000257727 | 0.164014 | −29.44 | 1.03 | −4 | 0 | 4 | Change preferred |
| ENSG00000272886 | 0.452787 | −14.94 | 9.63 | −2 | 2 | 4 | Change preferred |
| ENSG00000071127 | −0.43102 | 25.77 | −2.02 | 4 | 0 | 4 | |
| ENSG00000076108 | −0.5991 | 0.16 | −21.35 | 0 | −4 | 4 | |
| ENSG00000092841 | −7.35572 | 21.47 | −5.71 | 3 | −1 | 4 | |
| ENSG00000102178 | −0.62456 | 11.03 | −7.51 | 2 | −2 | 4 | |
| ENSG00000105341 | −0.26339 | 20.71 | −4.50 | 3 | −1 | 4 | |
| ENSG00000124702 | −5.60968 | 1.62 | −19.63 | 0 | −4 | 4 | |
| ENSG00000141562 | −0.3149 | 16.17 | −8.45 | 2 | −2 | 4 | |
| ENSG00000147439 | −0.11355 | 18.88 | −3.03 | 3 | −1 | 4 | |
| ENSG00000159658 | −3.50207 | 2.53 | −20.53 | 0 | −4 | 4 | |
| ENSG00000169118 | −0.53458 | 6.68 | −16.74 | 1 | −3 | 4 | |
| ENSG00000172890 | −0.28478 | 6.89 | −14.97 | 1 | −3 | 4 | |
| ENSG00000213983 | −0.57091 | 6.38 | −16.34 | 1 | −3 | 4 | |
| ENSG00000100605 | 0.003707 | 28.82 | 0.11 4. Continuous increase | 4 | 0 | 4 | 4. Continuous increase |
| ENSG00000105401 | 4.584712 | 8.46 | 16.23 4. Continuous increase | 1 | 3 | 4 | 4. Continuous increase |
| ENSG00000116863 | 1.671524 | 15.87 | 8.74 4. Continuous increase | 2 | 2 | 4 | 4. Continuous increase |
| ENSG00000161939 | 3.64626 | 0.54 | 20.93 4. Continuous increase | 0 | 4 | 4 | 4. Continuous increase |
| ENSG00000166619 | 0.374971 | 10.56 | 7.43 4. Continuous increase | 2 | 2 | 4 | 4. Continuous increase |
| ENSG00000180370 | 1.649638 | 9.51 | 14.19 4. Continuous increase | 1 | 3 | 4 | 4. Continuous increase |
| ENSG00000186577 | 0.41976 | 24.00 | 5.21 4. Continuous increase | 3 | 1 | 4 | 4. Continuous increase |
| ENSG00000269858 | 0.438707 | 13.84 | 9.69 4. Continuous increase | 2 | 2 | 4 | 4. Continuous increase |
| ENSG00000007202 | −0.21601 | −11.94 | −4.82 1. Continuous decline | −2 | −1 | 3 | 1. Continuous decline |
| ENSG00000021776 | −0.25883 | −9.09 | −9.73 1. Continuous decline | −1 | −2 | 3 | 1. Continuous decline |
| ENSG00000060971 | −0.67112 | −1.13 | −12.87 1. Continuous decline | 0 | −3 | 3 | 1. Continuous decline |
| ENSG00000071462 | −0.18195 | −15.20 | −2.56 1. Continuous decline | −2 | −1 | 3 | 1. Continuous decline |
| ENSG00000074582 | −0.13369 | −13.49 | −3.24 1. Continuous decline | −2 | −1 | 3 | 1. Continuous decline |
| ENSG00000089737 | −0.17743 | −14.32 | −3.20 1. Continuous decline | −2 | −1 | 3 | 1. Continuous decline |
| ENSG00000090316 | −0.19875 | −17.11 | −6.18 1. Continuous decline | −2 | −1 | 3 | 1. Continuous decline |
| ENSG00000099995 | −0.42219 | −8.25 | −9.55 1. Continuous decline | −1 | −2 | 3 | 1. Continuous decline |
| ENSG00000100239 | −0.41341 | −1.65 | −13.47 1. Continuous decline | 0 | −3 | 3 | 1. Continuous decline |
| ENSG00000100281 | −0.19291 | −14.92 | −6.62 1. Continuous decline | −2 | −1 | 3 | 1. Continuous decline |
| ENSG00000101161 | −0.13396 | −18.74 | −0.74 1. Continuous decline | −3 | 0 | 3 | 1. Continuous decline |
| ENSG00000101199 | −0.05829 | −24.24 | −2.26 1. Continuous decline | −3 | 0 | 3 | 1. Continuous decline |

TABLE 9-continued

| | | | | | | | | |
|---|---|---|---|---|---|---|---|---|
| ENSG00000102103 | −0.5158 | −15.16 | 4.87 | 1. Continuous decline | −2 | −1 | 3 | 1. Continuous decline |
| ENSG00000105821 | −0.02441 | −24.08 | −0.77 | 1. Continuous decline | −3 | 0 | 3 | 1. Continuous decline |
| ENSG00000109111 | −0.06486 | −12.69 | −3.88 | 1. Continuous decline | −2 | −1 | 3 | 1. Continuous decline |
| ENSG00000113838 | −0.77958 | −4.79 | −11.00 | 1. Continuous decline | −1 | −2 | 3 | 1. Continuous decline |
| ENSG00000115685 | −1.10737 | −3.63 | −12.01 | 1. Continuous decline | −1 | −2 | 3 | 1. Continuous decline |
| ENSG00000116350 | −0.44085 | −12.58 | −6.97 | 1. Continuous decline | −2 | −1 | 3 | 1. Continuous decline |
| ENSG00000123415 | −0.11675 | −14.43 | −4.91 | 1. Continuous decline | −2 | −1 | 3 | 1. Continuous decline |
| ENSG00000124659 | −2.26568 | −5.03 | −11.95 | 1. Continuous decline | −1 | −2 | 3 | 1. Continuous decline |
| ENSG00000126768 | −0.18907 | −22.66 | −2.11 | 1. Continuous decline | −3 | 0 | 3 | 1. Continuous decline |
| ENSG00000131943 | −0.2376 | −5.62 | −7.64 | 1. Continuous decline | −1 | −2 | 3 | 1. Continuous decline |
| ENSG00000132153 | −0.24511 | −16.64 | −7.26 | 1. Continuous decline | −2 | −1 | 3 | 1. Continuous decline |
| ENSG00000138433 | −0.32166 | −15.71 | −2.67 | 1. Continuous decline | −2 | −1 | 3 | 1. Continuous decline |
| ENSG00000143222 | −1.61653 | −15.78 | −4.25 | 1. Continuous decline | −2 | −1 | 3 | 1. Continuous decline |
| ENSG00000144028 | −0.18769 | −14.26 | −2.96 | 1. Continuous decline | −2 | −1 | 3 | 1. Continuous decline |
| ENSG00000146540 | −0.22095 | −11.16 | −5.46 | 1. Continuous decline | −2 | −1 | 3 | 1. Continuous decline |
| ENSG00000149532 | −0.12781 | −13.79 | −6.00 | 1. Continuous decline | −2 | −1 | 3 | 1. Continuous decline |
| ENSG00000151657 | −0.04919 | −23.04 | −2.37 | 1. Continuous decline | −3 | 0 | 3 | 1. Continuous decline |
| ENSG00000155229 | −0.56488 | −1.44 | −13.64 | 1. Continuous decline | 0 | −3 | 3 | 1. Continuous decline |
| ENSG00000156304 | −0.05005 | −17.75 | −1.91 | 1. Continuous decline | −3 | 0 | 3 | 1. Continuous decline |
| ENSG00000158615 | −0.44679 | −13.56 | −6.68 | 1. Continuous decline | −2 | −1 | 3 | 1. Continuous decline |
| ENSG00000159140 | −0.46615 | −13.73 | −4.34 | 1. Continuous decline | −2 | −1 | 3 | 1. Continuous decline |
| ENSG00000160221 | −0.25686 | −11.92 | −6.68 | 1. Continuous decline | −2 | −1 | 3 | 1. Continuous decline |
| ENSG00000160710 | −0.20889 | −23.47 | −1.87 | 1. Continuous decline | −3 | 0 | 3 | 1. Continuous decline |
| ENSG00000160799 | −0.27565 | −14.59 | −4.36 | 1. Continuous decline | −2 | −1 | 3 | 1. Continuous decline |
| ENSG00000162385 | −0.91875 | −10.90 | −7.02 | 1. Continuous decline | −2 | −1 | 3 | 1. Continuous decline |
| ENSG00000167792 | −1.06597 | −6.22 | −11.06 | 1. Continuous decline | −1 | −2 | 3 | 1. Continuous decline |

TABLE 9-continued

| | | | | | | | |
|---|---|---|---|---|---|---|---|
| ENSG00000169976 | −2.50082 | −14.61 | −4.01 | 1. Continuous decline | −2 | −1 | 3 | 1. Continuous decline |
| ENSG00000173141 | −0.05948 | −19.82 | −0.32 | 1. Continuous decline | −3 | 0 | 3 | 1. Continuous decline |
| ENSG00000174197 | −0.36961 | −3.40 | −13.30 | 1. Continuous decline | 0 | −3 | 3 | 1. Continuous decline |
| ENSG00000176095 | −0.85007 | −1.95 | −15.28 | 1. Continuous decline | 0 | −3 | 3 | 1. Continuous decline |
| ENSG00000181610 | −0.22947 | −13.03 | −2.91 | 1. Continuous decline | −2 | −1 | 3 | 1. Continuous decline |
| ENSG00000181852 | −0.42682 | −8.55 | −9.90 | 1. Continuous decline | −1 | −2 | 3 | 1. Continuous decline |
| ENSG00000184110 | −0.10194 | −18.88 | −0.91 | 1. Continuous decline | −3 | 0 | 3 | 1. Continuous decline |
| ENSG00000188186 | −0.95364 | −12.24 | −6.87 | 1. Continuous decline | −2 | −1 | 3 | 1. Continuous decline |
| ENSG00000197226 | −0.38675 | −7.73 | −8.87 | 1. Continuous decline | −1 | −2 | 3 | 1. Continuous decline |
| ENSG00000205609 | −0.42305 | −21.54 | −1.55 | 1. Continuous decline | −3 | 0 | 3 | 1. Continuous decline |
| ENSG00000211450 | −0.7898 | −11.38 | −6.56 | 1. Continuous decline | −2 | −1 | 3 | 1. Continuous decline |
| ENSG00000214253 | −0.81547 | −16.78 | −2.63 | 1. Continuous decline | −2 | −1 | 3 | 1. Continuous decline |
| ENSG00000214736 | −0.9597 | −18.37 | −0.95 | 1. Continuous decline | −3 | 0 | 3 | 1. Continuous decline |
| ENSG00000248333 | −0.01404 | −23.04 | −0.36 | 1. Continuous decline | −3 | 0 | 3 | 1. Continuous decline |
| ENSG00000278259 | −0.11684 | −6.73 | −10.95 | 1. Continuous decline | −1 | −2 | 3 | 1. Continuous decline |
| ENSG00000008838 | 0.144302 | −11.99 | 5.91 | | −2 | 1 | 3 | Change preferred |
| ENSG00000032389 | 0.131237 | −10.96 | 5.18 | | −2 | 1 | 3 | Change preferred |
| ENSG00000086504 | 0.656986 | −5.41 | 8.60 | | −1 | 2 | 3 | Change preferred |
| ENSG00000100395 | 0.205711 | −8.99 | 8.27 | | −1 | 2 | 3 | Change preferred |
| ENSG00000100865 | 0.139453 | −12.74 | 3.49 | | −2 | 1 | 3 | Change preferred |
| ENSG00000103275 | 1.092783 | −2.42 | 16.64 | | 0 | 3 | 3 | Change preferred |
| ENSG00000104969 | 0.478051 | −9.67 | 9.08 | | −1 | 2 | 3 | Change preferred |
| ENSG00000105669 | 2.549345 | −8.28 | 8.69 | | −1 | 2 | 3 | Change preferred |
| ENSG00000107223 | 12.34076 | −7.94 | 10.79 | | −1 | 2 | 3 | Change preferred |
| ENSG00000111669 | 25.21802 | −8.98 | 9.35 | | −1 | 2 | 3 | Change preferred |
| ENSG00000126254 | 0.320246 | −11.07 | 3.45 | | −2 | 1 | 3 | Change preferred |
| ENSG00000131143 | 0.711428 | −12.04 | 4.27 | | −2 | 1 | 3 | Change preferred |
| ENSG00000133316 | 0.232801 | −11.28 | 5.33 | | −2 | 1 | 3 | Change preferred |
| ENSG00000136270 | 0.543157 | −2.30 | 16.67 | | 0 | 3 | 3 | Change preferred |
| ENSG00000136930 | 4.418395 | −12.86 | 7.13 | | −2 | 1 | 3 | Change preferred |
| ENSG00000138107 | 0.795793 | −13.36 | 4.88 | | −2 | 1 | 3 | Change preferred |
| ENSG00000140400 | 0.115026 | −14.23 | 6.04 | | −2 | 1 | 3 | Change preferred |

TABLE 9-continued

| | | | | | | | |
|---|---|---|---|---|---|---|---|
| ENSG00000154832 | 0.124111 | −12.83 | 3.23 | −2 | 1 | 3 | Change preferred |
| ENSG00000158417 | 0.565262 | −13.92 | 5.62 | −2 | 1 | 3 | Change preferred |
| ENSG00000160948 | 0.492188 | −13.26 | 4.23 | −2 | 1 | 3 | Change preferred |
| ENSG00000162191 | 0.463694 | −13.97 | 4.01 | −2 | 1 | 3 | Change preferred |
| ENSG00000163166 | 1.067457 | −0.26 | 12.45 | 0 | 3 | 3 | Change preferred |
| ENSG00000163714 | 0.004978 | −24.26 | 0.14 | −3 | 0 | 3 | Change preferred |
| ENSG00000167397 | 1.855181 | −3.58 | 7.93 | −1 | 2 | 3 | Change preferred |
| ENSG00000168259 | 0.671362 | −7.57 | 8.00 | −1 | 2 | 3 | Change preferred |
| ENSG00000168894 | 3.738211 | −9.45 | 9.85 | −1 | 2 | 3 | Change preferred |
| ENSG00000173113 | 2.685614 | −13.34 | 6.37 | −2 | 1 | 3 | Change preferred |
| ENSG00000174744 | 1.486387 | −0.37 | 16.14 | 0 | 3 | 3 | Change preferred |
| ENSG00000182944 | 1.488075 | −10.02 | 11.08 | −1 | 2 | 3 | Change preferred |
| ENSG00000185627 | 0.120526 | −21.89 | 1.02 | −3 | 0 | 3 | Change preferred |
| ENSG00000187514 | 18.44028 | −8.60 | 11.08 | −1 | 2 | 3 | Change preferred |
| ENSG00000205937 | 0.21905 | −14.53 | 3.77 | −2 | 1 | 3 | Change preferred |
| ENSG00000277791 | 6.840889 | −8.94 | 8.17 | 1 | 2 | 3 | Change preferred |
| ENSG00000022840 | −1.6354 | 1.30 | −13.17 | 1 | −3 | 3 | |
| ENSG00000088356 | −0.96843 | 7.04 | −8.23 | 1 | −2 | 3 | |
| ENSG00000097033 | −1.23477 | 8.44 | −7.50 | 1 | −2 | 3 | |
| ENSG00000105254 | −1.09933 | 7.03 | −8.35 | 1 | −2 | 3 | |
| ENSG00000114125 | −2.33211 | 4.57 | −8.97 | 1 | −2 | 3 | |
| ENSG00000122359 | −1.58024 | 7.24 | −10.27 | 1 | −2 | 3 | |
| ENSG00000126107 | −0.10339 | 24.13 | −1.73 | 3 | 0 | 3 | |
| ENSG00000128989 | −1.44034 | 10.35 | −8.79 | 1 | −2 | 3 | |
| ENSG00000131408 | −0.83202 | 10.26 | −7.73 | 1 | −2 | 3 | |
| ENSG00000136950 | −1.12322 | 10.26 | −11.38 | 1 | −2 | 3 | |
| ENSG00000137996 | −12.08748 | 9.35 | −10.18 | 1 | −2 | 3 | |
| ENSG00000143774 | −1.37423 | 6.56 | −11.74 | 1 | −2 | 3 | |
| ENSG00000148634 | −0.27847 | 9.36 | −9.15 | 1 | −2 | 3 | |
| ENSG00000158195 | −1.89044 | 10.87 | −5.44 | 2 | −1 | 3 | |
| ENSG00000160688 | −0.52712 | 4.73 | −8.06 | 1 | −2 | 3 | |
| ENSG00000166750 | −0.35678 | 12.20 | −5.05 | 2 | −1 | 3 | |
| ENSG00000173915 | −19.2044 | 0.32 | −15.18 | 0 | −3 | 3 | |
| ENSG00000175203 | −2.79849 | 2.33 | −14.64 | 0 | −3 | 3 | |
| ENSG00000242498 | −0.13075 | 14.15 | −3.66 | 2 | −1 | 3 | |
| ENSG00000255112 | −1.94538 | 11.54 | −5.90 | 2 | −1 | 3 | |
| ENSG00000011009 | 0.762378 | 15.61 | 5.70 | 4. Continuous increase | 2 | 1 | 3 | 4. Continuous increase |
| ENSG00000078902 | 0.212998 | 14.15 | 6.45 | 4. Continuous increase | 2 | 1 | 3 | 4. Continuous increase |
| ENSG00000095485 | 0.519435 | 7.78 | 8.54 | 4. Continuous increase | 1 | 2 | 3 | 4. Continuous increase |
| ENSG00000104518 | 0.583448 | 8.42 | 12.14 | 4. Continuous increase | 1 | 2 | 3 | 4. Continuous increase |
| ENSG00000125826 | 0.829791 | 4.25 | 10.77 | 4. Continuous increase | 1 | 2 | 3 | 4. Continuous increase |
| ENSG00000159069 | 1.441832 | 2.85 | 14.49 | 4. Continuous increase | 0 | 3 | 3 | 4. Continuous increase |
| ENSG00000161217 | 0.528805 | 5.71 | 11.57 | 4. Continuous increase | 1 | 2 | 3 | 4. Continuous increase |
| ENSG00000275700 | 0.637326 | 4.33 | 9.80 | 4. Continuous increase | 1 | 2 | 3 | 4. Continuous increase |
| ENSG00000011007 | −0.40948 | −3.90 | −5.87 | 1. Continuous decline | −1 | −1 | 2 | 1. Continuous decline |

TABLE 9-continued

| | | | | | | | | |
|---|---|---|---|---|---|---|---|---|
| ENSG00000041802 | −0.19476 | −8.93 | −3.33 | 1. Continuous decline | −1 | −1 | 2 | 1. Continuous decline |
| ENSG00000061936 | −0.18462 | −2.57 | −11.68 | 1. Continuous decline | 0 | −2 | 2 | 1. Continuous decline |
| ENSG00000071894 | −0.03103 | 10.78 | −1.41 | 1. Continuous decline | −2 | 0 | 2 | 1. Continuous decline |
| ENSG00000075856 | −0.06627 | −14.89 | −2.28 | 1. Continuous decline | −2 | 0 | 2 | 1. Continuous decline |
| ENSG00000105127 | −0.32526 | −2.35 | −7.98 | 1. Continuous decline | 0 | −2 | 2 | 1. Continuous decline |
| ENSG00000115207 | −0.13688 | −8.51 | −2.46 | 1. Continuous decline | −1 | −1 | 2 | 1. Continuous decline |
| ENSG00000118579 | −0.13779 | −8.82 | −2.75 | 1. Continuous decline | −1 | −1 | 2 | 1. Continuous decline |
| ENSG00000119402 | −0.09649 | −15.28 | −2.28 | 1. Continuous decline | −2 | 0 | 2 | 1. Continuous decline |
| ENSG00000125651 | −0.11009 | −14.58 | −1.03 | 1. Continuous decline | −2 | 0 | 2 | 1. Continuous decline |
| ENSG00000126775 | −0.3372 | −1.85 | −9.77 | 1. Continuous decline | 0 | −2 | 2 | 1. Continuous decline |
| ENSG00000133997 | −0.04005 | −13.95 | −0.62 | 1. Continuous decline | −2 | 0 | 2 | 1. Continuous decline |
| ENSG00000135974 | −0.21627 | −1.40 | −10.35 | 1. Continuous decline | 0 | −2 | 2 | 1. Continuous decline |
| ENSG00000141551 | −0.49506 | −3.07 | −12.02 | 1. Continuous decline | 0 | −2 | 2 | 1. Continuous decline |
| ENSG00000143093 | −0.2735 | −1.72 | −9.32 | 1. Continuous decline | 0 | −2 | 2 | 1. Continuous decline |
| ENSG00000143393 | −0.47936 | −2.37 | −9.13 | 1. Continuous decline | 0 | −2 | 2 | 1. Continuous decline |
| ENSG00000143751 | −0.56465 | −7.21 | −5.23 | 1. Continuous decline | −1 | −1 | 2 | 1. Continuous decline |
| ENSG00000160075 | −0.91121 | −2.59 | −9.05 | 1. Continuous decline | 0 | −2 | 2 | 1. Continuous decline |
| ENSG00000165525 | −0.78733 | −3.11 | −7.99 | 1. Continuous decline | 0 | −2 | 2 | 1. Continuous decline |
| ENSG00000166783 | −0.12291 | −6.56 | −4.07 | 1. Continuous decline | −1 | −1 | 2 | 1. Continuous decline |
| ENSG00000167863 | −3.5973 | −2.60 | −7.66 | 1. Continuous decline | 0 | −2 | 2 | 1. Continuous decline |
| ENSG00000167986 | −0.62099 | −2.08 | −9.85 | 1. Continuous decline | 0 | −2 | 2 | 1. Continuous decline |
| ENSG00000170445 | −0.27959 | −7.84 | −5.12 | 1. Continuous decline | −1 | −1 | 2 | 1. Continuous decline |
| ENSG00000173575 | −0.35328 | −0.61 | −8.33 | 1. Continuous decline | 0 | −2 | 2 | 1. Continuous decline |
| ENSG00000179119 | −0.23622 | −8.93 | −5.51 | 1. Continuous decline | −1 | −1 | 2 | 1. Continuous decline |
| ENSG00000186566 | −0.15071 | −10.37 | −3.89 | 1. Continuous decline | −1 | −1 | 2 | 1. Continuous decline |
| ENSG00000196470 | −0.31026 | −1.69 | −11.68 | 1. Continuous decline | 0 | −2 | 2 | 1. Continuous decline |

TABLE 9-continued

| | | | | | | | | |
|---|---|---|---|---|---|---|---|---|
| ENSG00000198258 | −2.67292 | −7.55 | −4.42 | 1. Continuous decline | −1 | −1 | 2 | 1. Continuous decline |
| ENSG00000204438 | −0.21985 | −3.62 | −5.73 | 1. Continuous decline | −1 | −1 | 2 | 1. Continuous decline |
| ENSG00000204560 | −0.4303 | −3.35 | −7.97 | 1. Continuous decline | 0 | −2 | 2 | 1. Continuous decline |
| ENSG00000205531 | −1.16734 | −1.19 | −8.30 | 1. Continuous decline | 0 | −2 | 2 | 1. Continuous decline |
| ENSG00000001497 | 0.044892 | −11.58 | 1.06 | | −2 | 0 | 2 | Change preferred |
| ENSG00000055044 | 0.334562 | −16.32 | 1.63 | | −2 | 0 | 2 | Change preferred |
| ENSG00000067829 | 0.897283 | −10.09 | 5.58 | | −1 | 1 | 2 | Change preferred |
| ENSG00000080824 | 4.595632 | −5.18 | 3.44 | | −1 | 1 | 2 | Change preferred |
| ENSG00000100387 | 0.333226 | −11.65 | 1.07 | | −2 | 0 | 2 | Change preferred |
| ENSG00000105618 | 0.659901 | −3.79 | 6.04 | | −1 | 1 | 2 | Change preferred |
| ENSG00000114383 | 0.446743 | −9.32 | 5.80 | | −1 | 1 | 2 | Change preferred |
| ENSG00000117360 | 0.471459 | −3.38 | 7.76 | | 0 | 2 | 2 | Change preferred |
| ENSG00000130175 | 0.130742 | −9.41 | 2.98 | | −1 | 1 | 2 | Change preferred |
| ENSG00000130640 | 0.285744 | −6.17 | 6.35 | | −1 | 1 | 2 | Change preferred |
| ENSG00000131381 | 0.031815 | −17.33 | 1.19 | | −2 | 0 | 2 | Change preferred |
| ENSG00000136758 | 1.319862 | −5.41 | 7.13 | | −1 | 1 | 2 | Change preferred |
| ENSG00000143321 | 1.453442 | −1.53 | 10.31 | | 0 | 2 | 2 | Change preferred |
| ENSG00000143575 | 1.36536 | −2.79 | 7.45 | | 0 | 2 | 2 | Change preferred |
| ENSG00000143799 | 0.057081 | −16.66 | 0.61 | | −2 | 0 | 2 | Change preferred |
| ENSG00000151304 | 0.021182 | −16.90 | 0.31 | | −2 | 0 | 2 | Change preferred |
| ENSG00000156990 | 0.152357 | −6.93 | 4.71 | | −1 | 1 | 2 | Change preferred |
| ENSG00000166716 | 0.08286 | −6.76 | 3.66 | | −1 | 1 | 2 | Change preferred |
| ENSG00000168411 | 0.115766 | −4.34 | 3.94 | | −1 | 1 | 2 | Change preferred |
| ENSG00000173486 | 4.982928 | −3.10 | 11.69 | | 0 | 2 | 2 | Change preferred |
| ENSG00000176715 | 0.067657 | −6.27 | 4.10 | | −1 | 1 | 2 | Change preferred |
| ENSG00000177156 | 5.63889 | −0.64 | 8.99 | | 0 | 2 | 2 | Change preferred |
| ENSG00000183258 | 0.188968 | −7.32 | 2.79 | | −1 | 1 | 2 | Change preferred |
| ENSG00000185324 | 0.029958 | −14.59 | 0.97 | | −2 | 0 | 2 | Change preferred |
| ENSG00000187051 | 0.159189 | −8.72 | 2.49 | | −1 | 1 | 2 | Change preferred |
| ENSG00000204316 | 0.361767 | −5.16 | 6.80 | | −1 | 1 | 2 | Change preferred |
| ENSG00000204435 | 0.366976 | −11.84 | 1.70 | | −2 | 0 | 2 | Change preferred |
| ENSG00000204568 | 0.21836 | −14.27 | 0.63 | | −2 | 0 | 2 | Change preferred |
| ENSG00000105287 | −0.18916 | 3.36 | −10.93 | | 0 | −2 | 2 | |
| ENSG00000114316 | −0.20162 | 17.15 | −2.32 | | 2 | 0 | 2 | |
| ENSG00000116213 | −0.0465 | 7.57 | −3.25 | | 1 | −1 | 2 | |
| ENSG00000131165 | −0.67513 | 7.62 | −4.26 | | 1 | −1 | 2 | |
| ENSG00000136807 | −0.24987 | 8.28 | −6.02 | | 1 | −1 | 2 | |
| ENSG00000140632 | −0.18133 | 4.51 | −3.27 | | 1 | −1 | 2 | |
| ENSG00000173039 | −0.26688 | 8.61 | −6.65 | | 1 | −1 | 2 | |
| ENSG00000183576 | −0.12139 | 10.62 | −1.37 | | 2 | 0 | 2 | |
| ENSG00000185043 | −5.71015 | 8.67 | −6.56 | | 1 | −1 | 2 | |
| ENSG00000186432 | −0.35249 | 10.29 | −6.67 | | 1 | −1 | 2 | |
| ENSG00000198373 | −0.1196 | 9.52 | −4.31 | | 1 | −1 | 2 | |
| ENSG00000204843 | −0.25653 | 6.50 | −5.23 | | 1 | −1 | 2 | |

TABLE 9-continued

| | | | | | | | |
|---|---|---|---|---|---|---|---|
| ENSG00000257923 | −0.25455 | 2.04 | −9.51 | | 0 | −2 | 2 | |
| ENSG00000275066 | −0.15678 | 1.89 | −8.64 | | 0 | −2 | 2 | |
| ENSG00000068400 | 0.197343 | 3.94 | 5.68 | 4. Continuous increase | 1 | 1 | 2 | 4. Continuous increase |
| ENSG00000110801 | 0.117788 | 8.74 | 2.55 | 4. Continuous increase | 1 | 1 | 2 | 4. Continuous increase |
| ENSG00000113648 | 0.367482 | 2.40 | 10.90 | 4. Continuous increase | 0 | 2 | 2 | 4. Continuous increase |
| ENSG00000132522 | 0.327613 | 9.91 | 4.83 | 4. Continuous increase | 1 | 1 | 2 | 4. Continuous increase |
| ENSG00000134287 | 0.870547 | 8.29 | 6.76 | 4. Continuous increase | 1 | 1 | 2 | 4. Continuous increase |
| ENSG00000135930 | 1.121491 | 2.52 | 9.92 | 4. Continuous increase | 0 | 2 | 2 | 4. Continuous increase |
| ENSG00000161526 | 0.098653 | 7.97 | 2.57 | 4. Continuous increase | 1 | 1 | 2 | 4. Continuous increase |
| ENSG00000178950 | 0.072954 | 9.11 | 3.97 | 4. Continuous increase | 1 | 1 | 2 | 4. Continuous increase |
| ENSG00000196262 | 12.16229 | 4.36 | 5.19 | 4. Continuous increase | 1 | 1 | 2 | 4. Continuous increase |
| ENSG00000196363 | 0.435673 | 0.17 | 8.42 | 4. Continuous increase | 0 | 2 | 2 | 4. Continuous increase |
| ENSG00000198952 | 0.14818 | 13.34 | 2.24 | 4. Continuous increase | 2 | 0 | 2 | 4. Continuous increase |
| ENSG00000006712 | −0.15507 | −9.38 | −1.81 | 1. Continuous decline | −1 | 0 | 1 | 1. Continuous decline |
| ENSG00000108256 | −0.31313 | −3.48 | −6.28 | 1. Continuous decline | 0 | −1 | 1 | 1. Continuous decline |
| ENSG00000124209 | −0.04085 | −8.84 | −0.97 | 1. Continuous decline | −1 | 0 | 1 | 1. Continuous decline |
| ENSG00000124228 | −0.26118 | −1.64 | −4.67 | 1. Continuous decline | 0 | −1 | 1 | 1. Continuous decline |
| ENSG00000124570 | −0.71191 | −0.01 | −4.59 | 1. Continuous decline | 0 | −1 | 1 | 1. Continuous decline |
| ENSG00000126267 | −2.49038 | −9.75 | −2.25 | 1. Continuous decline | −1 | 0 | 1 | 1. Continuous decline |
| ENSG00000134809 | −0.86298 | −9.13 | −1.96 | 1. Continuous decline | −1 | 0 | 1 | 1. Continuous decline |
| ENSG00000140983 | −0.04232 | −7.95 | −1.21 | 1. Continuous decline | −1 | 0 | 1 | 1. Continuous decline |
| ENSG00000151461 | −0.03607 | −7.74 | −0.77 | 1. Continuous decline | −1 | 0 | 1 | 1. Continuous decline |
| ENSG00000169018 | −0.1376 | −8.65 | −2.42 | 1. Continuous decline | −1 | 0 | 1 | 1. Continuous decline |
| ENSG00000172500 | −0.14687 | −9.63 | −1.51 | 1. Continuous decline | −1 | 0 | 1 | 1. Continuous decline |
| ENSG00000204356 | −0.43537 | −1.48 | −2.53 | 1. Continuous decline | 0 | −1 | 1 | 1. Continuous decline |
| ENSG00000234127 | −0.33169 | −3.34 | −4.81 | 1. Continuous decline | 0 | −1 | 1 | 1. Continuous decline |
| ENSG00000031823 | −0.125724 | −2.94 | 6.17 | | 0 | 1 | 1 | Change preferred |
| ENSG00000058272 | −0.090103 | −6.02 | 1.66 | | −1 | 0 | 1 | Change preferred |
| ENSG00000078061 | 0.371692 | −3.05 | 6.73 | | 0 | 1 | 1 | Change preferred |

TABLE 9-continued

| | | | | | | | |
|---|---|---|---|---|---|---|---|
| ENSG00000083168 | 0.23938 | −0.58 | 7.03 | 0 | 1 | 1 | Change preferred |
| ENSG00000099341 | 0.435797 | −7.03 | 1.55 | −1 | 0 | 1 | Change preferred |
| ENSG00000125656 | 0.403261 | −2.27 | 4.88 | 0 | 1 | 1 | Change preferred |
| ENSG00000136271 | 0.114514 | −7.68 | 1.19 | −1 | 0 | 1 | Change preferred |
| ENSG00000166595 | 3.14789 | −2.51 | 7.06 | 0 | 1 | 1 | Change preferred |
| ENSG00000169217 | 0.229736 | −8.39 | 1.87 | −1 | 0 | 1 | Change preferred |
| ENSG00000178741 | 2.942091 | −2.92 | 3.48 | 0 | 1 | 1 | Change preferred |
| ENSG00000178952 | 0.856639 | −7.51 | 2.23 | −1 | 0 | 1 | Change preferred |
| ENSG00000178982 | 0.02375 | −7.76 | 0.08 | −1 | 0 | 1 | Change preferred |
| ENSG00000180992 | 0.296845 | −8.38 | 0.46 | −1 | 0 | 1 | Change preferred |
| ENSG00000182196 | 0.123259 | −10.40 | 1.28 | −1 | 0 | 1 | Change preferred |
| ENSG00000186501 | 0.284764 | −2.36 | 6.61 | 0 | 1 | 1 | Change preferred |
| ENSG00000196821 | 0.216453 | −3.20 | 3.74 | 0 | 1 | 1 | Change preferred |
| ENSG00000273559 | 0.347119 | −0.60 | 6.14 | 0 | 1 | 1 | Change preferred |
| ENSG00000004059 | −1.41439 | 0.95 | −3.32 | 0 | −1 | 1 | |
| ENSG00000028528 | −0.33118 | 0.45 | −4.06 | 0 | −1 | 1 | |
| ENSG00000095380 | −0.40515 | 1.03 | −3.80 | 0 | −1 | 1 | |
| ENSG00000099940 | −0.31769 | 0.60 | −3.63 | 0 | −1 | 1 | |
| ENSG00000135940 | −2.89485 | 0.54 | −3.32 | 0 | −1 | 1 | |
| ENSG00000160087 | −0.19965 | 0.60 | −5.11 | 0 | −1 | 1 | |
| ENSG00000162517 | −0.72966 | 3.02 | −2.91 | 0 | −1 | 1 | |
| ENSG00000163812 | −0.18154 | 0.92 | −3.69 | 0 | −1 | 1 | |
| ENSG00000171824 | −0.20407 | 1.95 | −3.94 | 0 | −1 | 1 | |
| ENSG00000173120 | −0.22637 | 2.20 | −7.14 | 0 | −1 | 1 | |
| ENSG00000187778 | −0.10184 | 6.89 | −1.36 | 1 | 0 | 1 | |
| ENSG00000242372 | −1.06923 | 3.76 | −1.69 | 1 | 0 | 1 | |
| ENSG00000089159 | 0.016151 | 6.21 | 0.30 | 4. Continuous increase | 1 | 0 | 1 | 4. Continuous increase |
| ENSG00000099917 | 0.045473 | 5.28 | 2.13 | 4. Continuous increase | 1 | 0 | 1 | 4. Continuous increase |
| ENSG00000128891 | 0.132034 | 0.10 | 4.28 | 4. Continuous increase | 0 | 1 | 1 | 4. Continuous increase |
| ENSG00000129071 | 0.303117 | 0.73 | 4.22 | 4. Continuous increase | 0 | 1 | 1 | 4. Continuous increase |
| ENSG00000130305 | 0.159322 | 2.84 | 4.45 | 4. Continuous increase | 0 | 1 | 1 | 4. Continuous increase |
| ENSG00000132155 | 0.245037 | 1.64 | 3.12 | 4. Continuous increase | 0 | 1 | 1 | 4. Continuous increase |
| ENSG00000130520 | −0.19449 | −0.04 | −1.34 | 1. Continuous decline | 0 | 0 | 0 | 1. Continuous decline |
| ENSG00000166135 | −0.06229 | −0.22 | −1.96 | 1. Continuous decline | 0 | 0 | 0 | 1. Continuous decline |
| ENSG00000172725 | −0.03229 | −2.22 | −0.38 | 1. Continuous | 0 | 0 | 0 | 1. Continuous decline |
| ENSG00000130313 | −0.05906 | 0.54 | −0.95 | | 0 | 0 | 0 | |
| ENSG00000142546 | −0.15592 | 2.56 | −1.89 | | 0 | 0 | 0 | |
| ENSG00000160679 | −0.1573 | 0.54 | −1.35 | | 0 | 0 | 0 | |
| ENSG00000067900 | 0.132709 | 1.75 | 2.11 | 4. Continuous increase | 0 | 0 | 0 | 4. Continuous increase |
| ENSG00000174243 | 0.151854 | 0.28 | 2.33 | 4. Continuous increase | 0 | 0 | 0 | 4. Continuous increase |

As shown in Table 9, in the present invention, even though only one single marker is used, as long as the predetermined value is exceeded, these markers may be used as useful auxiliary determination or diagnostic information of endometrial receptivity, thus especially for early-stage and/or auxiliary diagnosis.

Moreover, the use of a plurality of markers in Table 9 for comprehensive judgment may further significantly reduce the error rate (only 17.5%), thus improving the accuracy of the judgment.

When a plurality of markers (containing additional 5-200 genes) are taken, the error rate may be as low as 16.5%.

When the number of the markers used goes up to 10000, the error rate would be only 6.7%.

The error rate is calculated by the following way: clinical outcomes serve as gold standards, and the date of successful embryo implantation is the receptivity period. Accuracy rate=number of cases determined as a receptivity period by the method/the total number of successful embryo implantation cases; error rate=number of cases determined as not a receptivity period by the method/the number of successful embryo implantation cases.

Therefore, it can be seen from the above description that the markers in the present invention have very high predictive values, especially for the use in combination, by which the error rate of determination of an endometrial receptivity status may be further reduced, thus improving the accuracy of the determination.

In addition, according to Table 11, markers in Table 9 were further screened in the present invention to obtain 40 markers, 147 markers and 259 markers having very low error rate and high-accuracy effect, where, the blank refers to an analysis value <4.

TABLE 11

| Count item: No. | Preferred type 2 | | |
|---|---|---|---|
| Preferred type 1 | High analysis value | Blank | Total |
| Change preferred | 40 | 107 | 147 |
| Blank | 219 | 268 | 487 |
| Total | 259 | 375 | 634 |

Furthermore, it can be seen from Table 10 that genes in Table 9 of the present invention are core genes. On this basis, the newly added genes will improve accuracy, but have a low weight.

TABLE 10

| Accuracy | Total number of genes | Core | Non-core | Newly added | Algorithm 1 Weight | |
|---|---|---|---|---|---|---|
| 82.50% | 634 | 634 | 0 | | 0.130% | |
| 85.00% | 2572 | 634 | 1938 | 1938 | 0.033% | 0.0013% |
| 92.50% | 9154 | 634 | 8520 | 6582 | 0.010% | 0.0011% |
| 93.30% | 10696 | 634 | 10062 | 1542 | 0.009% | 0.0005% |

To sum up, the present invention depends on high-sensitivity RNA reverse transcription and cDNA amplification process, and is based on a RNA-seq sequencing method, thereby obtaining a large number of expression profile information of endometrium, uterine fluid or other reproductive endocrinology-related body fluids or exfoliations from patients. The sampling periods, and sampling manners for these samples are specifically selected to obtain different expression profile features, which is subjected to ultra-high dimensionality classification and typing by bioinformatics, statistics and machine learning methods. Depending on different types, the ER status is determined. In the present invention, the expression profile features are used in the model determining the ER status before the embryo implantation thus accurately determining an implantation window period of endometrium.

The applicant states that the present invention describes the detailed methods via the above examples, but is not limited to the above detail methods. That is, it does not mean that the present invention must depend on the above detailed methods for implementation. A person skilled in the art should know that any improvement to the present invention, equivalent replacement to each raw material of the product of the present invention, addition of auxiliary components, selection of specific means, and the like shall fall within the protection scope and disclosure scope of the present invention.

All the literatures mentioned herein are cited in the present application as references, just as each piece of literature is separately cited as a reference. It should be understood herein that a person skilled in the art may make any change or amendment to the present invention after reading the above teaching content of the present invention; and these equivalent forms also fall within the scope defined in the claims of the present application.

The invention claimed is:

1. A method for embryo implantation into a woman undergoing in vitro fertilization (IVF), comprising the following steps:
   (a) obtaining a sample of endometrial tissues, uterine fluid, and/or vaginal exfoliated cells, wherein the sample is from the following periods: LH+5 to LH+9, preferably, LH+7;
   (b) measuring the mRNA expression levels of endometrial receptivity-related genes in the sample;
   (c) determining that the endometrium is receptive by either comparing the mRNA expression levels of the endometrial receptivity-related genes obtained in the step (b) with a predetermined value of the expression levels of said genes in a pre-receptivity period, intermediate period, and a post-receptivity period or inputting the mRNA expression levels of the endometrial receptivity-related genes obtained in the step (b) into an analysis model for determining endometrial receptivity constructed by a supervised learning method; and
   (d) implanting an embryo into said woman,
   wherein the endometrial receptivity-related genes are differentially-expressed in the pre-receptivity period, intermediate period, and the post-receptivity period, and comprise all 634 genes of Table A

TABLE A

| | Name |
|---|---|
| 1 | KRIT1 |
| 2 | RBM5 |
| 3 | PAF1 |
| 4 | RFC1 |
| 5 | TPR |
| 6 | ACAA1 |
| 7 | SFSWAP |
| 8 | SPEN |
| 9 | CPSF1 |
| 10 | XRCC1 |
| 11 | KDM5A |
| 12 | SART3 |

TABLE A-continued

| | Name |
|---|---|
| 13 | PIK3C3 |
| 14 | YTHDC1 |
| 15 | PPIE |
| 16 | NFX1 |
| 17 | CDC5L |
| 18 | SF3A1 |
| 19 | TXN2 |
| 20 | EIF3D |
| 21 | EP300 |
| 22 | CHD8 |
| 23 | PNN |
| 24 | CSTF1 |
| 25 | PRPF6 |
| 26 | PQBP1 |
| 27 | CIAO3 |
| 28 | HMOX2 |
| 29 | PIH1D1 |
| 30 | AKAP8 |
| 31 | BUD31 |
| 32 | EIF3A |
| 33 | CASC3 |
| 34 | CDK5RAP3 |
| 35 | SUPT6H |
| 36 | CNOT2 |
| 37 | SUDS3 |
| 38 | TBCCD1 |
| 39 | EIF2B4 |
| 40 | ORC2 |
| 41 | SRSF4 |
| 42 | SFPQ |
| 43 | SRSF11 |
| 44 | PRRC2C |
| 45 | FBXW2 |
| 46 | SNX19 |
| 47 | EPC1 |
| 48 | TBCC |
| 49 | CNOT1 |
| 50 | GTF2F1 |
| 51 | KDM5C |
| 52 | NSRP1 |
| 53 | UXT |
| 54 | ATG14 |
| 55 | AKAP9 |
| 56 | PRKRIP1 |
| 57 | CCNT1 |
| 58 | LSM4 |
| 59 | RLIM |
| 60 | ERAL1 |
| 61 | PTPRA |
| 62 | NASP |
| 63 | SRRM1 |
| 64 | PRPF38A |
| 65 | CDK5RAP2 |
| 66 | PRPF4 |
| 67 | PPIG |
| 68 | SMARCC2 |
| 69 | TCF25 |
| 70 | CSNK1D |
| 71 | ENSA |
| 72 | TEX261 |
| 73 | FIP1L1 |
| 74 | CENPC |
| 75 | ZMAT2 |
| 76 | CELF1 |
| 77 | CPSF7 |
| 78 | UPF2 |
| 79 | MMS19 |
| 80 | SON |
| 81 | ADAR |
| 82 | MAGOH |
| 83 | ELP6 |
| 84 | NIPBL |
| 85 | SLU7 |
| 86 | PCF11 |
| 87 | NSD1 |
| 88 | YWHAB |
| 89 | DDB1 |
| 90 | SF1 |
| 91 | ATG4B |
| 92 | FEM1B |
| 93 | SIN3A |
| 94 | LUZP1 |
| 95 | GPS1 |
| 96 | SF3B5 |
| 97 | HNRNPA3 |
| 98 | PYM1 |
| 99 | RBM4 |
| 100 | PRPF8 |
| 101 | ZBTB4 |
| 102 | CKAP5 |
| 103 | SMAD2 |
| 104 | POLR2A |
| 105 | RNF135 |
| 106 | RNF41 |
| 107 | MRPS11 |
| 108 | CEP63 |
| 109 | EIF3C |
| 110 | SF3B3 |
| 111 | SIAH1 |
| 112 | SND1 |
| 113 | UBL5 |
| 114 | NELFE |
| 115 | EIF3CL |
| 116 | FIS1 |
| 117 | TRIM26 |
| 118 | MRPL20 |
| 119 | KMT2E |
| 120 | AFF4 |
| 121 | GTF3C1 |
| 122 | ANAPC5 |
| 123 | MAEA |
| 124 | TOX4 |
| 125 | GID8 |
| 126 | ARFGAP1 |
| 127 | ARHGEF7 |
| 128 | H2AFV |
| 129 | ZNHIT1 |
| 130 | COA1 |
| 131 | GBF1 |
| 132 | GOSR1 |
| 133 | IFT20 |
| 134 | ANAPC15 |
| 135 | IK |
| 136 | KANSL3 |
| 137 | GTF3C2 |
| 138 | CHMP3 |
| 139 | FAM20B |
| 140 | CHCHD5 |
| 141 | RPAIN |
| 142 | UBE4B |
| 143 | C19orf12 |
| 144 | ANKRD17 |
| 145 | MED6 |
| 146 | TMEM258 |
| 147 | ERCC5 |
| 148 | ATP5MC2 |
| 149 | SMPD4 |
| 150 | ECPAS |
| 151 | DMAC1 |
| 152 | SEC24B |
| 153 | NCOR1 |
| 154 | PI4KB |
| 155 | C1orf43 |
| 156 | ASXL2 |
| 157 | VTI1A |
| 158 | PPP1R15B |
| 159 | SNF8 |
| 160 | GATD3A |
| 161 | MED11 |
| 162 | RAD21 |
| 163 | SPIDR |
| 164 | ANAPC16 |
| 165 | VPS39 |
| 166 | ATP5PD |
| 167 | FIBP |
| 168 | CORO1B |

TABLE A-continued

| | Name |
|---|---|
| 169 | RAB1B |
| 170 | RMDN1 |
| 171 | BETIL |
| 172 | ASB8 |
| 173 | EXOC7 |
| 174 | UQCR10 |
| 175 | TOP1 |
| 176 | SPOUT1 |
| 177 | ARMCX6 |
| 178 | PPP1R10 |
| 179 | LIN52 |
| 180 | SMIM7 |
| 181 | TOMM6 |
| 182 | PDCD6 |
| 183 | GGNBP2 |
| 184 | GATD3B |
| 185 | KIAA0100 |
| 186 | ELOA |
| 187 | AQR |
| 188 | FBXO42 |
| 189 | LSG1 |
| 190 | FAM120A |
| 191 | THRAP3 |
| 192 | ARID4B |
| 193 | POLR3E |
| 194 | GPBP1 |
| 195 | RFXANK |
| 196 | TAF11 |
| 197 | BUD23 |
| 198 | PDCD2 |
| 199 | BCS1L |
| 200 | ZNF638 |
| 201 | ZNF37A |
| 202 | EXOSC7 |
| 203 | TOP2B |
| 204 | DELE1 |
| 205 | GCN1 |
| 206 | DDX24 |
| 207 | DHPS |
| 208 | WAC |
| 209 | HPS4 |
| 210 | PPP6R2 |
| 211 | PACSIN2 |
| 212 | HMGXB4 |
| 213 | POLR3H |
| 214 | RBM23 |
| 215 | ZC3H14 |
| 216 | DCAF11 |
| 217 | NDRG3 |
| 218 | GYS1 |
| 219 | CCDC130 |
| 220 | DNAJC2 |
| 221 | CHCHD2 |
| 222 | TMEM248 |
| 223 | NUFIP2 |
| 224 | UBTF |
| 225 | MTMR4 |
| 226 | RSRC2 |
| 227 | KRR1 |
| 228 | CHD4 |
| 229 | ZNF451 |
| 230 | SENP6 |
| 231 | PRPF4B |
| 232 | PRKAR2A |
| 233 | FXR1 |
| 234 | HDLBP |
| 235 | PPP1R7 |
| 236 | ASH1L |
| 237 | GON4L |
| 238 | TSNAX |
| 239 | HMGCL |
| 240 | MED28 |
| 241 | NEK9 |
| 242 | PANK3 |
| 243 | SPOP |
| 244 | MTIF3 |
| 245 | ZC3H13 |
| 246 | SMUG1 |
| 247 | RAB22A |
| 248 | STAU1 |
| 249 | DDX27 |
| 250 | SERPINB6 |
| 251 | MEA1 |
| 252 | COX6B1 |
| 253 | TIMM17B |
| 254 | XPO7 |
| 255 | SAFB2 |
| 256 | EIF2S3 |
| 257 | UBA1 |
| 258 | RBM39 |
| 259 | ACLY |
| 260 | DHX30 |
| 261 | SCO1 |
| 262 | LARS |
| 263 | PPHLN1 |
| 264 | LPIN1 |
| 265 | TIMM10 |
| 266 | ARGLU1 |
| 267 | TFCP2 |
| 268 | C2orf49 |
| 269 | SLTM |
| 270 | CIR1 |
| 271 | TMOD3 |
| 272 | SBNO1 |
| 273 | DCAF5 |
| 274 | ANP32A |
| 275 | COMMD4 |
| 276 | ARHGAP17 |
| 277 | RHOT2 |
| 278 | SERBP1 |
| 279 | STRIP1 |
| 280 | UFC1 |
| 281 | MRPL9 |
| 282 | UBAP2L |
| 283 | SDE2 |
| 284 | SNRNP200 |
| 285 | C7orf50 |
| 286 | MDH2 |
| 287 | NDUFB11 |
| 288 | TAF1 |
| 289 | EIF4EBP2 |
| 290 | MTG1 |
| 291 | NUDT22 |
| 292 | VIPAS39 |
| 293 | KIN |
| 294 | ATP5F1A |
| 295 | PELO |
| 296 | SAR1B |
| 297 | HNRNPDL |
| 298 | CCDC174 |
| 299 | LARP1 |
| 300 | SCAF4 |
| 301 | APPL1 |
| 302 | GPBP1L1 |
| 303 | PSKH1 |
| 304 | SSU72 |
| 305 | CCDC12 |
| 306 | ZYG11B |
| 307 | PMVK |
| 308 | KIAA1143 |
| 309 | UBXN7 |
| 310 | GAPVD1 |
| 311 | NEMF |
| 312 | HIF1AN |
| 313 | MARF1 |
| 314 | NDUFV1 |
| 315 | HARS |
| 316 | ATF7 |
| 317 | AKAP13 |
| 318 | QARS |
| 319 | ZNF24 |
| 320 | FAM192A |
| 321 | MRPL57 |
| 322 | CHD2 |
| 323 | TOMM20 |
| 324 | MGA |

TABLE A-continued

| | Name |
|---|---|
| 325 | IP6K1 |
| 326 | DNAJC30 |
| 327 | IMP3 |
| 328 | NDUFAF3 |
| 329 | SPTY2D1 |
| 330 | CLK3 |
| 331 | MRPS23 |
| 332 | TTC3 |
| 333 | GPATCH8 |
| 334 | USP7 |
| 335 | LAMTOR4 |
| 336 | TBC1D9B |
| 337 | GSTK1 |
| 338 | QRICH1 |
| 339 | DDX39B |
| 340 | GIGYF2 |
| 341 | BRD2 |
| 342 | GPANK1 |
| 343 | PRRC2A |
| 344 | DHX16 |
| 345 | NAP1L4 |
| 346 | SELENOH |
| 347 | RBMXL1 |
| 348 | ACBD6 |
| 349 | FAM133B |
| 350 | CDKN2AIPNL |
| 351 | CDK11B |
| 352 | PRKDC |
| 353 | MYO19 |
| 354 | LASIL |
| 355 | PPP1R12A |
| 356 | CCAR1 |
| 357 | SMC1A |
| 358 | ARAF |
| 359 | HSP90AA1 |
| 360 | CHERP |
| 361 | SRRT |
| 362 | SF3B2 |
| 363 | HNRNPC |
| 364 | HNRNPM |
| 365 | RBX1 |
| 366 | TELO2 |
| 367 | UBE2I |
| 368 | TIMM50 |
| 369 | PRPF31 |
| 370 | TCERG1 |
| 371 | TUSC2 |
| 372 | EIF4G1 |
| 373 | NCL |
| 374 | PRPF3 |
| 375 | SNRPB |
| 376 | PRKCSH |
| 377 | TUBGCP2 |
| 378 | EIF3G |
| 379 | SYNCRIP |
| 380 | HUS1 |
| 381 | ACTR1A |
| 382 | MBD1 |
| 383 | HDGF |
| 384 | PARP1 |
| 385 | RPL7L1 |
| 386 | RPUSD3 |
| 387 | ACOX1 |
| 388 | U2SURP |
| 389 | CPSF2 |
| 390 | TSR1 |
| 391 | RFWD3 |
| 392 | CD2BP2 |
| 393 | PCBP1 |
| 394 | PA2G4 |
| 395 | PPID |
| 396 | HCFC1 |
| 397 | FKBP2 |
| 398 | BRMS1 |
| 399 | EIF3K |
| 400 | PUF60 |
| 401 | NOC2L |
| 402 | PRPF40A |
| 403 | RNPS1 |
| 404 | DCP1A |
| 405 | CWC25 |
| 406 | MED24 |
| 407 | PHF20 |
| 408 | EIPR1 |
| 409 | KAT6A |
| 410 | PSMD8 |
| 411 | NOP56 |
| 412 | COPE |
| 413 | SSR3 |
| 414 | COPA |
| 415 | THOC6 |
| 416 | WDR74 |
| 417 | PSMB7 |
| 418 | HAX1 |
| 419 | SURF6 |
| 420 | VPS28 |
| 421 | VKORC1 |
| 422 | PSMD13 |
| 423 | TMEM222 |
| 424 | C6orf106 |
| 425 | MRPL38 |
| 426 | CSNK2B |
| 427 | PSMB3 |
| 428 | CCDC124 |
| 429 | RANBP3 |
| 430 | NOP58 |
| 431 | ZFR |
| 432 | IDH3G |
| 433 | HSD17B10 |
| 434 | MRPL28 |
| 435 | PSMC5 |
| 436 | HSP90AB1 |
| 437 | L3MBTL2 |
| 438 | CINP |
| 439 | NAA10 |
| 440 | SGTA |
| 441 | EDF1 |
| 442 | NDUFS8 |
| 443 | TPI1 |
| 444 | MFN2 |
| 445 | DNPEP |
| 446 | CLPP |
| 447 | RBM42 |
| 448 | PNKD |
| 449 | ILF3 |
| 450 | COX4I1 |
| 451 | RBSN |
| 452 | ILKAP |
| 453 | NIP7 |
| 454 | THUMPD3 |
| 455 | CCT7 |
| 456 | TBRG4 |
| 457 | DDX56 |
| 458 | DCAF7 |
| 459 | YME1L1 |
| 460 | MAN2C1 |
| 461 | SCYL1 |
| 462 | GPN2 |
| 463 | GMPPA |
| 464 | DDX46 |
| 465 | SRFBP1 |
| 466 | CXXC1 |
| 467 | EIF5B |
| 468 | GPATCH4 |
| 469 | EIF4A1 |
| 470 | UBXN1 |
| 471 | IWS1 |
| 472 | PSMC3 |
| 473 | CIAO2B |
| 474 | ZNF592 |
| 475 | DNAJC7 |
| 476 | DTYMK |
| 477 | RNF181 |
| 478 | SLC25A6 |
| 479 | TRMT112 |
| 480 | EIF1AD |

TABLE A-continued

| | Name |
|---|---|
| 481 | AURKAIP1 |
| 482 | ACSF3 |
| 483 | TALDO1 |
| 484 | COX5A |
| 485 | TUFM |
| 486 | FARSA |
| 487 | MRPL14 |
| 488 | ARL6IP4 |
| 489 | EWSR1 |
| 490 | DDX41 |
| 491 | CDK10 |
| 492 | FAAP100 |
| 493 | RPS19BP1 |
| 494 | PTMA |
| 495 | MRPL21 |
| 496 | MRPS18B |
| 497 | ABCF1 |
| 498 | MCRIP1 |
| 499 | CNPY2 |
| 500 | MRPL12 |
| 501 | BAZ2A |
| 502 | USP4 |
| 503 | SMG7 |
| 504 | ARPP19 |
| 505 | NR1H2 |
| 506 | NPEPPS |
| 507 | BIN3 |
| 508 | UBE3B |
| 509 | WASF2 |
| 510 | TAGLN2 |
| 511 | IRF2 |
| 512 | RELA |
| 513 | DCTN2 |
| 514 | CIB1 |
| 515 | SPTAN1 |
| 516 | WWP2 |
| 517 | MSRB1 |
| 518 | DCTN1 |
| 519 | EIF6 |
| 520 | CUX1 |
| 521 | WDR1 |
| 522 | PDRG1 |
| 523 | SH3GLB1 |
| 524 | SNAP29 |
| 525 | KLHDC3 |
| 526 | CHMP1A |
| 527 | LGALS3 |
| 528 | GLYR1 |
| 529 | NOSIP |
| 530 | HERC4 |
| 531 | UBE2J2 |
| 532 | CHTOP |
| 533 | PEF1 |
| 534 | ZDHHC3 |
| 535 | ATP5MD |
| 536 | SETD3 |
| 537 | MCRS1 |
| 538 | AP1G2 |
| 539 | CHMP1B |
| 540 | ARF5 |
| 541 | RNF10 |
| 542 | SNX1 |
| 543 | HAGH |
| 544 | FAM50A |
| 545 | MYL6 |
| 546 | NANS |
| 547 | LPIN2 |
| 548 | UBL4A |
| 549 | TBCB |
| 550 | PRKD2 |
| 551 | DMAC2 |
| 552 | RNF7 |
| 553 | WRAP73 |
| 554 | PEX16 |
| 555 | ANXA11 |
| 556 | CYREN |
| 557 | DYNLRB1 |
| 558 | HECTD3 |

TABLE A-continued

| | Name |
|---|---|
| 559 | PGLS |
| 560 | COX5B |
| 561 | CDK9 |
| 562 | ARPC5L |
| 563 | RTCA |
| 564 | UNC45A |
| 565 | NARF |
| 566 | GUK1 |
| 567 | CAST |
| 568 | NIT1 |
| 569 | EFCAB14 |
| 570 | PRMT2 |
| 571 | FLAD1 |
| 572 | SLMAP |
| 573 | TKT |
| 574 | SLFN5 |
| 575 | CSNKIG1 |
| 576 | EXOSC10 |
| 577 | NADSYN1 |
| 578 | KDM2A |
| 579 | KPNA4 |
| 580 | TMEM120A |
| 581 | COX19 |
| 582 | ARPIN |
| 583 | SYNRG |
| 584 | LYPLA2 |
| 585 | TOLLIP |
| 586 | CDC37 |
| 587 | H2AFY |
| 588 | RBCK1 |
| 589 | RAF1 |
| 590 | GPS2 |
| 591 | NMT1 |
| 592 | FLOT1 |
| 593 | FBXW5 |
| 594 | SQSTM1 |
| 595 | DTX3L |
| 596 | PPIA |
| 597 | SMG5 |
| 598 | EGLN2 |
| 599 | ROCK1 |
| 600 | PXN |
| 601 | RANGAP1 |
| 602 | PSMA7 |
| 603 | MBD4 |
| 604 | ADRM1 |
| 605 | ARF3 |
| 606 | SMIM12 |
| 607 | PPP1CA |
| 608 | SMIM29 |
| 609 | WDR5 |
| 610 | GRIPAP1 |
| 611 | CWF19L1 |
| 612 | MED15 |
| 613 | TSPO |
| 614 | MYH9 |
| 615 | ITPK1 |
| 616 | TPD52L2 |
| 617 | GSDMD |
| 618 | PSMD9 |
| 619 | ADPRHL2 |
| 620 | CCDC32 |
| 621 | NSUN5 |
| 622 | EIF4E2 |
| 623 | MGST3 |
| 624 | PCYT1A |
| 625 | SAP30BP |
| 626 | RNASEK-C17orf49 |
| 627 | SHISA5 |
| 628 | BLCAP |
| 629 | DDX23 |
| 630 | FLII |
| 631 | GAK |
| 632 | PAK2 |
| 633 | HGS |
| 634 | AATF. |

2. The method of claim 1, wherein the mRNA expression levels are measured by RNA-seq.

3. The method of claim 1, wherein the supervised learning method includes any one or a combination of at least two of Naive Bayes, Decision Tree, Logistic Regression, KNN or Support Vector Machine (SVM), preferably, SVM.

4. A method for embryo transplantation to a human under test, comprising the following steps:
  (1) obtaining a sample derived from the human under test and detecting the mRNA expression level of each biomarker in the set of the sample, wherein, the set comprises all 634 genes of Table A,
  wherein the sample is a sample of endometrial tissues, uterine fluid, and/or vaginal exfoliated cells, and the sample is from the following periods: LH+5 to LH+9, preferably, LH+7,
  and the biomarkers are differentially-expressed in a pre-receptivity period, an intermediate period, and a post-receptivity period;
  (2) determining that the endometrium is receptive by either comparing the level detected in step (1) with a predetermined value of the expression levels of said genes in the pre-receptivity period, intermediate period, and the post-receptivity period or inputting the level detected in step (1) into an analysis model for determining endometrial receptivity constructed by a supervised learning method; and
  (3) transplanting an embryo into said human under test,

TABLE A

| | Name |
|---|---|
| 1 | KRIT1 |
| 2 | RBM5 |
| 3 | PAF1 |
| 4 | RFC1 |
| 5 | TPR |
| 6 | ACAA1 |
| 7 | SFSWAP |
| 8 | SPEN |
| 9 | CPSF1 |
| 10 | XRCC1 |
| 11 | KDM5A |
| 12 | SART3 |
| 13 | PIK3C3 |
| 14 | YTHDC1 |
| 15 | PPIE |
| 16 | NFX1 |
| 17 | CDC5L |
| 18 | SF3A1 |
| 19 | TXN2 |
| 20 | EIF3D |
| 21 | EP300 |
| 22 | CHD8 |
| 23 | PNN |
| 24 | CSTF1 |
| 25 | PRPF6 |
| 26 | PQBP1 |
| 27 | CIAO3 |
| 28 | HMOX2 |
| 29 | PIH1D1 |
| 30 | AKAP8 |
| 31 | BUD31 |
| 32 | EIF3A |
| 33 | CASC3 |
| 34 | CDK5RAP3 |
| 35 | SUPT6H |
| 36 | CNOT2 |
| 37 | SUDS3 |
| 38 | TBCCD1 |
| 39 | EIF2B4 |
| 40 | ORC2 |
| 41 | SRSF4 |
| 42 | SFPQ |

TABLE A-continued

| | Name |
|---|---|
| 43 | SRSF11 |
| 44 | PRRC2C |
| 45 | FBXW2 |
| 46 | SNX19 |
| 47 | EPC1 |
| 48 | TBCC |
| 49 | CNOT1 |
| 50 | GTF2F1 |
| 51 | KDM5C |
| 52 | NSRP1 |
| 53 | UXT |
| 54 | ATG14 |
| 55 | AKAP9 |
| 56 | PRKRIP1 |
| 57 | CCNT1 |
| 58 | LSM4 |
| 59 | RLIM |
| 60 | ERAL1 |
| 61 | PTPRA |
| 62 | NASP |
| 63 | SRRM1 |
| 64 | PRPF38A |
| 65 | CDK5RAP2 |
| 66 | PRPF4 |
| 67 | PPIG |
| 68 | SMARCC2 |
| 69 | TCF25 |
| 70 | CSNK1D |
| 71 | ENSA |
| 72 | TEX261 |
| 73 | FIP1L1 |
| 74 | CENPC |
| 75 | ZMAT2 |
| 76 | CELF1 |
| 77 | CPSF7 |
| 78 | UPF2 |
| 79 | MMS19 |
| 80 | SON |
| 81 | ADAR |
| 82 | MAGOH |
| 83 | ELP6 |
| 84 | NIPBL |
| 85 | SLU7 |
| 86 | PCF11 |
| 87 | NSD1 |
| 88 | YWHAB |
| 89 | DDB1 |
| 90 | SF1 |
| 91 | ATG4B |
| 92 | FEM1B |
| 93 | SIN3A |
| 94 | LUZP1 |
| 95 | GPS1 |
| 96 | SF3B5 |
| 97 | HNRNPA3 |
| 98 | PYM1 |
| 99 | RBM4 |
| 100 | PRPF8 |
| 101 | ZBTB4 |
| 102 | CKAP5 |
| 103 | SMAD2 |
| 104 | POLR2A |
| 105 | RNF135 |
| 106 | RNF41 |
| 107 | MRPS11 |
| 108 | CEP63 |
| 109 | EIF3C |
| 110 | SF3B3 |
| 111 | SIAH1 |
| 112 | SND1 |
| 113 | UBL5 |
| 114 | NELFE |
| 115 | EIF3CL |
| 116 | FIS1 |
| 117 | TRIM26 |
| 118 | MRPL20 |
| 119 | KMT2E |
| 120 | AFF4 |

TABLE A-continued

| | Name |
|---|---|
| 121 | GTF3C1 |
| 122 | ANAPC5 |
| 123 | MAEA |
| 124 | TOX4 |
| 125 | GID8 |
| 126 | ARFGAP1 |
| 127 | ARHGEF7 |
| 128 | H2AFV |
| 129 | ZNHIT1 |
| 130 | COA1 |
| 131 | GBF1 |
| 132 | GOSR1 |
| 133 | IFT20 |
| 134 | ANAPC15 |
| 135 | IK |
| 136 | KANSL3 |
| 137 | GTF3C2 |
| 138 | CHMP3 |
| 139 | FAM20B |
| 140 | CHCHD5 |
| 141 | RPAIN |
| 142 | UBE4B |
| 143 | C19orf12 |
| 144 | ANKRD17 |
| 145 | MED6 |
| 146 | TMEM258 |
| 147 | ERCC5 |
| 148 | ATP5MC2 |
| 149 | SMPD4 |
| 150 | ECPAS |
| 151 | DMAC1 |
| 152 | SEC24B |
| 153 | NCOR1 |
| 154 | PI4KB |
| 155 | C1orf43 |
| 156 | ASXL2 |
| 157 | VTI1A |
| 158 | PPP1R15B |
| 159 | SNF8 |
| 160 | GATD3A |
| 161 | MED11 |
| 162 | RAD21 |
| 163 | SPIDR |
| 164 | ANAPC16 |
| 165 | VPS39 |
| 166 | ATP5PD |
| 167 | FIBP |
| 168 | CORO1B |
| 169 | RAB1B |
| 170 | RMDN1 |
| 171 | BET1L |
| 172 | ASB8 |
| 173 | EXOC7 |
| 174 | UQCR10 |
| 175 | TOP1 |
| 176 | SPOUT1 |
| 177 | ARMCX6 |
| 178 | PPP1R10 |
| 179 | LIN52 |
| 180 | SMIM7 |
| 181 | TOMM6 |
| 182 | PDCD6 |
| 183 | GGNBP2 |
| 184 | GATD3B |
| 185 | KIAA0100 |
| 186 | ELOA |
| 187 | AQR |
| 188 | FBXO42 |
| 189 | LSG1 |
| 190 | FAM120A |
| 191 | THRAP3 |
| 192 | ARID4B |
| 193 | POLR3E |
| 194 | GPBP1 |
| 195 | RFXANK |
| 196 | TAF11 |
| 197 | BUD23 |
| 198 | PDCD2 |
| 199 | BCS1L |
| 200 | ZNF638 |
| 201 | ZNF37A |
| 202 | EXOSC7 |
| 203 | TOP2B |
| 204 | DELE1 |
| 205 | GCN1 |
| 206 | DDX24 |
| 207 | DHPS |
| 208 | WAC |
| 209 | HPS4 |
| 210 | PPP6R2 |
| 211 | PACSIN2 |
| 212 | HMGXB4 |
| 213 | POLR3H |
| 214 | RBM23 |
| 215 | ZC3H14 |
| 216 | DCAF11 |
| 217 | NDRG3 |
| 218 | GYS1 |
| 219 | CCDC130 |
| 220 | DNAJC2 |
| 221 | CHCHD2 |
| 222 | TMEM248 |
| 223 | NUFIP2 |
| 224 | UBTF |
| 225 | MTMR4 |
| 226 | RSRC2 |
| 227 | KRR1 |
| 228 | CHD4 |
| 229 | ZNF451 |
| 230 | SENP6 |
| 231 | PRPF4B |
| 232 | PRKAR2A |
| 233 | FXR1 |
| 234 | HDLBP |
| 235 | PPP1R7 |
| 236 | ASH1L |
| 237 | GON4L |
| 238 | TSNAX |
| 239 | HMGCL |
| 240 | MED28 |
| 241 | NEK9 |
| 242 | PANK3 |
| 243 | SPOP |
| 244 | MTIF3 |
| 245 | ZC3H13 |
| 246 | SMUG1 |
| 247 | RAB22A |
| 248 | STAU1 |
| 249 | DDX27 |
| 250 | SERPINB6 |
| 251 | MEA1 |
| 252 | COX6B1 |
| 253 | TIMM17B |
| 254 | XPO7 |
| 255 | SAFB2 |
| 256 | EIF2S3 |
| 257 | UBA1 |
| 258 | RBM39 |
| 259 | ACLY |
| 260 | DHX30 |
| 261 | SCO1 |
| 262 | LARS |
| 263 | PPHLN1 |
| 264 | LPIN1 |
| 265 | TIMM10 |
| 266 | ARGLU1 |
| 267 | TFCP2 |
| 268 | C2orf49 |
| 269 | SLTM |
| 270 | CIR1 |
| 271 | TMOD3 |
| 272 | SBNO1 |
| 273 | DCAF5 |
| 274 | ANP32A |
| 275 | COMMD4 |
| 276 | ARHGAP17 |

TABLE A-continued

| | Name |
|---|---|
| 277 | RHOT2 |
| 278 | SERBP1 |
| 279 | STRIP1 |
| 280 | UFC1 |
| 281 | MRPL9 |
| 282 | UBAP2L |
| 283 | SDE2 |
| 284 | SNRNP200 |
| 285 | C7orf50 |
| 286 | MDH2 |
| 287 | NDUFB[11 |
| 288 | TAF1 |
| 289 | EIF4EBP2 |
| 290 | MTG1 |
| 291 | NUDT22 |
| 292 | VIPAS39 |
| 293 | KIN |
| 294 | ATPSF1A |
| 295 | PELO |
| 296 | SAR1B |
| 297 | HNRNPDL |
| 298 | CCDC174 |
| 299 | LARP1 |
| 300 | SCAF4 |
| 301 | APPL1 |
| 302 | GPBP1L1 |
| 303 | PSKH1 |
| 304 | SSU72 |
| 305 | CCDC12 |
| 306 | ZYG11B |
| 307 | PMVK |
| 308 | KIAA1143 |
| 309 | UBXN7 |
| 310 | GAPVD1 |
| 311 | NEMF |
| 312 | HIF1AN |
| 313 | MARF1 |
| 314 | NDUFV1 |
| 315 | HARS |
| 316 | ATF7 |
| 317 | AKAP13 |
| 318 | QARS |
| 319 | ZNF24 |
| 320 | FAM192A |
| 321 | MRPL57 |
| 322 | CHD2 |
| 323 | TOMM20 |
| 324 | MGA |
| 325 | IP6K1 |
| 326 | DNAJC30 |
| 327 | IMP3 |
| 328 | NDUFAF3 |
| 329 | SPTY2D1 |
| 330 | CLK3 |
| 331 | MRPS23 |
| 332 | TTC3 |
| 333 | GPATCH8 |
| 334 | USP7 |
| 335 | LAMTOR4 |
| 336 | TBC1D9B |
| 337 | GSTK1 |
| 338 | QRICH1 |
| 339 | DDX39B |
| 340 | GIGYF2 |
| 341 | BRD2 |
| 342 | GPANK1 |
| 343 | PRRC2A |
| 344 | DHX16 |
| 345 | NAP1L4 |
| 346 | SELENOH |
| 347 | RBMXL1 |
| 348 | ACBD6 |
| 349 | FAM133B |
| 350 | CDKN2AIPNL |
| 351 | CDK11B |
| 352 | PRKDC |
| 353 | MYO19 |
| 354 | LAS1L |

TABLE A-continued

| | Name |
|---|---|
| 355 | PPP1R12A |
| 356 | CCAR1 |
| 357 | SMC1A |
| 358 | ARAF |
| 359 | HSP90AA1 |
| 360 | CHERP |
| 361 | SRRT |
| 362 | SF3B2 |
| 363 | HNRNPC |
| 364 | HNRNPM |
| 365 | RBX1 |
| 366 | TELO2 |
| 367 | UBE2I |
| 368 | TIMM50 |
| 369 | PRPF31 |
| 370 | TCERG1 |
| 371 | TUSC2 |
| 372 | EIF4G1 |
| 373 | NCL |
| 374 | PRPF3 |
| 375 | SNRPB |
| 376 | PRKCSH |
| 377 | TUBGCP2 |
| 378 | EIF3G |
| 379 | SYNCRIP |
| 380 | HUS1 |
| 381 | ACTR1A |
| 382 | MBD1 |
| 383 | HDGF |
| 384 | PARP1 |
| 385 | RPL7L1 |
| 386 | RPUSD3 |
| 387 | ACOX1 |
| 388 | U2SURP |
| 389 | CPSF2 |
| 390 | TSR1 |
| 391 | RFWD3 |
| 392 | CD2BP2 |
| 393 | PCBP1 |
| 394 | PA2G4 |
| 395 | PPID |
| 396 | HCFC1 |
| 397 | FKBP2 |
| 398 | BRMS1 |
| 399 | EIF3K |
| 400 | PUF60 |
| 401 | NOC2L |
| 402 | PRPF40A |
| 403 | RNPS1 |
| 404 | DCP1A |
| 405 | CWC25 |
| 406 | MED24 |
| 407 | PHF20 |
| 408 | EIPR1 |
| 409 | KAT6A |
| 410 | PSMD8 |
| 411 | NOP56 |
| 412 | COPE |
| 413 | SSR3 |
| 414 | COPA |
| 415 | THOC6 |
| 416 | WDR74 |
| 417 | PSMB7 |
| 418 | HAX1 |
| 419 | SURF6 |
| 420 | VPS28 |
| 421 | VKORC1 |
| 422 | PSMD13 |
| 423 | TMEM222 |
| 424 | C6orf106 |
| 425 | MRPL38 |
| 426 | CSNK2B |
| 427 | PSMB3 |
| 428 | CCDC124 |
| 429 | RANBP3 |
| 430 | NOP58 |
| 431 | ZFR |
| 432 | IDH3G |

TABLE A-continued

| | Name |
|---|---|
| 433 | HSD17B10 |
| 434 | MRPL28 |
| 435 | PSMC5 |
| 436 | HSP90AB1 |
| 437 | L3MBTL2 |
| 438 | CINP |
| 439 | NAA10 |
| 440 | SGTA |
| 441 | EDF1 |
| 442 | NDUFS8 |
| 443 | TPI1 |
| 444 | MFN2 |
| 445 | DNPEP |
| 446 | CLPP |
| 447 | RBM42 |
| 448 | PNKD |
| 449 | ILF3 |
| 450 | COX4I1 |
| 451 | RBSN |
| 452 | ILKAP |
| 453 | NIP7 |
| 454 | THUMPD3 |
| 455 | CCT7 |
| 456 | TBRG4 |
| 457 | DDX56 |
| 458 | DCAF7 |
| 459 | YME1L1 |
| 460 | MAN2C1 |
| 461 | SCYL1 |
| 462 | GPN2 |
| 463 | GMPPA |
| 464 | DDX46 |
| 465 | SRFBP1 |
| 466 | CXXC1 |
| 467 | EIF5B |
| 468 | GPATCH4 |
| 469 | EIF4A1 |
| 470 | UBXN1 |
| 471 | IWS |
| 472 | PSMC3 |
| 473 | CIAO2B |
| 474 | ZNF592 |
| 475 | DNAJC7 |
| 476 | DTYMK |
| 477 | RNF181 |
| 478 | SLC25A6 |
| 479 | TRMT112 |
| 480 | EIF1AD |
| 481 | AURKAIP1 |
| 482 | ACSF3 |
| 483 | TALDO1 |
| 484 | COX5A |
| 485 | TUFM |
| 486 | FARSA |
| 487 | MRPL14 |
| 488 | ARL6IP4 |
| 489 | EWSR1 |
| 490 | DDX41 |
| 491 | CDK10 |
| 492 | FAAP100 |
| 493 | RPS19BP1 |
| 494 | PTMA |
| 495 | MRPL21 |
| 496 | MRPS18B |
| 497 | ABCF1 |
| 498 | MCRIP1 |
| 499 | CNPY2 |
| 500 | MRPL12 |
| 501 | BAZ2A |
| 502 | USP4 |
| 503 | SMG7 |
| 504 | ARPP19 |
| 505 | NR1H2 |
| 506 | NPEPPS |
| 507 | BIN3 |
| 508 | UBE3B |
| 509 | WASF2 |
| 510 | TAGLN2 |
| 511 | IRF2 |
| 512 | RELA |
| 513 | DCTN2 |
| 514 | CIB1 |
| 515 | SPTAN1 |
| 516 | WWP2 |
| 517 | MSRB1 |
| 518 | DCTN1 |
| 519 | FIF6 |
| 520 | CUX1 |
| 521 | WDR1 |
| 522 | PDRG1 |
| 523 | SH3GLB1 |
| 524 | SNAP29 |
| 525 | KLHDC3 |
| 526 | CHMP1A |
| 527 | LGALS3 |
| 528 | GLYR1 |
| 529 | NOSIP |
| 530 | HERC4 |
| 531 | UBE232 |
| 532 | CHTOP |
| 533 | PEF1 |
| 534 | ZDHHC3 |
| 535 | ATP5MD |
| 536 | SETD3 |
| 537 | MCRS1 |
| 538 | AP1G2 |
| 539 | CHMP1B |
| 540 | ARF5 |
| 541 | RNF10 |
| 542 | SNX1 |
| 543 | HAGH |
| 544 | FAM50A |
| 545 | MYL6 |
| 546 | NANS |
| 547 | LPIN2 |
| 548 | UBL4A |
| 549 | TBCB |
| 550 | PRKD2 |
| 551 | DMAC2 |
| 552 | RNF7 |
| 553 | WRAP73 |
| 554 | PEX16 |
| 555 | ANXA11 |
| 556 | CYREN |
| 557 | DYNLRB1 |
| 558 | HECTD3 |
| 559 | POLS |
| 560 | COX5B |
| 561 | CDK9 |
| 562 | ARPC5L |
| 563 | RTCA |
| 564 | UNC45A |
| 565 | NARF |
| 566 | GUK1 |
| 567 | CAST |
| 568 | NIT1 |
| 569 | EFCAB14 |
| 570 | PRMT2 |
| 571 | FLAD1 |
| 572 | SLMAP |
| 573 | TKT |
| 574 | SLFN5 |
| 575 | CSNK1G1 |
| 576 | EXOSC10 |
| 577 | NADSYN1 |
| 578 | KDM2A |
| 579 | KPNA4 |
| 580 | TMEM120A |
| 581 | COX19 |
| 582 | ARPIN |
| 583 | SYNRG |
| 584 | LYPLA2 |
| 585 | TOLLIP |
| 586 | CDC37 |
| 587 | H2AFY |
| 588 | RBCK1 |

TABLE A-continued

| | Name |
|---|---|
| 589 | RAF1 |
| 590 | GPS2 |
| 591 | NMT1 |
| 592 | FLOT1 |
| 593 | FBXW5 |
| 594 | SQSTM1 |
| 595 | DTX3L |
| 596 | PPIA |
| 597 | SMG5 |
| 598 | EGLN2 |
| 599 | ROCK1 |
| 600 | PXN |
| 601 | RANGAP1 |
| 602 | PSMA7 |
| 603 | MBD4 |
| 604 | ADRM1 |
| 605 | ARF3 |
| 606 | SMIM12 |
| 607 | PPP1CA |
| 608 | SMIM29 |
| 609 | WDR5 |
| 610 | GRIPAP1 |
| 611 | CWF19L1 |
| 612 | MED15 |
| 613 | TSPO |
| 614 | MYH9 |
| 615 | ITPK1 |
| 616 | TPD52L2 |
| 617 | GSDMD |
| 618 | PSMD9 |
| 619 | ADPRHL2 |
| 620 | CCDC32 |
| 621 | NSUNS |
| 622 | EIF4E2 |
| 623 | MGST3 |
| 624 | PCYT1A |
| 625 | SAP30BP |
| 626 | RNASEK-C17orf49 |
| 627 | SHISA5 |
| 628 | BLCAP |
| 629 | DDX23 |
| 630 | FLII |
| 631 | GAK |
| 632 | PAK2 |
| 633 | HGS |
| 634 | AATF. |

5. The method of claim 4, wherein the mRNA expression levels are detected by RNA-seq.

6. The method of claim 4, wherein the supervised learning method includes any one or a combination of at least two of Naive Bayes, Decision Tree, Logistic Regression, KNN or Support Vector Machine (SVM), preferably, SVM.

* * * * *